US008326765B2

(12) United States Patent
Walker et al.

(10) Patent No.: US 8,326,765 B2
(45) Date of Patent: Dec. 4, 2012

(54) METHOD AND APPARATUS FOR A CRYPTOGRAPHICALLY-ASSISTED COMMERCIAL NETWORK SYSTEM DESIGNED TO FACILITATE AND SUPPORT EXPERT-BASED COMMERCE

(75) Inventors: Jay S. Walker, Ridgefield, CT (US); Bruce Schneier, Oak Park, IL (US); James A. Jorasch, Stamford, CT (US)

(73) Assignee: Community United IP, LLC, Greensboro, NC (US)

( * ) Notice: Subject to any disclaimer, the term of this patent is extended or adjusted under 35 U.S.C. 154(b) by 1522 days.

(21) Appl. No.: 11/423,753

(22) Filed: Jun. 13, 2006

(65) Prior Publication Data
US 2006/0224509 A1 Oct. 5, 2006

Related U.S. Application Data

(63) Continuation of application No. 09/112,131, filed on Jul. 8, 1998, now Pat. No. 7,523,045, which is a continuation of application No. 08/685,706, filed on Jul. 24, 1996, now Pat. No. 5,862,223.

(51) Int. Cl.
*G06Q 40/00* (2012.01)
(52) U.S. Cl. .............................. 705/64; 705/40; 705/26.4
(58) Field of Classification Search .................. 705/26.4, 705/40, 64
See application file for complete search history.

(56) References Cited

U.S. PATENT DOCUMENTS

| 4,576,579 A | 3/1986 | Harte ............................. 434/334 |
| 4,789,928 A | 12/1988 | Fujisaki ............................ 705/37 |
| 4,789,929 A | 12/1988 | Nishimura et al. ............. 378/15 |
| 4,868,877 A * | 9/1989 | Fischer ........................... 713/157 |
| 4,884,218 A * | 11/1989 | Agnew et al. ................... 706/50 |
| 4,903,201 A | 2/1990 | Wagner ........................... 705/37 |
| 4,996,642 A * | 2/1991 | Hey .............................. 705/7.29 |
| 5,021,953 A | 6/1991 | Webber et al. .................... 705/6 |

(Continued)

FOREIGN PATENT DOCUMENTS
EP      0 720 333 A2    7/1996
(Continued)

OTHER PUBLICATIONS

"Information marketplace stocks 'shelves' for mid-June debut: the new service will be a meeting place for buyers and sellers; introduction of American Information Exchange Corp.", Lauree Padgett, Link-Up, Learned Information Inc., May 1992, 3 pages, hereinafter referred to as AMIX).*

(Continued)

*Primary Examiner* — James D Nigh
(74) *Attorney, Agent, or Firm* — Tarek N. Fahmi, APC

(57) ABSTRACT

The present invention is an expert matching method and apparatus for managing communications between an expert having particular qualifications and an end user seeking a solution to an expert request. In a preferred embodiment, the apparatus of the present invention includes a controller having a database for storing expert qualifications. In one embodiment, the controller receives an expert request. A search program identifies experts qualified to respond to the expert request. The expert request is then transmitted to the expert, which results in an expert answer transmitted to and received by the central controller. After authentication of the expert answer, using a wide range of security levels from passwords to cryptography, the answer is forwarded to the end user. The method and apparatus of the present invention have applications on the Internet as well as conventional voice telephony systems.

13 Claims, 35 Drawing Sheets

U.S. PATENT DOCUMENTS

| | | | | |
|---|---|---|---|---|
| 5,164,897 | A | * | 11/1992 | Clark et al. .................. 705/321 |
| 5,191,613 | A | | 3/1993 | Graziano et al. ............. 716/176 |
| 5,257,185 | A | | 10/1993 | Farley et al. ............. 364/419.19 |
| 5,259,766 | A | | 11/1993 | Sack et al. .................... 434/362 |
| 5,307,262 | A | | 4/1994 | Ertel ................................ 705/2 |
| 5,384,894 | A | | 1/1995 | Vassiliadis et al. ............ 706/52 |
| 5,398,300 | A | | 3/1995 | Levey ............................ 706/16 |
| 5,539,869 | A | | 7/1996 | Spoto et al. .................. 395/154 |
| 5,557,518 | A | | 9/1996 | Rosen ............................ 706/16 |
| 5,592,375 | A | | 1/1997 | Salmon et al. ................ 138/122 |
| 5,594,638 | A | | 1/1997 | Iliff .................................. 705/3 |
| 5,625,682 | A | * | 4/1997 | Gray et al. ............... 379/207.16 |
| 5,628,011 | A | | 5/1997 | Ahamed ......................... 707/10 |
| 5,630,125 | A | | 5/1997 | Zellweger ................. 707/103 R |
| 5,634,051 | A | | 5/1997 | Thomson ......................... 707/5 |
| 5,678,041 | A | | 10/1997 | Baker et al. ...................... 707/9 |
| 5,706,493 | A | * | 1/1998 | Sheppard, II ........................ 1/1 |
| 5,724,580 | A | | 3/1998 | Levin et al. ................ 707/104.1 |
| 5,764,923 | A | | 6/1998 | Tallman et al. ................... 705/3 |
| 5,774,883 | A | | 6/1998 | Andersen et al. ............... 705/38 |
| 5,779,549 | A | | 7/1998 | Walker et al. .................. 463/42 |
| 5,802,493 | A | | 9/1998 | Sheflott et al. .................. 705/1 |
| 5,825,869 | A | * | 10/1998 | Brooks et al. ............ 379/265.12 |
| 5,862,223 | A | | 1/1999 | Walker et al. .................... 705/1 |
| 5,875,431 | A | | 2/1999 | Heckman ........................... 705/7 |
| 5,948,054 | A | | 9/1999 | Nielsen ........................... 709/200 |
| 5,974,415 | A | | 10/1999 | Schrieber ........................... 707/6 |
| 6,026,148 | A | | 2/2000 | Dworkin .................... 379/88.18 |
| 7,133,835 | B1 | * | 11/2006 | Fusz et al. ..................... 705/26.3 |

FOREIGN PATENT DOCUMENTS

WO          WO9600949 A1 * 1/1996

OTHER PUBLICATIONS

Dawood ("A strategy of knowledge elicitation for developing an integrated bidding/production management expert system for the precast industry", Division of Civil Engineering and Building, School of Science and Technology, The University of Teesside, Middlesborough TS1 3BA, UK, Advances in Engineering Software, pp. 225-234, 1996).*

Supplementary European Search Report for European Patent Application No. 97935099.8, filed Feb. 5, 1999, in the name of Walker et al, and entitled "Method and Apparatus for Cryptographically-Assisted Commercial Network System Designed to Facilitate and Support Expert-Based Commerce", 2pp.

Dyson, Ester "Information, Bid and Asked," Forbes, Aug. 20, 1990, 3pp.

"Information Industries; New Ideas on the Block," The Economist, Mar. 14, 1992, 2pp.

Off, Dr. Joel N., "Join the Information Economy; American Information Exchange Online Information Service is the Brainchild of Phil Salin," Computer-Aided Engineering, Apr. 1992, 3pp.

Lauree Padgett, Information Marketplace 'Stocks Shelves' for Mid-June Debut: the New Service Will Be a Meeting Place for Buyers and Sellers; Information of American Information Exchange Corp., Link-up, May 1992, 3pp.

Caruso, Denise "Technology: Digital Commerce: An Operating System to Keep the Wide Spaces Open While Providing Security." The New York Times, Section D, p. 5, Oct. 23, 1995, 3pp.

Weismann, Johnathan "AMIX Cuts Staff in the Wake of Leaving Parent Company," The Business Journal—San Jose, Sep. 7, 1992, 2pp.

"The American Information Exchange Corp. Announces Relocation From Palo Alto to Mountain View," Business Wire, Jul. 31, 1992, 2pp.

F. Randall Farmer et al., "From Habitat to Global Cyberspace," artivle printed from <http://www.communities.com/paper/hab2cybr.html> (Electric Communities World Wide Web Site), 1994, 8pp.

"Company Profile," press release printed from <http://www.communities.com/company.html> (Electric Communities World Wide Web Site) prior to Jul. 10, 1996, 3pp.

Interview with John Walker of Autodesk by Mary Eisenhart of Micro Times, Mar. 26, 1992, pp. 11-12, printed from <http://wwww.fourmilab.ch/autofil/www/chapter_2-101.html#7699>, 21pp.

Blanco, Rock "Electronic Markets Bring it All Home" Corporate Computing, Aug. 1992, 3pp.

Welch, Nathalie "Data Marketplace to Get Mac Client; American Information Exchange; Brief Article; Product Announcement," MacWeek, Mar. 2, 1992, 2pp.

Wright, Benjamin "High-tech Juice Keeps Electronic Emporiums Humming," Computerworld, Oct. 12, 1992, 3pp.

Eisenberg, Amee "Shopping for Software: It May Never Be the Same," Computer Shopper, Aug. 1992, 4pp.

Smith, Gina "Paving the Way for Online Business," printed from <http://www.communities.com/svalley.html> (Electric Communities World Wide Web Site), last updated on Feb. 20, 1996, 2pp.

"Moving Too Fast With Ipass," The Indianapolis News, section: Editorial, p. A10, Mar. 1, 1995, 3pp.

Matthews, Noah "Programs to Help Teachers With Grading, Test," The Record, Section: Lifestyle, p. E03, Jan. 2, 1996, 3pp.

Naylor, Janet, "State Looks for granders to Tally Up Kids' Score," The Detroit News, Section: Metro, Jan. 24, 1996, 2pp.

* cited by examiner

METHOD AND APPARATUS FOR A CRYPTOGRAPHICALLY-ASSISTED COMMERCIAL NETWORK SYSTEM DESIGNED TO FACILITATE AND SUPPORT EXPERT-BASED COMMERCE

The present application is a continuation of U.S. patent application Ser. No. 09/112,131, filed Jul. 8, 1998 now U.S. Pat. No. 7,523,045, entitled "METHOD AND APPARATUS FOR A CRYPTOGRAPHICALLY-ASSISTED COMMERICAL NETWORK SYSTEM DESIGNED TO FACILITATE AND SUPPORT EXPERT-BASED COMMERCE;

which is a continuation of U.S. patent application Ser. No. 08/685,706, filed Jul. 24, 1996, and issued as U.S. Pat. No. 5,862,223 on Jan. 19, 1999;

Each of the above-referenced applications is incorporated by reference herein in its entirety.

BACKGROUND OF THE INVENTION

1. Field of the Invention

The method and apparatus of the present invention relate to electronic commerce applications using digital and analog networks.

2. Background

Computerized marketplaces of all kinds are well known in the art. They range from simple classified ad bulletin boards to complex mainframe-based market systems such as NASDAQ which offers a real-time market-making system for tens of thousands of securities brokers. All modern stock, bond and commodity exchanges are supported by underlying computerized databases and related systems which enable them to function.

Typically, electronic Exchanges are designed to facilitate commercial transactions of tokens of ownership, such as shares of stock, or physical objects such as ounces of gold or a used car. Other Exchanges specialize in the sale of information stored on databases such as that provided by Lexis/Nexis, where users pay fees for accessing articles while content providers are paid per article downloaded. Still other Exchanges provide matching services where each party is seeking an efficient way to find the other, such as might be provided by a dating service or a job bank.

Exchanges whose function is to support a marketplace for the buying and selling of consulting services have been few and far between. Since is type of Exchange supports a form of commercial activity which is meant to take place in the future, the Exchange's role is to serve as a structured meeting ground for the negotiation of the service to be provided. However, an Exchange which performs this type of negotiation service creates what has heretofore been considered an unavoidable "man-in-the-middle" problem. In the process of assisting in the negotiation of a consulting contract, one or both parties must first disclose their identity to the other. Thereafter, if commerce appears likely to occur, one party can simply contact the other directly and privately, without the exchange's knowledge, thereby avoiding any costs which might otherwise have been assessed by the Exchange.

In the past, attempts have been made to establish so-called "information marketplaces" to overcome this problem by providing a wide range of supplementary services to add value to the role played by the Exchange. The most notable example of the many failed attempts to solve the problem was the American Information Exchange, AMIX, a service which was piloted in 1991 and soon thereafter disbanded by Autodesk Inc., a software development company located in Sausalito, Calif.

AMIX's goal was to establish an on-line marketplace for the buying and selling of both information and consulting services where every user could be either a buyer or a seller, with AMIX facilitating transactions between them. The AMIX system required both buyers and sellers to become a member of the service, agree to pay a monthly service fee and then purchase and install a dedicated front-end program. A self-described "electronic farmer's market," parties could negotiate agreements for the sale of information or consulting services which AMIX organized by topic. AMIX offered to serve as a non-binding mediator should the parties have a dispute and select a binding arbitrator if necessary. The system also intended to serve as a central record keeper and finds transfer point, either for the clearing of credit card charges or disbursements from pre-established accounts which AMIX managed. AMIX offered neither anonymity nor the controlled release of identity. Buyers or sellers who identified each other using the service could then bypass the service, though AMIX charged monthly fees so that the financial impact of such off-exchange activities might be offset. Furthermore, it encouraged both buyers and sellers to post comments about each other so that future buyers and sellers would be able to evaluate the past reputations of one another.

To understand the failure of AMIX, and all other prior attempts to create working expert-exchange marketplaces, it is necessary to understand that effective markets, whether they be physical or electronic, require a complete and highly specialized set of conditions in order to function and thrive. A single missing ingredient or feature of service might result in a shortage of either buyers or sellers and lead to the collapse of the Exchange—which needs sufficient quantities of both to continue operation. At the same time, the Exchange must be able to ensure that it can derive sufficient income from the commerce of its activities in order to support the Exchange's cost of operations and make a profit.

All successful Exchanges must be able to motivate significant numbers of both buyers and sellers to use the Exchange versus other available market alternatives. Thus, buyers and sellers must 1) have a high expectation of the usefulness of the Exchange which makes them willing to take the time and effort to learn the rules of the Exchange, and, if necessary, become recognized by the Exchange, 2) locate each other on the Exchange at exactly the right time and place, 3) be able to quickly and easily negotiate transaction terms, 4) reach a complete and final agreement where the expectations of the parties are well defined, 5) arrange for acceptable credit terms, 6) deliver the goods or services called for by the agreement, 7) deliver payment when the agreement is fulfilled, 8) rely on the Exchange to enforce the agreement made on the Exchange with certainty of both payment and legal recourse, 9) find the transaction fees reasonable in comparison to alternatives, and 10) have ready access to the market without levels of knowledge and cost of hardware commensurate with the value of the goods or services sold on the Exchange.

Traditional real world commerce in expertise or consulting services strongly favors circumstances where both parties are, at least occasionally, in the same place at the same time and can see one another. When there is no face-to-face contact between the parties (relying instead on mail, phone, faxes, etc.) significant burdens and costs are imposed on the parties which reduce the likelihood of expert commerce taking place. This is especially true if the parties are located in different countries where differences in language, customs, legal systems, currencies, etc., must be dealt with. Each added burden dramatically reduces the chances for agreement and increases the difficulty of satisfying all of the previously stated infrastructure conditions. Finally, if one or both of the parties in an on-line transaction is a private party (such as a part-time freelance consultant) with no established organization or commercial resources, the problems can become effectively insurmountable.

A hypothetical "worst-case" example illustrates both the range and quantity of problems associated with international consulting where the consultant is a private party. Imagine a professor of nanotechnology at the University of Makinsk, located in Kazakhstan, formerly part of the Soviet Union. Although the professor's teaching schedule keeps him fairly busy, there is not much to do in Makinsk. To relieve the boredom and to supplement his limited salary, he decides the time has come to embrace capitalism by using some of his free time to offer freelance nanotechnology consulting. The professor begins by making a list of what needs to be done before being able to sell his nanotechnology expertise.

To begin, how does he locate potential clients? Finding clients is a difficult task for any service professional. It is hard to know who needs their services, especially in a niche field such as nanotechnology. There are less than five hundred people who might want to hire a nanotechnologist and they are all located within a few dozen companies, research labs and government departments scattered around the world. The professor could rent the mailing list of The Nanotechnology Journal and send out promotional mailings, but this would be expensive and time consuming with no guarantee of success. Even more importantly, such a mailing is unlikely to reach a potential client at the exact moment which the client needs nanotechnology consulting services. Though the professor has some contacts, most of his potential customers are unknown to him, as he is to them. Personal solicitations might be more appropriate, but many of the barriers to commerce remain, including potentially insuperable language barriers. And, once he somehow identifies potential clients, how does he contact them? By mail, by phone, by e-mail? If so, how will potential clients respond to those contacts and where should they send any written materials? He cannot receive them at work and home mail delivery is notoriously unreliable in Makinsk.

Finding a potential client is just the beginning of the process, as the professor and client must now synchronize their schedules. The professor recognizes that he must arrange for freelance work which fits around his other teaching and research commitments. Without an assistant or secretary to arrange the work times, the professor is forced to manage the naturally iterative process of scheduling the work. What the professor really needs is a client whose needs precisely fit his requirements so that he can concentrate on providing the consulting, not scheduling it. His free time occurs normally on weekends and late at night, though his night availability varies widely depending on department functions and projects. Can he find work he could do on Saturday nights from 9:00-11:30 PM local time? If there are large ongoing client projects that need to be done, can he deliver his consulting in small chunks? Suppose he had thirty minutes to spare between classes every Wednesday. Could he locate a client project that required just twenty or thirty minutes to finish each week, like grading nanotechnology exams taken at some faraway university? Suppose the professor finds himself with unexpected extra time. Are there clients somewhere in the world whose time requirements can offer him projects on short notice? For example, if he didn't expect to have free time this evening, and things suddenly changed, could he possible find a client in the next few hours? How about in the next few minutes? Suppose he were willing to work at half his regular rate to compensate for the short notice?

Once the professor finds a client whose needs match the professor's timing constraints, how does he quickly and effectively establish his credentials? Though the professor is highly talented, he is still a relative unknown. The likelihood is that the client has only vaguely heard of the professor and his work. Does he mail potential clients copies of his diplomas and his PhD thesis? How will the client be certain that the information is authentic or will the client have to spend time and money to carefully check out the professor's credentials before going any fiber? Perhaps he should provide references. If so, is there any way that a potential client can quickly check those references without delaying the whole process and thus missing the window of opportunity for work that is needed right away? How can the professor demonstrate that he is capable of answering a potential client's questions without personally meeting with the client's engineers and scientists? He could mail out academic papers, but they might take weeks to arrive via international mail. There is of course also no guarantee that the client can read Russian, though the professor speaks fluent English. If he is competing with other nanotechnologists for a given assignment, how does he prove that he is not only the superior choice for the client but that he is willing to negotiate a price for his services that is at least 75% less expensive than his comparable competition in the West?

Once a deal is struck, how will the consulting work be delivered to the client? Mail is too slow and Federal Express doesn't serve Makinsk. The work could be sent by e-mail, but nanotechnology consulting is usually confidential in nature. Furthermore, assuming the work is delivered by some kind of encrypted e-mail, how can the professor get a bona fide receipt indicating that the work was actually received by the client?

Credit, payment and currency problems make the professor's consulting business even more difficult to get off the ground. If the professor is fortunate enough to locate a client, establish his credentials, agree on a specific job to be done and the price to be paid, how can he be sure that he is actually going to get paid if he delivers satisfactory work. There are many unscrupulous nanotechnology companies that have been known to prey on ex-communist scientists in the former USSR. These companies either don't pay their bills or claim that the work provided was inferior and not at all what was promised He can't get paid some part in advance, can he? Even if he extends credit to a specific client, how does the professor arrange for payment when the work is complete? He doesn't take credit cards and he certainly doesn't want to trust the Kazakhstan mail system to handle envelopes stuffed with cash. He has a small savings account at the First National Bank of Makinsk, but depositing checks from foreign accounts is viewed with suspicion and all such checks are subject to long delays and surcharges. What's more, the professor wants any payment he receives to be denominated in dollars or German marks. If he performs work for a French company, how will that company arrange to make the payment to the professor in dollars or marks? And, what happens if the client refuses to pay? Is there any recourse available other than writing the client off and never working for that client again?

Finally, suppose it the professor figures out how to do everything necessary to become a successful consultant. There's just one more thing he wants to achieve. He wants to be able to begin work for a client without revealing his identity to the client. (He may be willing to reveal his identity only after his working relationship is well established and the parties have grown comfortable with each other.) He is very concerned that if his department chairman finds out that he's doing corporate consulting, he might require that the professor give all or part of any foreign currency earnings to the university—no matter that the work was done during off hours. Even worse, the chairman could view the foreign consulting as a threat to his power and either fire the professor for unauthorized activities or forbid him from doing any freelance work, insisting that any such work must be done only by the chairman.

Supporting either all or partial anonymity in expert-based commerce, where at least one party is a private individual, currently presents almost insurmountable challenges. Communication by either standard mail or e-mail is difficult since known addresses are required. The professor could leave his name off the return address or use a false name, but the professor's identity might be easily deduced. Incoming mail from a foreign corporation might result in questions from university officials. Anonymous remailers on the Internet could be used if the work is done entirely in digital form, but what foreign company will hire an expert consultant whose name and address they don't even know? Even if anonymity were preserved, collecting payment while remaining anonymous is probably impossible without using cash which is impractical and often dangerous. And, if the professor wants to provide a client with his diplomas, published academic papers or previous client work as credentials, there is simply no way to maintain his anonymity unless he can find a third party trusted by the client who will vouch for the professor's skill while at the same time concealing his identity.

Yet, with all these hurdles, there is a strong case to be made that as tens of millions of businessmen, government officials, academics and ordinary consumers interact with each other more and more via on-line networks, and since physical distance barriers are meaningless in cyberspace, the demand for worldwide commerce in expert services will grow exponentially in the years ahead. What is needed to unlock this growth is a universally accessible facilitating system which is designed to specifically handle the buying and selling of expert services, as opposed to selling information or simply providing an electronic farmer's market. Much as computerized stock markets were invented that could seamlessly and effortlessly handle transactions of billions of shares of equities, bonds and financial instruments every day, there exists a need for expert-based markets where human experts can reliably sell their services to clients they have never met, utilizing a structured, organized system that facilitates and supports the infrastructure needed for expert commerce. What's more, such an expert market system should allow for entirely new features and qualities of service that were heretofore not possible before the rise of computers, databases and the ubiquitous Internet with its related on-line networks.

Furthermore, though the example of the professor of nanotechnology describes a seller-driven protocol whereby the expert consultant seeks to find and sell appropriate clients, it is equally logical to use the inventive system for buyer-driven applications whereby clients who need to locate and retain appropriate expert consultants can do so on an efficient, ad hoc basis.

The applicant is unaware of the existence of any such commercially viable expert exchange which contains the features described above. Therefore, it is an object of the present invention to provide an efficient method of locating and matching remote qualified experts ("experts") to customers ("clients") who need their expertise by the method and apparatus of the present invention and where the invention addresses the market mechanisms needed that prior inventions have failed to offer. Another object of the present invention is to locate qualified experts even if they are not currently registered with the Exchange. Another object of the present invention is to provide an asynchronous device and system for connecting the client with the expert, transmitting job requests from client to expert. A further object of the present invention is to authenticate the qualifications of the experts. A still further object of the present invention is to allow clients to review prior work produced by an expert. Another object of the present invention is to provide a reliable method for the expert to be paid by the client where such a method can accommodate a plurality of payment systems that may occur independently of the details of the actual payment service being used in a manner that is transparent to both the client and the expert. Another object of the present invention is to enable the expert to be assured of payment for services by the Exchange if the client does not pay for such services. Yet another object of the present invention is to allow for the Exchange to verity a client's ability to pay prior to delivering the completed analysis, or to allow clients to set up escrow accounts for payment. A still further object of the present invention is to allow the client to choose from a list of experts in a field and select a particular expert to provide service, where such service is in the form of expert advice or judgement. A further object of the present invention allows for a user to search a database of experts where the identities of the experts are concealed from the user, but the user may search a database of those experts by certain characteristics and may optionally communicate with those experts without knowing their identity. A further object of the present invention is to provide a real-time connection between the client and the expert during which negotiations can take place or during which advice or judgement can passed between the parties.

Another object of the present invention is to provide a way for clients to have experts evaluate their work. Another object of the present invention allows students to be graded by multiple evaluators. Another object of the present invention is to allow both the client and the expert to remain anonymous while practicing the invention. Another object of the present invention is to allow clients and experts to verify information that is accessible or communicated as part of practicing the invention. Another object of the present invention is to verify the client's or expert's identity and the client's ability to pay for services. Another object of the present invention is to allow for impartial dispute resolution regarding any dispute which arises from the practice of the invention. Another object of the present invention is to allow the expert to be paid for services immediately upon delivery of work contracted for while practicing the invention. Yet another object of the present invention is the ability to verify that communications occurring while practicing the invention have not been tampered with or altered during communication. A still further object of the present invention is to provide a marketplace for any party practicing the invention to either bid on services or to reach an agreement regarding a transaction for such services as the parties may desire. Another object of the present invention is to provide a method for clients to verify the quality of expert answers. Yet another object of the present invention is to provide access to the Exchange without the need for proprietary software.

SUMMARY OF THE INVENTION

In a preferred embodiment, the present invention provides a method and apparatus for an expert seeking to sell his services to more efficiently find a client, allow the client to certify and authenticate the expert's qualifications, allow the client to hire the expert under specific terms and conditions for a specific assignment, and, if desired by either party, have the service provider guarantee payment to the expert for the expert services to be provided while also guaranteeing the buyer's satisfaction with the expert service. The present invention improves the expert's ability to efficiently provide expert services and the buyer's ability to find experts capable and willing to furnish such services at a mutually agreed price and terms. A valuable application of this service is providing answers to questions that require human judgment or analysis. The system provides a simple way for users to find qualified experts to give them professional advice.

In one embodiment of this invention, a person ("end use?") who requires information from an expert accesses an on-line Exchange located at a remote server. The Exchange verifies the user's identification and account status and allows the user to produce a job request suitable for consideration by an expert. The job request includes a full description of the job to be performed, a range of money the user is willing to spend, how quickly he needs the answer, and any other information necessary to respond to the request. For example, a typical job request might be: "Attached is the text of a letter which may have been written by Catherine the Great. No later than 2:00 PM, Saturday; Jul. 20, 1996 I would like an expert in Russian history to review the letter and provide me with a detailed opinion of at least 1,000 words on whether Catherine the Great was indeed the author, and if not, who is most likely to have been the author." The user can also select "Russian history" from a "subject menu", "fifty to one hundred dollars" from the "price menu," "2:00 PM, Saturday, Jul. 20, 1996" from the "time to complete menu" and "5:00 PM, Friday, Jul. 12, 1996" from the "deadline for submitting bids" menu. The user attaches the text of the letter and e-mails the job request to the Exchange which begins the process of locating a qualified expert.

Once the job request has been sent, the end user waits to receive any bids by the bid deadline specified. As soon as the central controller at the Exchange receives the complete job request, it first searches its proprietary database of Russian history experts. Then, if additional experts are likely to be needed, it activates a search program designed to access and interrogate outside databases of known experts who might be qualified to handle the job request. This outside database search could be done using conventional paper-based directories (such as the American Medical Association's American Medical Directory which lists the doctor's educational background and any board-certified specialty), or with electronic directories available online (such as the Martindale-Hubbell Law Directory which contains entries for lawyers and law firms in the United States as well as over 140 foreign countries). In the example above, college course catalogs can be searched for an authority on late 18th century Russia, with special knowledge of Catherine the Great. Once one or more suitable experts are identified, the Exchange sends a message to the expert (e-mail, fax, beeper, phone, etc.) briefly describing the job request and asking the expert if he might be willing to consider bidding on the assignment by 5:00 PM, Friday, Jul. 12, 1996. The name of the client is not revealed. If the expert answers that he might be interested, and the user has placed no pre-qualification restrictions on who can see the job request, the full text of the job request without the user's name or address is forwarded to the expert with a request that he respond with a bid by the bid deadline. Alternatively, the user is notified of each expert's interest and is offered the opportunity to review the expert s qualifications prior to the Exchange sending out the full job request.

If, after reviewing the full job request an expert is willing to do the job, he submits a formal offer of service, essentially his bid for the job. This bid may also include his particular qualifications for the job and any special conditions which he might require be incorporated before accepting the assignment. These bids are then forwarded to the user who can then decide which experts, if any, he will hire. The end user may also simply have the Exchange select the first bid that fulfills the qualifications for the job. Alternatively, no bid may be acceptable and he may want to continue to negotiate with certain experts. In an effort to minimize off-exchange contact prior to a deal being reached, the user will typically know the experts' names but not their locations or phone numbers. (If a user ultimately does not select a candidate using the Exchange, and does not subsequently use the Exchange for a similar job within a certain number of days, he may be charged a usage fee as a percentage of the total job value or on a fixed fee basis.) The user sends a binding acceptance notification to the Exchange for each expert to be hired. The Exchange in turn notifies the expert(s) that they have been hired and the terms under which the offer of service was accepted.

In another embodiment candidate experts submit detailed applications to the Exchange in advance of receiving any job requests, providing detailed qualifications in one or more areas of expertise along with third party references. Each application is reviewed by a certification committee familiar with the subject area(s) being applied for, and the candidate is either accepted or rejected as a qualified expert. Once the Exchange contains enough experts in a given subject, each new application may be reviewed by other experts who are already members of the Exchange. This provides a basis for peer review that can be used to maintain assurance of qualifications.

Once an expert is accepted, he is added to the expert database maintained by the Exchange. When an expert is available to answer a question, he logs-in to the Exchange and provides his expert ID. The Exchange then routes any pertinent open job requests to the expert for consideration. When the expert indicates interest in an open job request, he notifies the Exchange and is provided the full request. The expert then formulates his bid, if any, digitally signs it, and e-mails it to the Exchange. Alternatively, the expert may remain off-line, with the Exchange notifying him via mail, fax, beeper, or telephone that there is an open job request for his consideration.

When a job is complete, the expert notifies the Exchange and requests payment. The Exchange verifies that the client is satisfied and executes the prearranged billing methodology between the parties. The Exchange may be holding full or partial payment in escrow which is then released. In the event that the user does not pay for the service provided, the Exchange absorbs the cost of this bad debt.

There are several variations of the present invention that allow for different levels of service, security and communication confidentiality and privacy. One such example is the ability for the user to select from a particular list of experts prior to submitting his request. In this way, the user can select and review the qualifications of the experts and choose the expert or experts that he feels most comfortable with. Using the example above, the user can look through all the historians, searching for one with the most relevant expertise on Catherine the Great. The user can look for historians in a particular subject, or historians with a given amount of experience. He can also review a complete profile of the historian, including journal articles or samples of previous client work. The user might also communicate to the Exchange using encrypted transmission and require that all communication about the job to potential experts also be encrypted to prevent unwanted parties from reviewing the job request materials. (If it were known that a manuscript possibly penned by Catherine the Great had been recently discovered, the market for other Russian manuscripts might be affected.)

Another embodiment of the present invention allows the expert and the user to communicate directly once they are put in contact with each other through the Exchange. This allows the user to receive real-time feedback on requests. For example, once the user has asked about an article and the expert has responded, the user may have more questions about the expert's comments. In a synchronous communication system, the user is able to ask as many follow-up questions as necessary. One way to achieve this is through a standard telephone connection. The Exchange can set up a time to contact the user and expert and call them both to connect them. It is ideally suited to bill the user for the amount of phone time connected, thus making it possible to support an ad hoc pay-per-minute service between two parties, one or both of whom may not know the identity of the other party. Such synchronous communications may also take the form of digital text transmitted between expert and user.

The present invention is also valuable because it facilitates a universally applicable payment protocol for the expert providing advice. In one embodiment, the present invention provides experts immediate payment for services rendered with almost no overhead. The expert does not have to be a bank-approved merchant to process credit card orders, deal with personal checks, cash, or non-payment issues. This allows the expert to maximize his earning potential by focusing on providing quality service.

In another embodiment of the present invention the Exchange manages the billing and payment system automatically. The end user's ability to pay for services is verified prior to the request reaching the expert. In order to receive service, the user must have a credit card, debit card, checking or savings account, or other certified electronic funds available. When a request for services is submitted, the Exchange verifies the end user's balance and refuses to submit the request if the user cannot pay. Once the expert responds to the request, the user's account is immediately debited for the expert's fee.

In yet another embodiment of the present invention, a grading application is provided. A student looking to improve the quality of his work can send an expert evaluation request to the Exchange. This request includes a copy of the work to be evaluated, such as a book report, biology paper, or set of math questions. The Exchange finds experts to evaluate the work and respond with feedback. For example, if a student is writing a report on Hamlet, the Exchange could find an expert on Shakespeare to evaluate the report. As always, the expert would be paid accordingly for his services.

It is also possible for teachers and professors to take advantage of the service. The homework and reports submitted to a teacher for grading, for example, can be distributed to experts via the Exchange, a kind of digital piecework. A math teacher might have one hundred math tests to grade. The tests are divided up into groups of twenty and distributed among five certified math experts to be evaluated and returned in forty-eight hours. The students' work is sent to the Exchange electronically or via fax for distribution. The teacher can specify the grading methods to be used and the correct answers to the questions. Once the tests are evaluated and returned to the Exchange by the experts, the Exchange reassembles them into one transmission and sends them back to the teacher. The experts are then paid for their services.

The ability to provide anonymity to the end user and expert is another advantage of the present invention. The Exchange can provide full or partial anonymity (e.g., providing no information about the expert, or representing only that he is a member of a specific professional organization) because it acts as a trusted third part messenger between the two parties. It can conceal the identity of both people using very simple or very complex techniques depending on the level of security required.

There are many situations where the end user night not want his identity to be compromised. For example, a company president might want to find out information on how the public sees his company. The president would certainly like honest answers and would like to remain anonymous when making the request. Likewise, an expert who uses the products might not want the company to know his identity because he does a lot of business with the company. In a criminal investigation, the expert witness may not want to reveal his identity for fear of being threatened by the accused. Also, people who have committed a crime might seek legal or moral advice from outside experts.

In other cases, the service itself may want to intentionally withhold the identity of one or both parties to a potential transaction in order to assure that it will be paid for its having brought the parties together. Once one or both parties are able to contact each other outside the service's view, the service has no way to know whether the transaction was consummated privately.

Authentication of the user and the expert is also a benefit of the present invention. Using cryptography and biometrics, the Exchange can authenticate the identity of the parties. The algorithms used can also verify that the expert response and ID have not been tampered with after the response has been sent to the Exchange. Digital signatures, for example, provide both message integrity and authentication of authorship. The present invention also allows for a viable "expert service market" by enabling both users and experts to bid on services. An electronic auction can be implemented which allows users to bid for an expert's time, experts to bid on user requests, and users and experts to negotiate on the price of services. Such services could be sold on a prepaid basis where the expert agreed to provide a certain number of hours of real-time consulting where such consulting was performed through a connection monitored by the Exchange for purposes of accounting and tracking.

In another embodiment of the present invention a quality monitoring feature is provided. If the user is dissatisfied with a response, the Exchange forwards the request and the response to another qualified expert for review. This peer review either accepts or rejects the response, and appropriate action is taken. For example, if the response is accepted, the end user is notified that the response is correct and accurate. If the response is rejected, the end user is refunded or offered an alternate expert, and the expert is notified that his response was inadequate.

The present invention enjoys the advantage of not requiring proprietary software. Any communications tool that conforms to the standards published by the Exchange is capable of using the service. Simply reaching the service's website on the internet, for example, allows for any person capable of receiving e-mail to use the service. Standardized encryption techniques, including public key protocols can be used to ensure privacy and message integrity. Furthermore, since the service is designed to reach out and find experts, a party can use the service and be paid in digital cash or wire transfer without ever having first registered with the service in any way.

It is the goal of the present invention to provide a robust system which matches users' requests with expert answers. The invention provides various methods of communication, commerce and security for the expert and the end user. The power of a central controller at an Exchange to maintain billing, collection, authentication and anonymity makes the present invention an improvement over conventional systems which do not have such an arrangement of elements. By combining various arrangements of these elements into one system, the present invention makes the finding, selling and transferring of expert advice fast, simple, efficient and market competitive.

APPLICATIONS OF THE INVENTION

In order to clarify the application of the present invention, the following examples demonstrate potential needs of end users.
1. I want a draft of an academic paper on quantum mechanics reviewed anonymously by three qualified academics not located in the U.S. The answers, which are due by Jul. 15, should be at least 500 words and must explain the three points with which the reviewers most agree and disagree.
2. I am a businessman in the steel salvage business with a question as to how to handle a personnel problem. I would like my question answered by a personnel professional at a Fortune 1000 company who is not in the steel business and who has dealt with the same or similar problem at least five times in their our company and can thus give me a range of possible results based on his own experience. I am willing to pay $100 for answers of at least 250 words. Anonymity is acceptable, but I will pay an extra $100 if the professional is identified to me, and I am allowed to call the professional in his off hours.
3. I am an attorney who is seeking other businesses who have had a problem with the XYZ company's plastic products. I will pay $50 for each documented example of problems you have experienced first hand, up to a maximum of 100 cases.
4. I am looking to decode a hieroglyphic unearthed on a site in Israel. I will pay $50 for each solution of at least 10 words, and $500 for the complete solution. Answers will be accepted from four candidates who send me their credentials.
5. I have 1,000 English literature final exams that I need graded. Each exam is composed of ten short essay questions. Tests and answers can be e-mailed to you in groups of twenty exams, and must be graded and returned via e-mail no later than Jun. 10, 1997. I will pay $2.00 per graded exam. Graders must be practicing English teachers at the college level and follow the grading guidelines which will be sent to you.
6. To all people who have eaten at my restaurant, I will pay you $5.00 for a 100 word description of how to improve my service or my menu. (Limit 50 people.)

BRIEF DESCRIPTION OF THE DRAWINGS

FIG. 17 illustrates an embodiment where the end user connects to an online service and is assigned a message window.
FIG. 18 illustrates an embodiment of the end user interacting with a message window.
FIG. 19 illustrates an embodiment showing how the expert connects to an online service and enters a message window.
FIG. 20 illustrates an embodiment of the expert interacting with a message window.

DETAILED DESCRIPTION OF THE INVENTION

The method and apparatus of the present invention will now be discussed with reference to FIGS. 1, 2, 3, 4, and 5. In a preferred embodiment, the present invention includes end user interface 500, central controller 200, associated databases, and expert interface 400. The present invention identifies the appropriate expert, supervises the distribution of requests to the appropriate experts, and supplies timely answers to the end user. Thus, a person looking for expert knowledge can receive it in a simple, cost and time effective manner.

System Architecture

Figure 1:
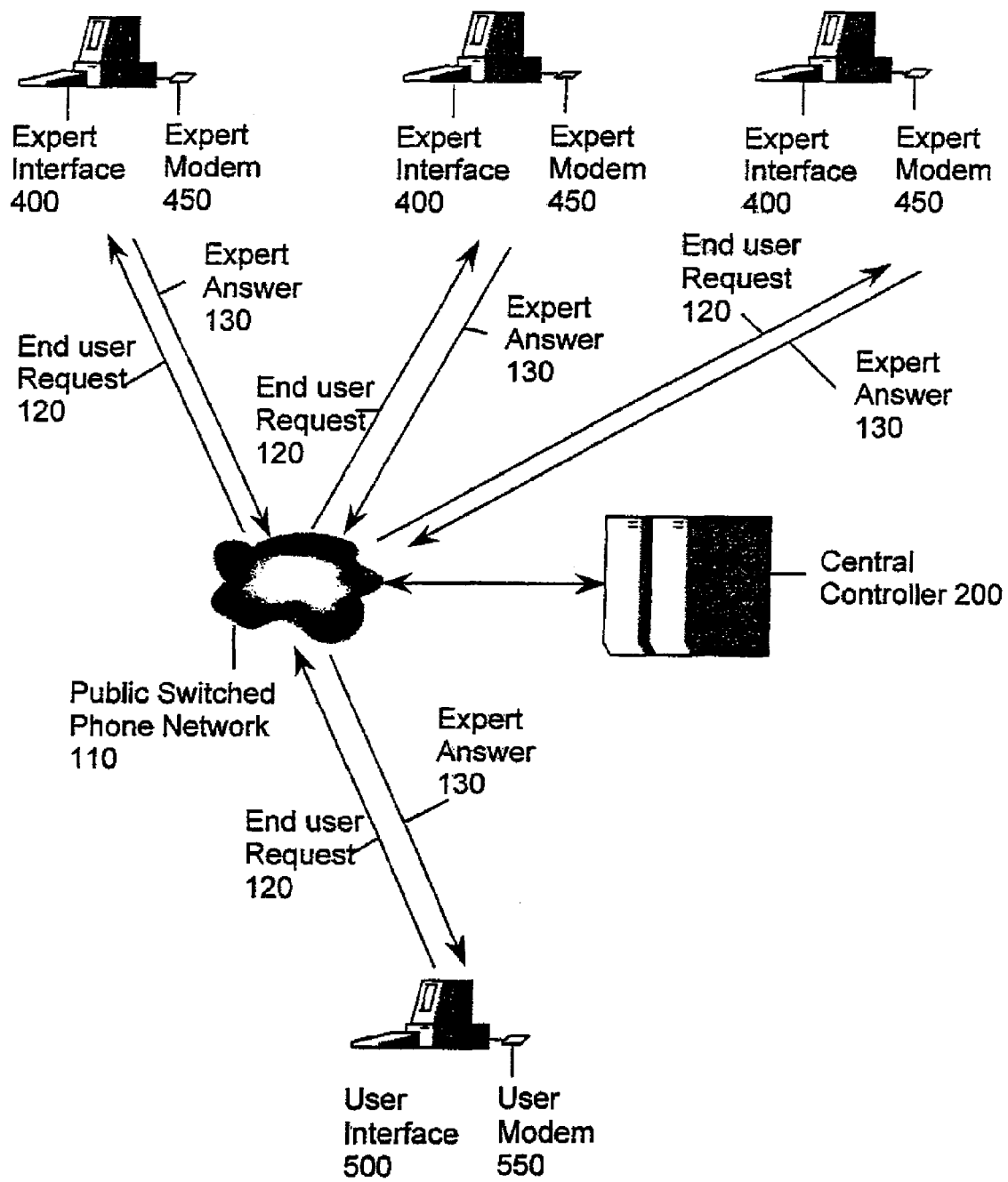
FIG. 1 illustrates a first embodiment of the present invention.

The system architecture of a first embodiment of the apparatus and method of the present invention is illustrated with reference to FIGS. 1 through 5. As shown in FIG. 1, the apparatus of the present invention comprises expert interface 400, central controller 200; and end user interface 500 (collectively the "nodes"). Each node is connected via an Internet connection using a public switched phone network 110, such as those provided by a local or regional telephone operating company. Connection may also be provided by dedicated data lines, cellular, Personal Communication Systems ("PCS"), microwave, or satellite networks. Expert interface 400 and user interface 500 are the input and output gateways for communications with central controller 200.

Using the above components, the present invention provides a method and apparatus to receive questions or inquiries requiring judgmental analysis, identify qualified experts, transmit such inquiries to them, and forward corresponding answers to the end user. Through the method and apparatus of the present invention, end users can efficiently select the qualifications of the experts, and receive verification of the experts' qualifications.

Figure 2:
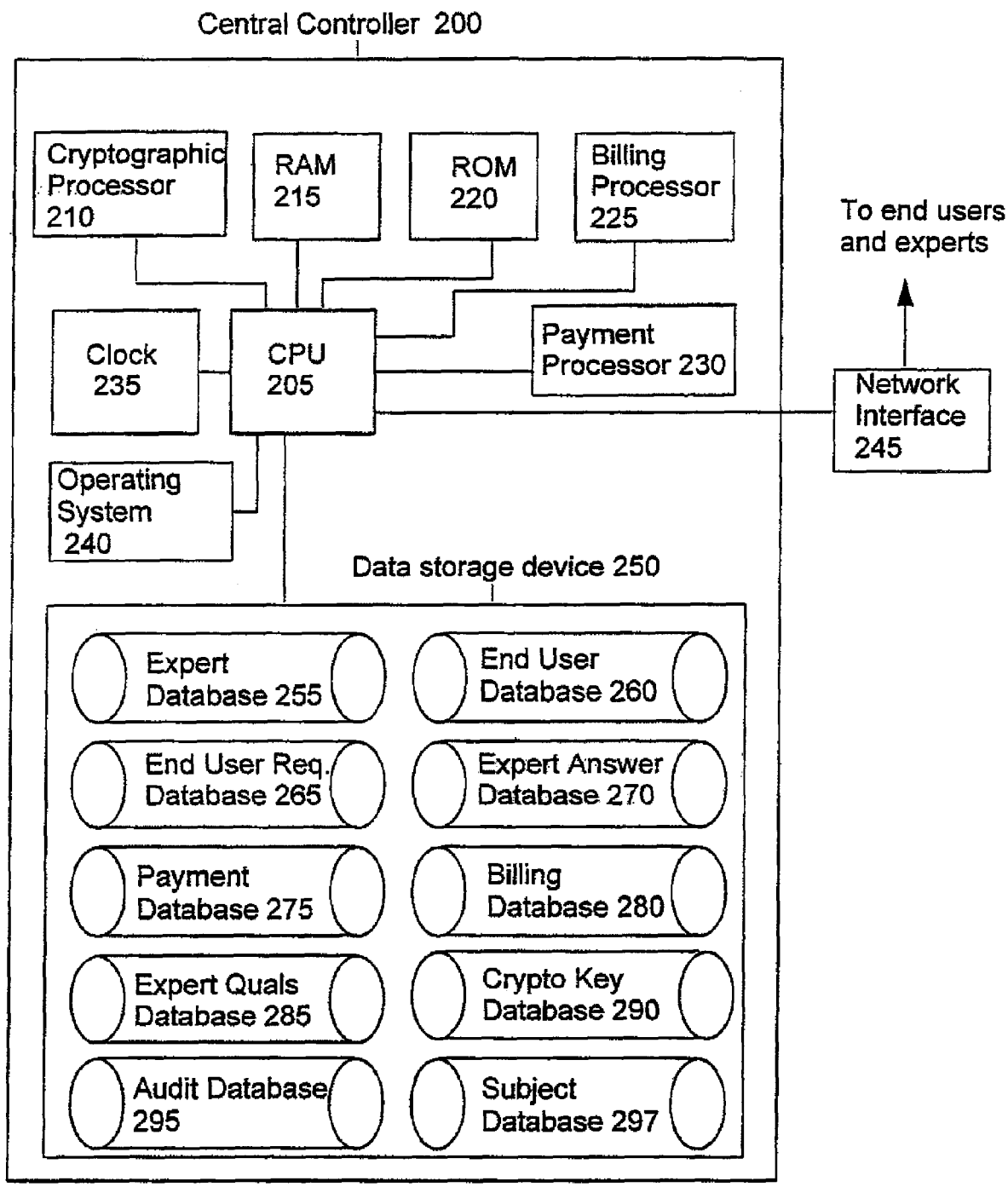
FIG. 2 is a block diagram showing one embodiment of the central controller.

As shown in FIG. 2, central controller 200 includes central processor (CPU) 205, cryptographic processor 210, RAM 215, ROM 220, payment processor 230, billing processor 225, clock 235, operating system 240, network interface 245, and data storage device 250.

A conventional personal computer or computer workstation with sufficient memory and processing capability may be used as central controller 200. In one embodiment it operates as a web server, both receiving and transmitting data inquiries generated by end users. Central controller 200 must be capable of high volume transaction processing, performing a significant number of mathematical calculations in processing communications and database searches. A Pentium microprocessor such as the 100 MHz P54C, commonly manufactured by Intel Inc., may be used for CPU 205. This processor employs a 32-bit architecture. Equivalent processors include the Motorola 120 MHz PowerPC 604 or Sun Microsystems 166 MHz UltraSPARC-I.

An MC68HC16 microcontroller, commonly manufactured by Motorola Inc., may be used for cryptographic processor 210. Equivalent processors may also be used. This microcontroller utilizes a 16-bit multiply-and-accumulate instruction in the 16 MHz configuration and requires less than one second to perform a 512-bit RSA private key operation. Cryptographic processor 210 supports the authentication of communications from both the experts and end users, as well as allowing for anonymous transactions. Cryptographic processor 210 may also be configured as part of CPU 205. Other commercially available specialized cryptographic processors include VLSI Technology's 33 MHz 6868 or Semaphore Communications' 40 MHz Roadrunner 284.

Referring again to FIG. 2, billing processor 225 and payment processor 230 comprise conventional microprocessors (such as the Intel Pentium), supporting the transfer and exchange of payments, charges, or debits, attendant to the method of the apparatus. Either processor (225 or 230) may also be configured as part of CPU 205. Processing of credit card transactions by these processors may be supported with commercially available software, such as the Secure Webserver manufactured by Open Market, Inc. This server software transmits credit card numbers electronically over the Internet to servers located at the Open Market headquarters where card verification and processing is handled. Their Integrated Commerce Service provides back-office services necessary to run Web-based businesses. Services include online account statements, order-taking and credit card payment authorization, credit card settlement, automated sales tax calculations, digital receipt generation, account-based purchase tracking, and payment aggregation for low-priced services.

Data storage device 250 may include hard disk magnetic or optical storage units, as well as CD-ROM drives or flash memory. Data storage device 250 contains databases used in the processing of transactions in the present invention, including expert database 255, end user database 260, end user request database 265, expert answer database 270, payment database 275, billing database 230, expert qualifications database 285, and cryptographic key database 290. In a preferred embodiment database software such as Oracle 7, manufactured by Oracle Corporation, is used to create and manage these databases.

Expert database 255 maintains data on the experts, including name, address, private key information, email addresses, physical addresses, payment preferences, rates, availability standards, voice mail addresses, expert profile 155, biographies, past expert answers 130, and respective subject areas of expertise. Expert profile 155 includes automatic bid amounts, minimum completion times, acceptable price ranges, and the like, Expert database 255 includes rating information generated by end users, as well as expert address 145, which is used to direct communications to the expert. Expert address 145 comprises a phone number, web page URL, bulletin board address, pager number, telephone number, email address, voice mail address, facsimile number, or any other way to contact the expert. Expert database 255 also stores all bid requests 160 and bid offers 165 generated by the expert. Advertising data generated by the expert may also be stored in this database.

End user database 260 maintains data on end users, such as name, address, phone number, ID number, email address, payment preferences, past system usage, private key information, etc. It also contains end user profile 150, which stores preferences for required response time, acceptable qualification levels, acceptable price levels, automatic bid amounts, and the like. It also contains copies of each bid request 160 and bid offer 165 generated by the end user.

End user request database 265 includes all end user requests 120 received by central controller 200, indexed by subject. A unique tracking number is also stored for each end user request 120. End user request database 265 also stores the grading request 125, which is a set of questions and answers generated in the grading embodiment. All requests 115 are also stored in this database.

Expert answer database 270 archives all expert answers 130 received by central controller 200. This database is indexed by expert answer 130 tracking number.

Payment database 275 and billing database 280 track all commercial transactions, as well as payment and billing preferences. These databases are valuable in the event of complaints by both end users and experts regarding payment, because an audit trail can be produced.

Expert qualifications database 285 maintains expert qualifications 140 on the expert's professional, academic, and industry qualifications, such as licenses, degrees, publications, experience, certifications, professional education, skill sets, languages, location, response times, rates, resume, etc. These qualifications may be stored in multimedia form (e.g. text, video, audio) and transmitted to end users looking for further qualification data about an expert. In an alternative embodiment, expert qualifications database 285 and expert database 255 can be combined into a single database.

In order to facilitate cryptographic functions, there is cryptographic key database 290 which stores both symmetric and asymmetric keys. These keys are used by cryptographic processor 210 for encrypting and decrypting all end user requests 120 and expert answers 130, as well as message traffic such as bid amounts or offers and acceptances of work. Audit database 295 stores transactional information that may be retrieved for later analysis. Text data from chat rooms might be stored in this database, for example, so that end user complaints about service can be independently verified.

Network interface 245 is the gateway to communicate with end users and experts through respective end user interface 500 and expert interface 400. Conventional internal or external modems may serve as network interface 245. Network interface 245 supports modems at a range of baud rates from 1200 upward, but may combine such inputs into a T1 or T3 line if more bandwidth is required. In a preferred embodiment, network interface 245 is connected with the Internet and/or any of the commercial online services such as America Online, CompuServe, or Prodigy, allowing end users access from a wide range of online connections. Several commercial email servers include the above functionality. NCD Software manufactures "Post.Office", a secure server-based electronic mail software package designed to link people and information over enterprise networks and the Internet. The product is platform independent and utilizes open standards based on Internet protocols. Users can exchange messages with enclosures such as files, graphics, video and audio. The system also supports multiple languages. Alternatively, network interface 245 may be configured as a voice mail interface web site, BBS, or email address.

Figure 3:
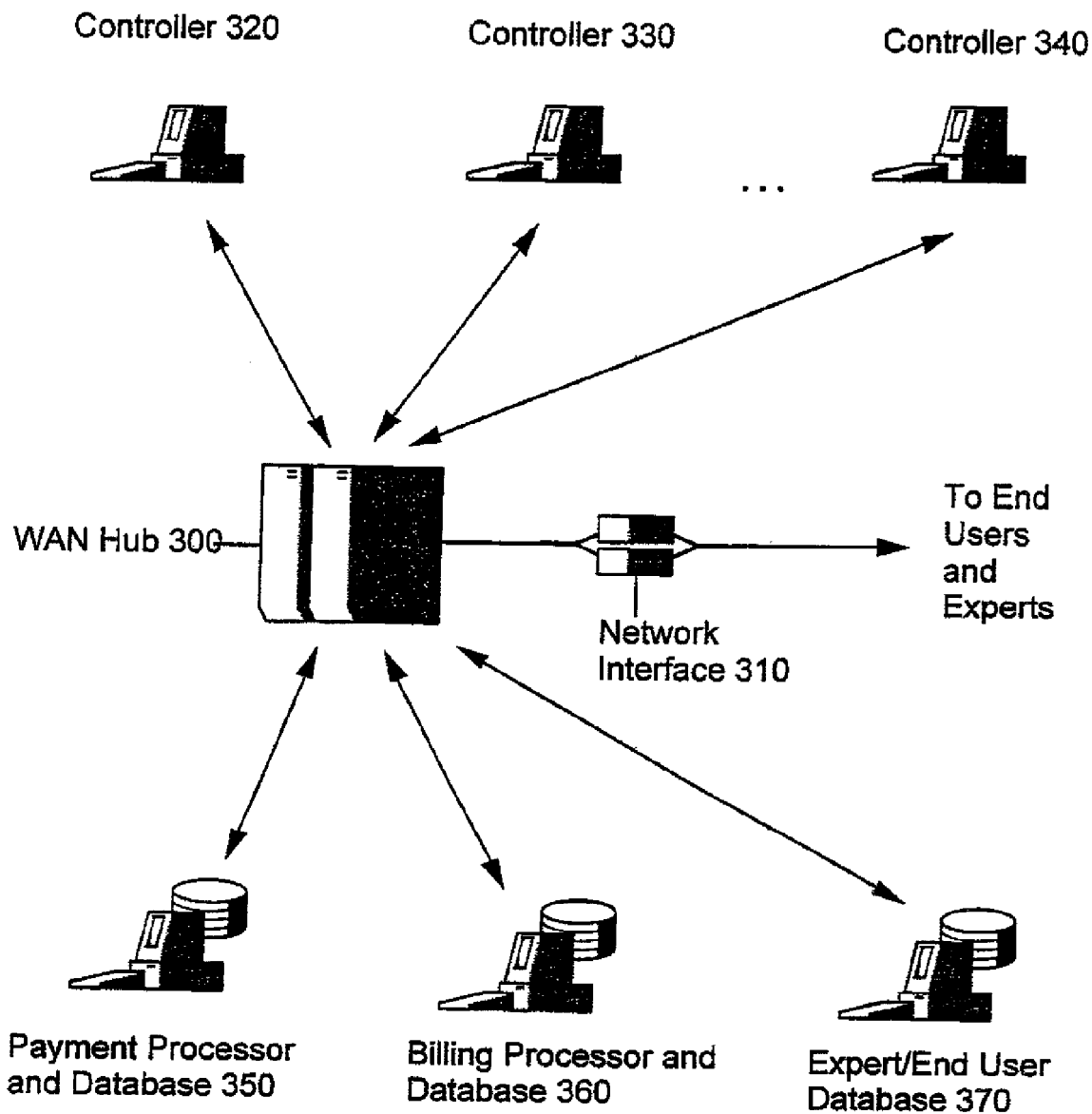
FIG. 3 illustrates an embodiment in which the computing resources of the central controller are distributed over a number of servers.

While the above embodiment describes a single computer acting as the central controller, those skilled in the art will realize that the functionality can be distributed over a plurality of computers. In another embodiment, central controller 200 may be configured in a distributed architecture, as shown in FIG. 3, wherein the databases and processors are housed in separate units or locations. Controllers 320 through 340 perform the primary processing functions and contain at a minimum RAM, ROM, and a general processor. Each of these controllers is attached to WAN hub 300 which serves as the primary communication link with the other devices. WAN hub 300 may have minimal processing capability itself, serving primarily as a communications router. Although only three controllers are shown in this embodiment those skilled in the art will appreciate that an almost unlimited number of controllers may be supported. In such a configuration, each controller is in communication with its constituent parts, but the processor and/or data storage functions are performed by stand-alone units. Payment processor and database 350, billing processor and database 360, and expert/end user database 370 all communicate through WAN hub 300 with controllers 320 through 340. This arrangement yields a more dynamic and flexible system, less prone to catastrophic hardware failures affecting the entire system.

Figure 4:
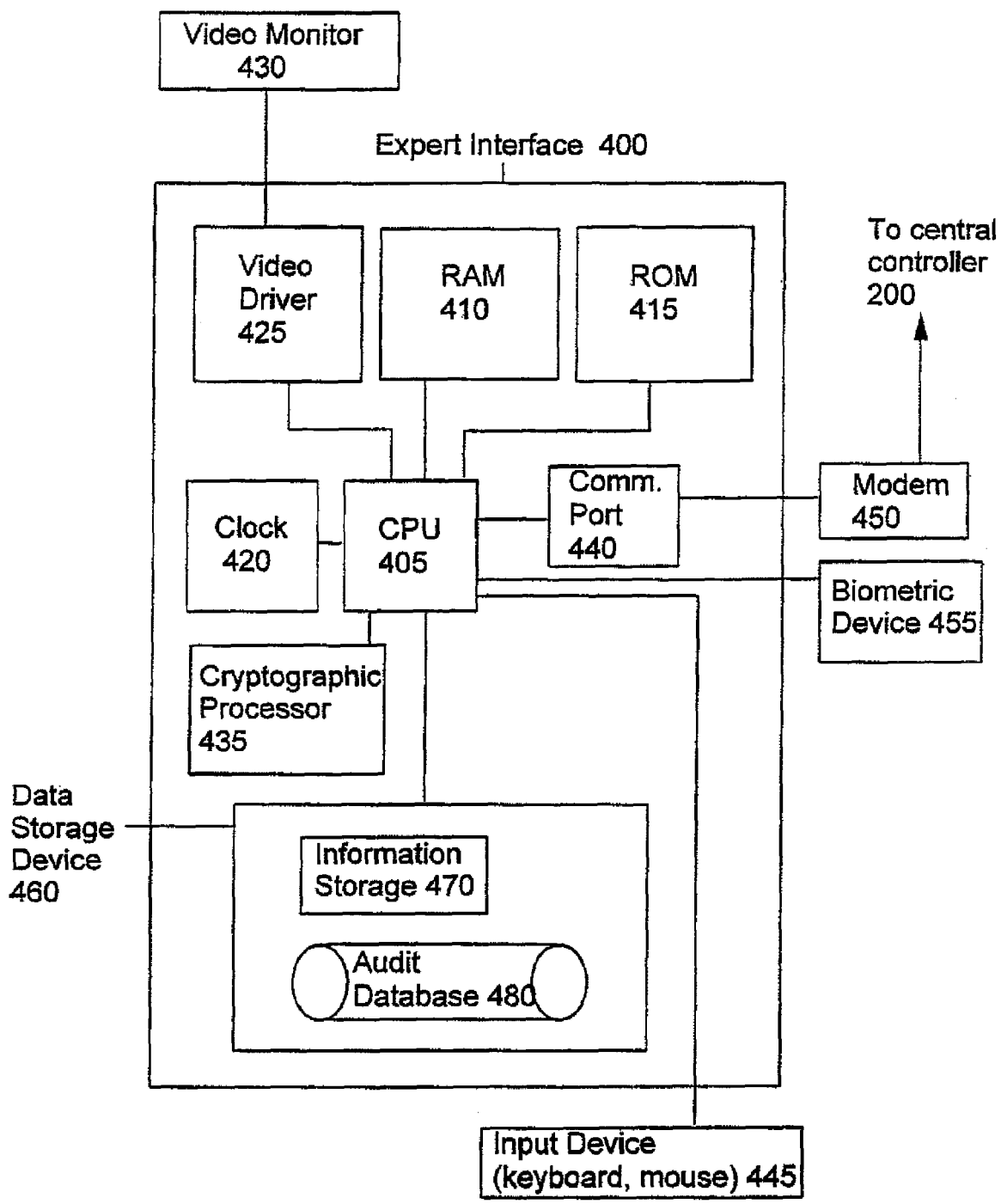
FIG. 4 is a block diagram showing an exemplary expert interface.
Figure 5:
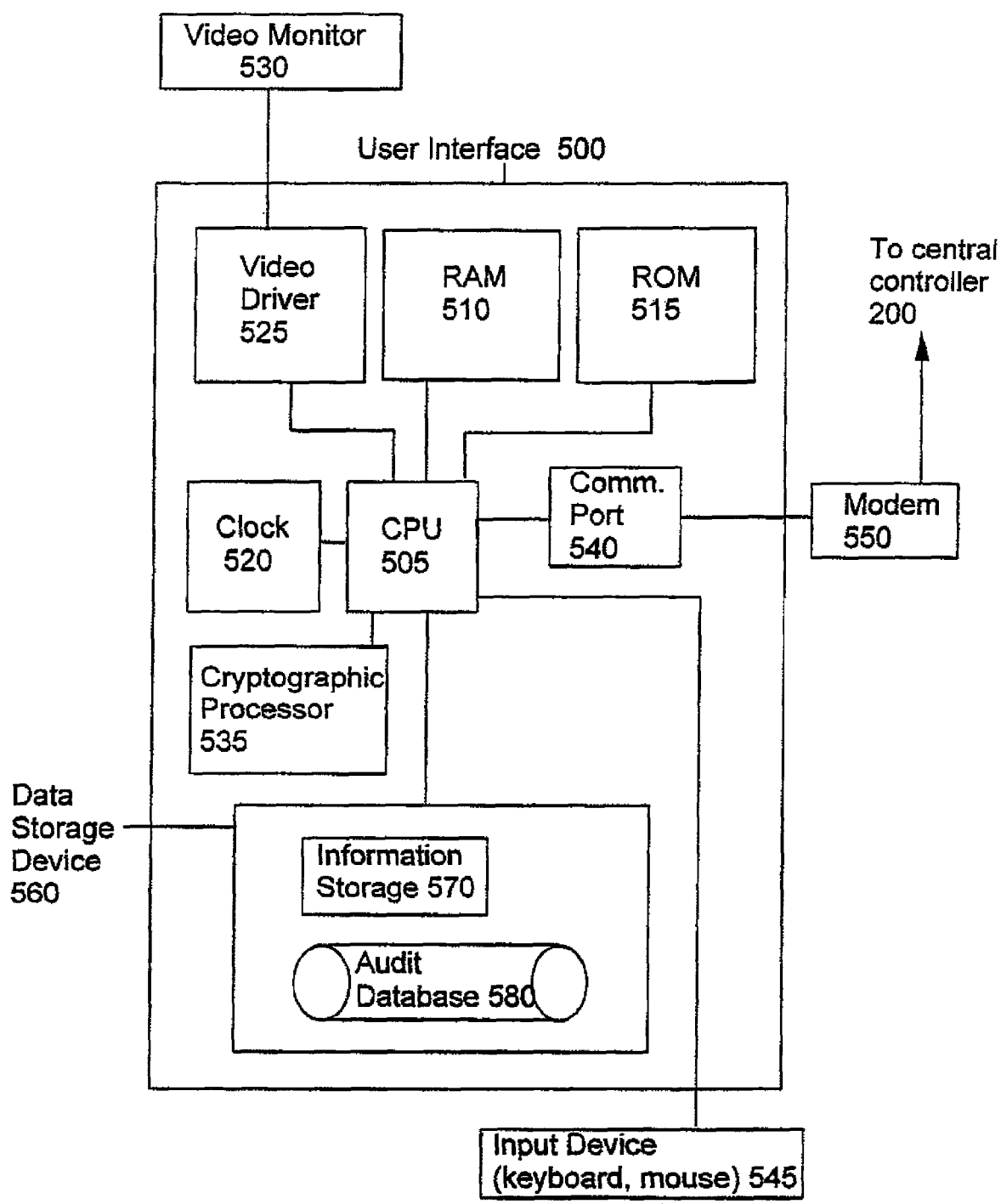
FIG. 5 is a block diagram showing an exemplary user interface.

FIGS. 4 and 5 describe expert interface 400 and end user interface 500, respectively. In an exemplary embodiment they are both conventional personal computers having an input device, such as a keyboard, mouse, or conventional voice recognition software package; a display device, such as a video monitor; a processing device such as a CPU; and a network interface such as a modem. Alternatively, expert interface 400 and end user interface 500 may also be voice mail systems, or other electronic or voice communications systems. As will be described further in the following embodiments, devices such as fax machines or pagers are also suitable interfaces.

Referring now to FIG. 4, there is described expert interface 400 which includes central processor (CPU) 405, RAM 410, ROM 415, clock 420, video driver 425, video monitor 430, communication port 440, input device 445, modem 450, and data storage device 460. Cryptographic processor 435 and biometric device 455 may be added for stronger authentication as described later.

A Pentium microprocessor such as the 100 MHz P54C described above may be used for CPU 405. Clock 420 is a standard chip-based clock which can serve to timestamp expert answers 130 produced with expert interface 400. Modem 450 may not require high speed data transfer if most expert answers 130 produced are text-based and not too long.

If a cryptographic processor is required, the MC68HC16 microcontroller described above is used. The structure of biometric device 455 will be described below in conjunction with the cryptographic authentication embodiment.

Data storage device 460 is a conventional, magnetic based hard disk storage unit, such as those manufactured by Conner Peripherals. Information'storage database 470 may be used for archiving expert answers 130, while audit database 480 may be used for recording communications with central controller 200 as well as payment records.

Referring now to FIG. 5, there is described end user interface 500 which includes central processor (CPU) 505, RAM 510, ROM 515, clock 520, video driver 525, video monitor 530, cryptographic processor 535, communication port 540, input device 545, modem 550, and data storage device 560. All of these components may be identical to those described in FIG. 4.

There are many commercial software applications that can enable the communications required by expert interface 400 or end user interface 500, the primary functionality being message creation and transmission. Eudora Pro manufactured by Qualcomm Incorporated, for example, provides editing tools for the creation of messages as well as the communications tools to route the message to the appropriate electronic address.

Asynchronous Communications Embodiment

In one embodiment of the present invention, communications between end users and experts take place asynchronously. The end user creates an end user request 120, transmits it to central controller 200, and then disconnects from the network. The expert generates an expert answer 130, transmits it to central controller 200, which then transmits it to the end user. The end user and expert do not communicate in real time.

Figure 6:
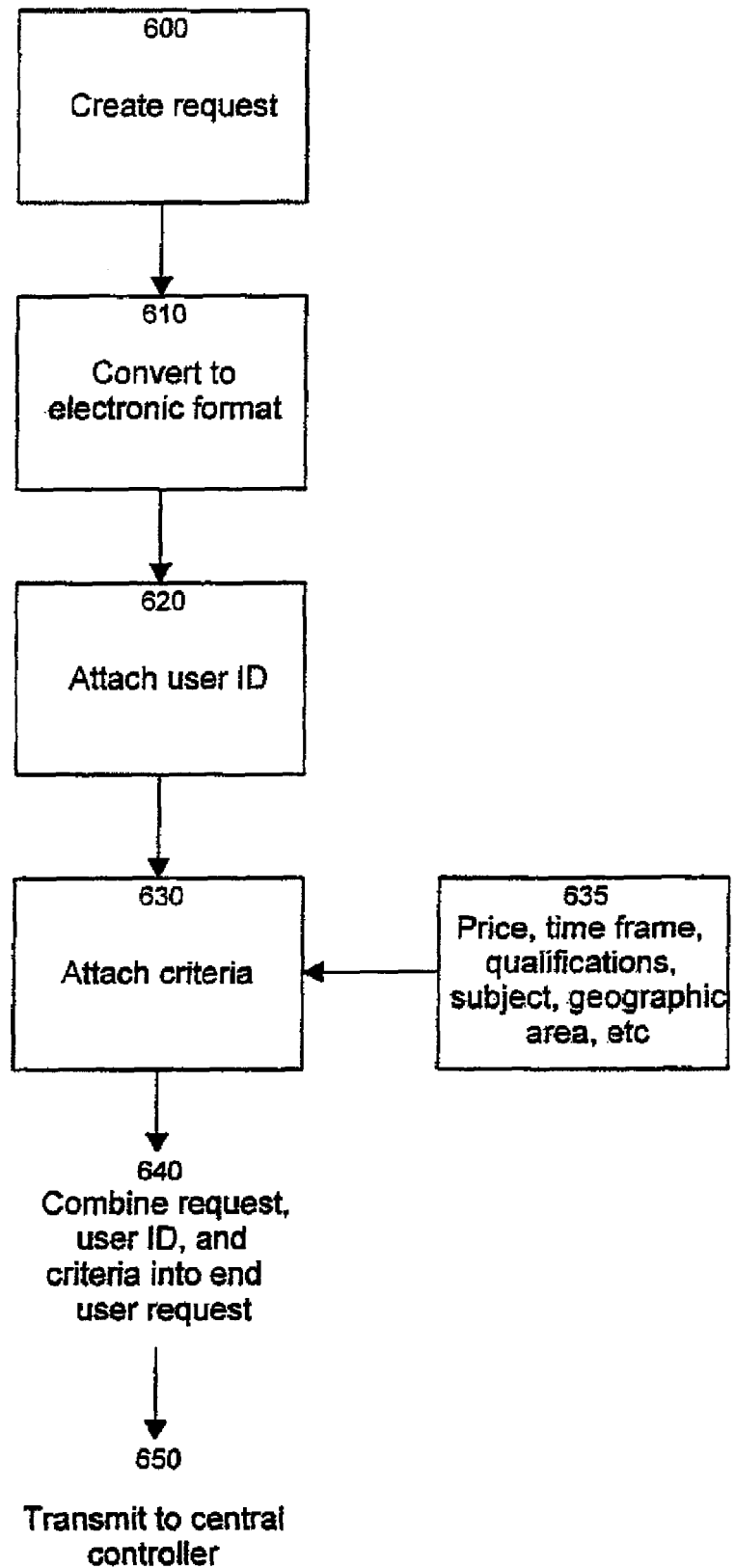
FIG. 6 illustrates an embodiment showing how an end user request is generated.

With reference to FIG. 6, there is described the process by which the end user formulates end user request 120. The end user first creates a request 115 at step 600, such as a question which requires human judgement, evaluation, analysis, etc. A small business owner, for example, might want to learn new strategies for lowering his tax bill. Multiple questions may also be bundled into one request 115. At step 610, the end user converts request 115 into electronic format, if necessary. Once converted, the end user attaches his name or a unique user ID number to request 115 at step 620. This ID number is received from central controller 200 when the end user registers for the service, or is chosen by the end user and then registered with central controller 200 by phone. Central controller 200 maintains a database of end user ID numbers in end user database 260, and issues (or allows) only unique numbers. If less security is required, the user's telephone number could serve as the ID number since it has the advantages of being both unique and easily remembered.

At step 630, the end user attaches criteria 117 to request 115. At step 640, both the user ID and criteria 117 are combined with request 115, producing a complete end user request 120. As shown at step 635 in FIG. 6, criteria 117 include at least one of the following: price, time frame required for answer, qualifications of the expert, subject, geographic location, etc. This information is used by central controller 200 to route end user request 120 to experts meeting criteria 117. Criteria 117 are searchable; thus central controller 200 searches expert database 255 for appropriate experts to answer end user request 120 based on criteria 117. Criteria 117 will typically describe the required subject area of the expert, as well as the level of expertise necessary to answer end user request 120. Sample subject areas include medicine, law, mathematics, car repair, multimedia editing, etc. Within a given subject there may be many levels, such as ten levels of car repair expertise. There may be a specific format for criteria 117, requiring the end user to use a given set of words and symbols such as "PRICE<=200 and SUBJECT=Biology and QUALIFICATIONS=level 4 and RESPONSE TIME<=2.0 hours." The end user may also designate price, response time, and payment terms as criteria 117 of end user request 120.

Criteria 117 are met by expert qualifications 140. As part of the registration process for candidate experts, their expert qualifications 140 are established by central controller 200. To be a level four patent attorney, for example, the expert might have to submit a copy of his bar results, and prove that he has had at least five years of work experience in patent law. He might also be required to submit references for three recent clients. In one embodiment, a certification means is provided whereby central controller 200 takes a more proactive role by searching databases for expert qualifications. Using a set of predetermined instructions, central controller 200 first establishes the subject of criteria 117. This subject is then correlated with an appropriate database of experts. A subject of "law," for example, is correlated with legal directories while a subject of "medical" is correlated with medical directories. This database is then queried with the candidate's information, allowing the system to certify the qualifications of a candidate expert. With a subject of "law," for example, an appropriate database is the Martindale-Hubbell Law Directory which contains over 900,000 entries for lawyers and law firms in the United States as well as over 140 foreign countries. A search is performed using the name of the candidate expert in order to see if there is a listing. This search could be performed automatically for every candidate requesting certification of legal qualifications. If the candidate expert represents a field for which there is no online database available, more general databases could be used. A writer, for example, might claim to have written articles for several major newspapers about trends in the pharmaceutical industry. These qualifications are easily certified by searching Lexis/Nexis for those particular newspapers for samples of his work. Individual companies could provide access to their own in-house personnel databases. A big six accounting firm, for example, could allow limited access to the names of current and past employees, allowing central controller 200 to automate the verification of employment history for many accountants.

Alternatively, a candidate expert might submit expert qualifications 140 for review by a committee of higher level experts. In order to be approved as a level four patent attorney, for example, an expert might have to receive the approval of a committee of level five patent attorneys. This committee would be selected by central controller 200. In this way, the burden of qualification falls primarily on the experts themselves, not on central controller 200. A hierarchy of experts is created, similar to the digital certificate authorities used for verifying public keys in cryptographic protocols. If each expert has a unique cryptographic key, the identity of each higher level expert approving him may be incorporated into this key. Every expert answer 130 that the expert creates, therefore, would contain information about the experts who approved him. Communications with the reviewing experts are performed by the same method and apparatus as described in this asynchronous communications embodiment.

In another embodiment, expertise is provided not by a human expert, but by a conventional expert system, neural network, or software using artificial intelligence. An expert system specializing in the diagnosis of blood disorders, for example, could perform key word searches on end user requests 120. These key words would become the input parameters upon which the expert system would base its decision.

Referring again to FIG. 6, end user request 120 is then transmitted to central controller 200 at step 650. This transfer occurs via electronic mail, although the system also supports voice mail, facsimile, or postal mail transmissions of end user requests 120. With voice mail, the end user calls central controller 200 and leaves end user request 120 in audio form. These end user requests 120 may be transcribed into digital text at central controller 200, or made available to experts in the same audio format. In a postal mail embodiment, central controller 200 acts more like a router, directing end user requests 120 to the proper experts, creating multiple copies of end user request 120 if necessary. End user requests 120 may also be posted to bulletin boards or web pages operated by central controller 200. In a web-based embodiment, end users may fill out an electronic form built into the web page of central controller 200.

It is important to note that the generation and transmission of end user request 120 does not require the use of proprietary software. Conventional electronic mail software such as Eudora Pro, for example, is capable of providing editing tools for the creation of messages as well as the communications tools to route the message to the appropriate electronic address. As long as the messages common to the standards established by central controller 200, an electronic mail program is capable of generating and transmitting end user request 120. The standard would specify the address to send the message to, the information to be contained in the subject heading, and the processing order of the body of the message. The first line of the body of the electronic mail, for example, is the ID number of the end user. The second line is their name, the third line is the subject, the fourth is the qualifications required, and the fifth line is the price. Standard forms could also be electronically mailed to the end user, allowing him to simply fill in the blanks and return end user request 120 to central controller 200. Similar forms and standards could be applied to fax and postal mail transmissions.

Figure 7:
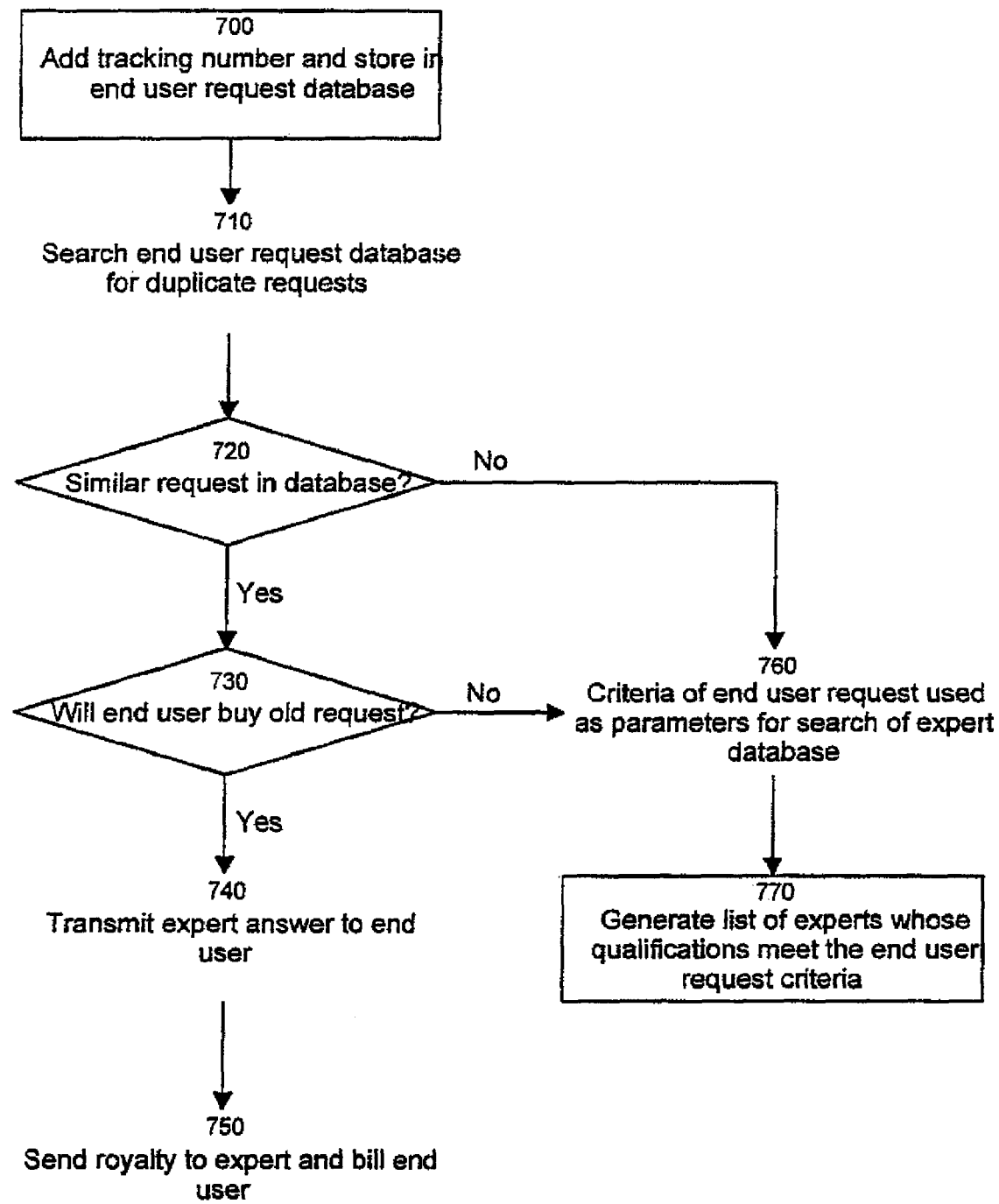
FIG. 7 illustrates an embodiment showing the initial processing of an end user request.

Referring now to FIG. 7, end user request 120 is received, stored, and processed by central controller 200 before being routed to the appropriate experts. At step 700, end user request 120 is received from the end user. Central controller 200 supports all transmission methods described at step 650, allowing for a wide variety of formats of incoming end user requests 120. Some formats may be changed, however, before further processing by central controller 200. End user requests 120 transmitted by mail in paper form, for example, may be scanned-in and digitized, using optical character recognition software to create digital text. Once end user request 120 has been received, it is stored in end user request database 265 where it is assigned a unique tracking number.

After being stored at step 700, end user request 120 may go through a series of processing steps. One step, if necessary, is language translation, either creating a standard language that all end user requests 120 must be written in, or translating to the language most appropriate for the experts to which it will be sent. This translation is provided by language experts registered with the system, or by automatic translation software such as Systran Professional, manufactured by Systran Software. Twelve bi-directional language combinations are available, including English to/from French, Italian, German, Spanish, Portuguese, and Japanese. Another step, if necessary, is to edit for spelling or grammatical errors. End user request 120 might also be reviewed for clarity. Any end user request 120 with an unclear question would be returned to the end user for clarification.

Another processing step searches for criteria 117. If no criteria 117 have been included, end user request 120 is sent back to the end user for resubmission. Alternatively, the end user can also provide criteria 117 by selecting the subject of end user request 120 directly via an online connection as described later in the interactive selection embodiment. If the end user does not want to provide criteria 117, end user request 120 may be classified by searching request 115 for predetermined keywords or subject matter designators stored in subject database 297. These keywords are then used for generating criteria 117. A request 115 for real estate valuations in Finland, for example, might be assigned criteria 117 of "SUBJECT=Real Estate." Subject database 297 includes a list of key words associated with the subject of real estate, such as land, buildings, zoaning, etc. Presence of one or more of these keywords in request 115 triggers a classification of request 115 as real estate.

There are a number of commercially available software packages which perform these types of searches, such as Semantic Networks by Excalibur Technologies Corporation. The software provides the ability to retrieve approximations of search queries and has a natural tolerance for errors in both input data and query terms, as well as providing a high level of confidence that searches will be successful regardless of errors in spelling of the data being searched. Excalibur's baseline semantic network supports multi-layered dictionary structures that enable integration of specialized reference works for legal, medical, finance, engineering and other disciplines. Excalibur's RetrievalWare enables developers to build information retrieval solutions for the full spectrum of digital information, including text, document images and multimedia data types, allowing for indexing and retrieving of digital images based on their objective content. These components enable pattern recognition-based image retrieval applications that automatically recognize certain types of visual information and provide extensive image management capabilities.

Before searching for the appropriate expert to respond to end user request 120, central controller 200 searches end user request database 265 at step 710 for similar end user requests 120 so that unnecessary duplication of work by experts is not performed. If end user request 120 relates to tax strategies for small businesses and has been asked before, there may be no need for having an expert create a new expert answer 130. It is simpler and cheaper to use the existing expert answer 130. Conventional search algorithms are used to search end user request database 265 for duplicate or similar end user requests 120. Examples of such string search algorithms include Knuth-Morris-Pratt, Rabin-Karp, Boyer-Moore, and Baeza-Yates-Gonnet. For reference, one of ordinary skill in the art may refer to Thomas H. Cormen, et al, *Introduction to Algorithms*, (MIT Press, 1990). Such algorithms could be used to determine a match so that end user requests 120 using different formats and sentence structure can be found. If a similar end user request 120 is found at step 720, then the end user is given the option of purchasing the associated expert answer 130 at step 730. If the end user wants to buy it, expert answer 130 is transmitted to the end user at step 740. A bill is sent to the end user at step 750, and royalty payments are added to the account of the expert who generated expert answer 130. These royalty payments may be a percentage of the price of the original end user request 120, a fixed payment per expert answer 130 used, or a combination of both. Royalty payments might decline over time, with a predetermined maximum royalty period.

Referring again to FIG. 7, if a similar end user request 120 is not found at step 720, or if the end user decides not to buy expert answer 130 at step 730, then central controller 200 begins to search for appropriate candidate experts satisfying criteria 117. At step 760, criteria 117 of end user request 120 are extracted and used as parameters for a search of expert database 255. At step 770, a list of experts is generated whose qualifications meet criteria 117. In a simple example, criteria 117 is "SUBJECT=mathematics and LEVEL=4 and PAPERS=number theory." Central controller 200 searches expert qualifications database 285 for all records with expert qualifications 140 field value of level four mathematician. From this subset of experts, the database field for publications is then searched, eliminating all experts who have not published in number theory. The resulting list of experts satisfies criteria 117. Those skilled in the art will appreciate that there are many database search techniques in addition to those protocols described above. Fuzzy logic protocols, expert systems, and other systems using artificial intelligence may also be used to search the database and identify experts who have expert qualifications 140 which correspond to criteria 117.

The search for qualified experts is not limited to those experts registered with the system, however. External databases of known experts may also be queried to find qualified experts. The above mentioned Martindale-Hubbell Law Directory, for example, could be searched for a particular specialist. When criteria 117 requires an attorney with experience in medical malpractice, for example, these keywords are entered into the database to produce a list of candidate experts. These experts may be added to the list of experts generated from registered experts. When no database currently exists for a particular group of experts, World Wide Web search tools such as Alta Vista may be employed. By typing in a few key words, resumes and personal home pages of appropriate candidate experts are produced. A message may then be sent to this list of experts indicating that there may be work available for them.

The resulting list of candidate experts may also be reduced after examining expert profiles 155 stored in expert database 255. These expert profiles 155 contain rules or preferences regarding characteristics of end user requests 120 sent to the expert. For example, expert profile 155 (described in the selection embodiment) might indicate that he does not want any end user request 120 transmitted to him that pays less than one hundred dollars. Or he may indicate that no end user requests 120 are to be transmitted to him if they require a completion time of less than one hour, unless the subject is fluid dynamics. These requirements are codified into rules and relationships which can be executed by central controller 200, narrowing the list of target experts.

Figure 8:
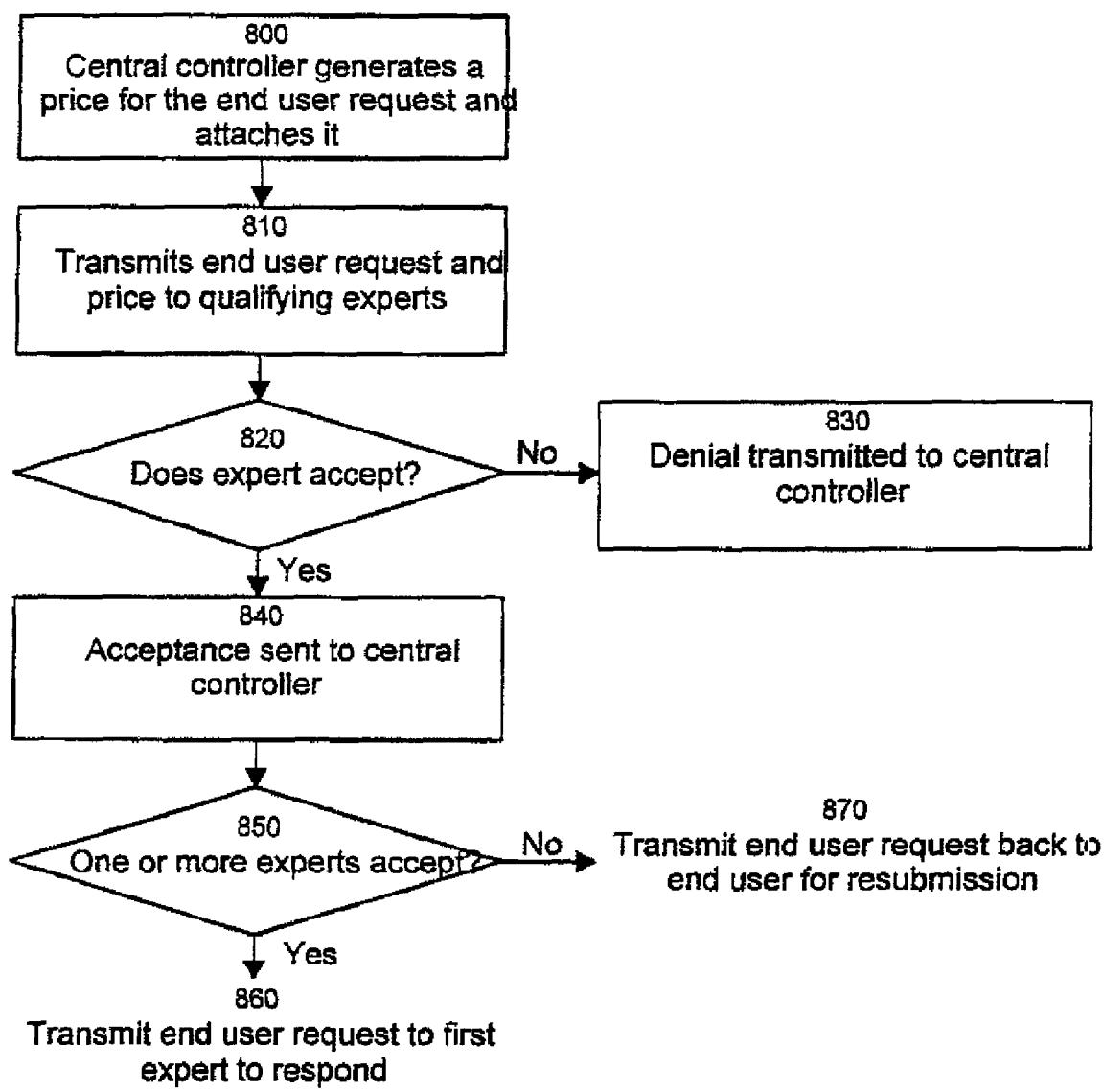
FIG. 8 illustrates one embodiment of transmitting the end user request to the appropriate experts.

Referring now to FIG. 8, there is illustrated a method for transmitting end user request 120 to the appropriate experts. At step 800, central controller 200 generates a price for end user request 120 and attaches it. This price is based on several factors including the expected length of time to produce expert answer 130, complexity of expert answer 130, the qualifications of the expert, and criteria 117. End user request 120 and price are transmitted to the qualifying experts at step 810, using expert address 145 contained in expert database 255. End user request 120 is transmitted by e-mail, postal delivery, phone, pager, beeper, radio or television broadcast, etc. Alternatively, a combination of these methods is used. A message might be sent to the expert's beeper, for example, telling him to check his email for the complete end user request 120.

If the expert does not accept the job at step 820, he transmits a denial to central controller 200 at step 830, or simply does not respond. If the expert accepts sat step 820, he sends an acceptance message to central controller 200 at step 840. Central controller 200 tracks acceptances, transmitting end user request 120 back to the end user at step 870 for resubmission if no acceptances are received within a given period of time. If acceptances have been received at step 850, end user request 120 is transmitted at step 860 to the first responding expert.

Figure 9:
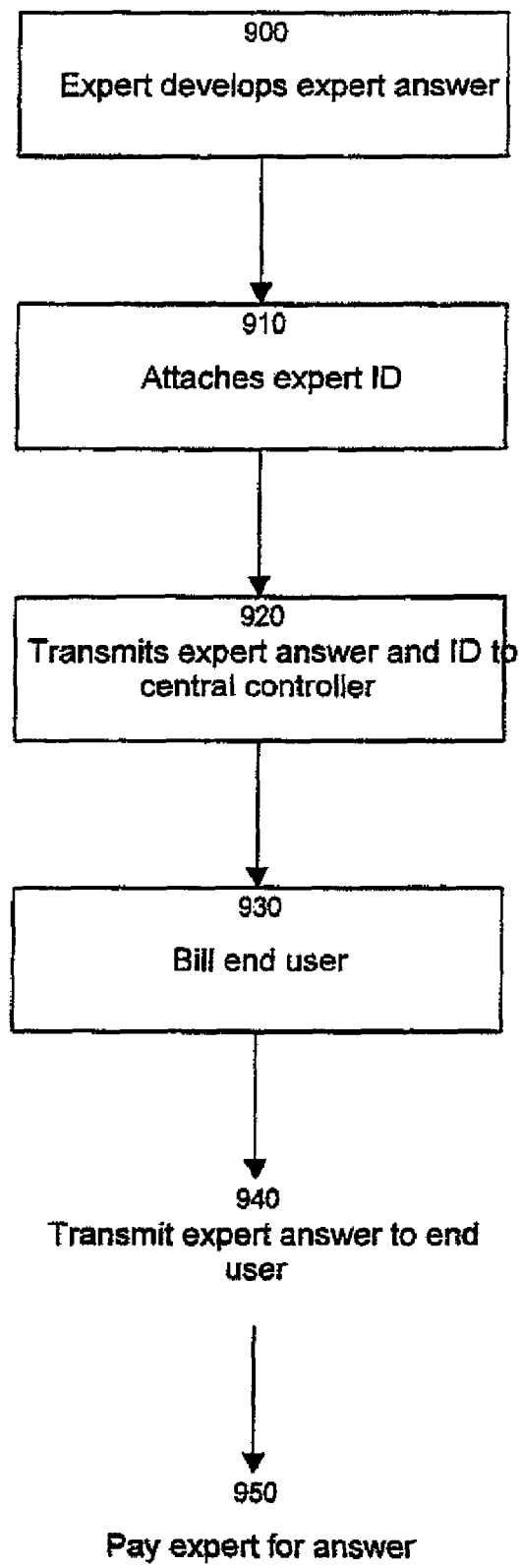
FIG. 9 illustrates an embodiment showing the development of an expert answer.

FIG. 9 illustrates the concluding phase of the process in which the expert develops expert answer 130. After receiving end user request 120, the expert develops expert answer 130 at step 900. At step 910, the expert attaches his expert ID and then transmits expert answer 130 and expert ID to central controller 200 at step 920. Central controller 200 adds a tracking number to expert answer 130 and stores it in expert answer database 270. The end user is billed at step 930. As will be described in the billing embodiment of the present invention, end user payment may take the form of a credit card transaction, the direct transfer of funds into his bank account, or other preferred methods. After billing the end user, expert answer 130 is transmitted to the end user at step 940. At step 950, the expert is paid for expert answer 130 produced.

After reviewing expert answer 130, the end user may be prompted by central controller 200 to provide reference data such as a rating from one to ten, representing the perceived quality of expert answer 130. This rating is transmitted to central controller 200 where it is stored in expert database 255. These ratings are made available to other end users as reference data, providing another parameter for the selection process. These ratings are also used for quality control purposes, with written warnings provided to experts whose average ratings dropped below an established level.

Billing Embodiment

FIGS. 10, 11, 12, 13, and 14 describe an exemplary payment and billing system of the present invention. End users are billed for expert answers 130 received, and experts are compensated for expert answers 130 produced. The system is capable of ensuring that experts receive payment for their work, whether or not the end user pays. This provides additional incentive for experts to register with the system, as the possibility of bad debt has been eliminated since central controller 200 takes on the risk of not collecting from end users. End user invoicing and expert payment is described using conventional credit card electronic charges, checks, Electronic Funds Transfer ("EFT"), or digital cash. These payment methods are meant to be merely illustrative, however, as there are many equivalent payment methods commonly known in the art which may also be used.

Figure 10:
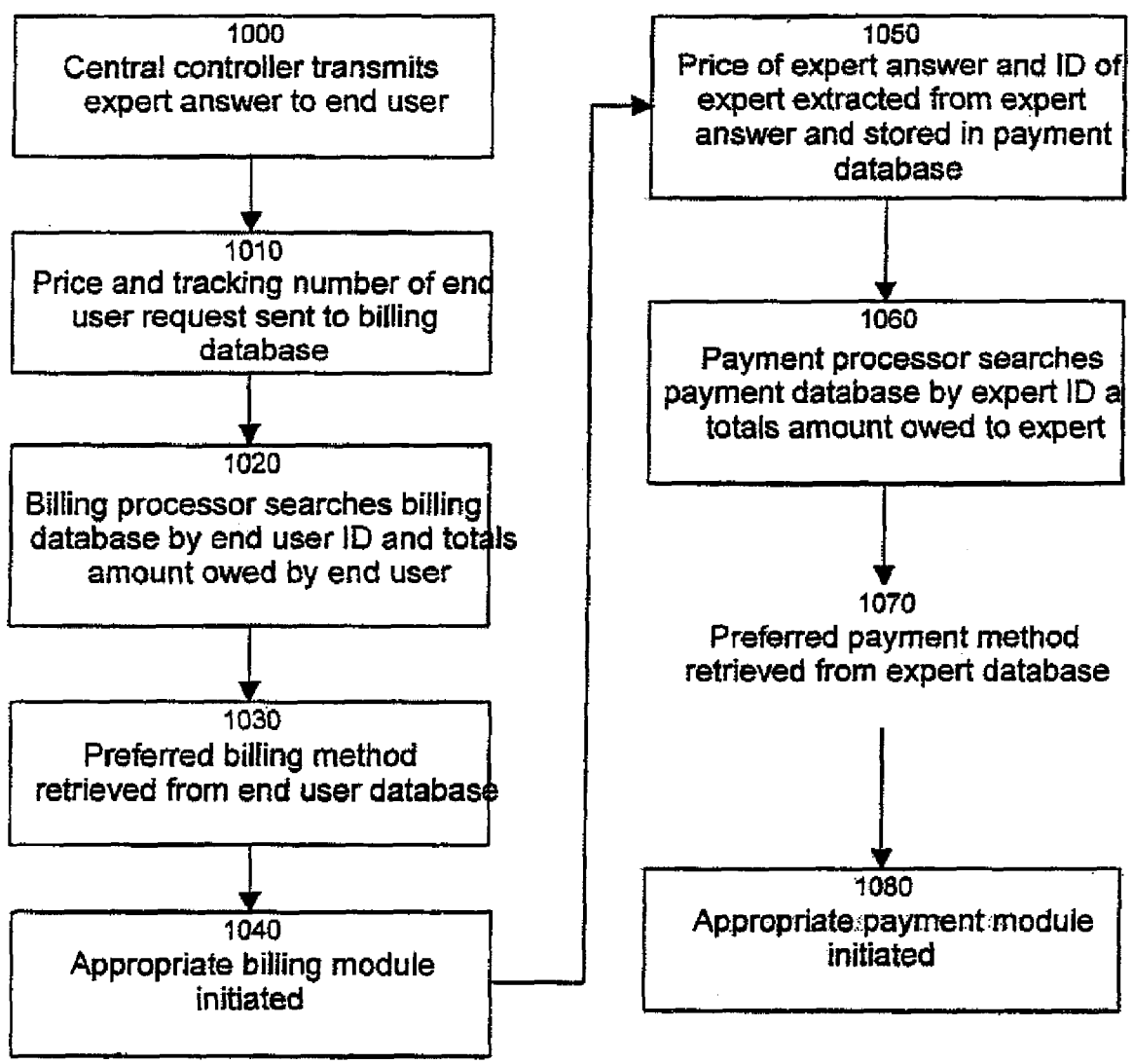
FIG. 10 illustrates an exemplary embodiment for compensating experts and billing end users.

In FIG. 10, the billing process is initiated at step 1000 when central controller 200 transmits expert answer 130 to the end user (refer to FIG. 9, steps 930, 940 and 950). Once the billing process is started, the price and tracking number of end user request 120 is sent to billing database 280 at step 1010. At step 1020, there are two billing protocols that can be used. The first, cash on delivery, requires that the end user pay before receiving expert answer 130. The second protocol is a credit system in which the end user pays at the end of the billing period. In the cash on delivery protocol, billing processor 225 generates a bill prior to sending expert answer 130 to the end user, proceeding immediately to step 1030. One exemplary embodiment of a payment guarantee means of the present invention is described as follows. Central controller 200 requires the end user to prepay for at least part of the services received, forcing the end user to keep a minimum balance of money in order to be eligible to use the system. Central controller 200 then automatically deducts the price of expert answer 130 from this escrow account before expert answer 130 is transmitted to the end user. Transaction records and balance information is stored in billing database 280. Rather than actually depositing the money with central controller 200, the end user might instead be required to merely have sufficient credit available. A credit card on file with central controller 200, for example, is checked before end user request 120 is sent to the expert. If sufficient credit remains in the account, the expert is told to complete expert answer 130. If credit available is not sufficient to cover the price of expert answer 130, the end user is required to provide another credit card number. For EFT transfers, the end users account information is stored in billing database 280, enabling central controller 200 to check the account balance before providing expert answer 130 to the end user.

In a credit protocol, processor 225 searches billing database 280 by end user ID at the end of each billing period and totals the amount owed by each end user. It should be noted that in this credit protocol, while the end user does not pay until the end of the billing period, the expert may still receive payment immediately. Central controller 200 pays the expert at step 870 when end user request 120 is sent to the expert or at step 930 at which point central controller 200 has already received expert answer 130. At step 1030, the preferred billing method is retrieved from end user database 260, and the appropriate billing module (credit card, EFT, check, electronic cash), is initiated at step 1040. In an alternate embodiment, the end user does not pay for expert answer 130 unless he is satisfied with it. This embodiment allows the end user to examine expert answer 130 for a given period of time, then he sends an authorization of payment to central controller 200 if he is satisfied. If the end user is not satisfied, a rejection message is sent to central controller 200 and an expert review process is started as described in the customer satisfaction embodiment.

The process of paying the expert begins at step 1050 when the price and tracking number of end user request 120 are sent to payment database 275, with the ID of the expert extracted from expert answer 130 and stored in payment database 275. At step 1060, payment processor 230 searches payment database 275 by expert ID and totals the amount owed to the expert. As with billing the end user, the expert could be paid using either a cash on delivery or credit protocol. Cash on delivery works the same for the expert as it does for the end user. Payment is made immediately. In the credit protocol, the expert has an account with central controller 200 that maintains a balance for the expert. At step 1070, the preferred payment method is retrieved from expert database 255, and the appropriate payment module is initiated at step 1080. This step may be held up until payment has been received from end user. During the period between payments, while the expert still has a balance of finds due, it would be possible for the expert to use these funds to purchase expert answers 130 for himself with the amount deducted from the balance represented in payment database 275.

Although the above protocols describe a number of ways in which payments may flow from end user to expert, it is important to note the methods by which central controller 200 may generate revenues for services provided.

In one embodiment, a flat fee is charged for every end user request 120 submitted with the end user paying the fee in addition to reimbursing the expert. There could also be flat fees that would cover any number of transactions over a given period of time, allowing end users to subscribe to the service much as they would subscribe to a newspaper. In another embodiment, central controller 200 creates a bid/ask spread in which end users are charged a premium over the cost of the expert. If an expert requires fifty dollars for an expert answer 130, central controller 200 may mark this up by 20%, charging the end user sixty dollars. Experts may be retained by central controller 200 on a salaried basis, with revenues collected from end users paying those salaries. In another embodiment, advertisers pay to have messages included in end user request 120, expert answer 130, or web pages of central controller 200. Advertising revenues then partially or fully offset the cost of expert answer 130. Payments to experts for expert answers 130 produced may also be reduced in exchange for the expert's advertising message displayed at central controller 200 or in expert answer 130. Alternatively, the method and apparatus of the present invention may be employed without a payment feature.

Figure 11:
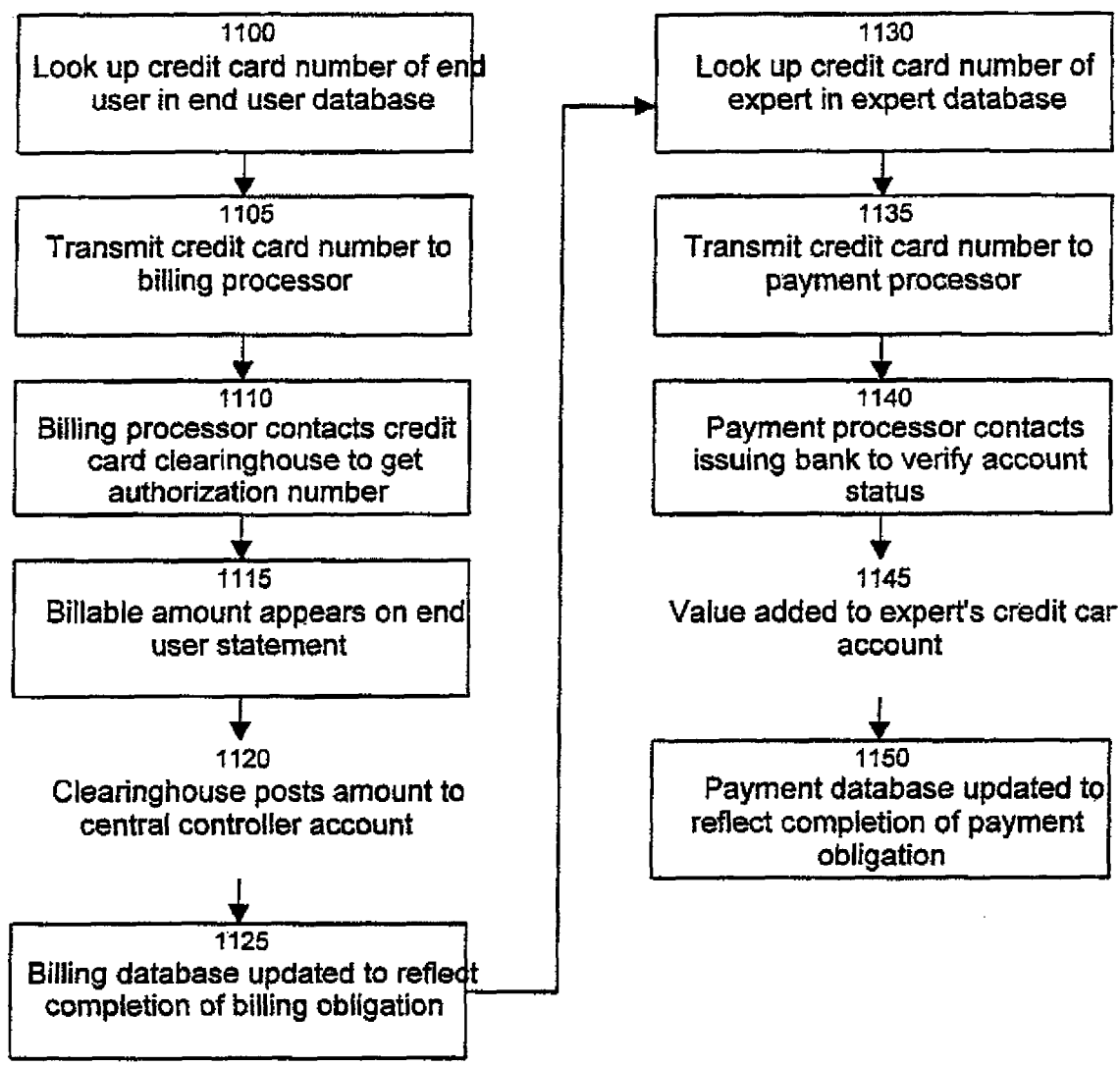
FIG. 11 illustrates an exemplary compensation method employing credit card payment.

Once the amount owed by the end user and the amount to be paid to the expert has been calculated, appropriate billing and payment methods are initiated. FIG. 11 illustrates an exemplary payment and billing procedure using credit cards as the primary transaction vehicle. The advantage of this system is its simplicity. No bank account is necessary, and no paper transactions are required. At step 1100, central controller 200 looks up the credit card number of the end user in end user database 260. At step 1105, this credit card number is transmitted to billing processor 225. Billing processor 225 contacts the credit card clearinghouse to get an authorization number at step 1110. The billable amount appears on the credit card statement of the end user at step 1115. At step 1120, the clearinghouse posts this amount to central controller 200 account. At step 1125, central controller 200 updates billing database 280 to indicate that payment has been made. A similar process occurs on the payment side. At step 130, central controller 200 looks up he credit card number of the expert in expert database 255. At step 1135, this credit card number is transmitted to payment processor 230. Payment processor 230 contacts the issuing bank to verify that the account is still active at step 1140. Value is added to the expert's credit card account at step 1145, where it shows up as a credit on his monthly bill. At step 1150 central controller 200 updates payment database 275 to indicate that payment has been made.

Figure 12:
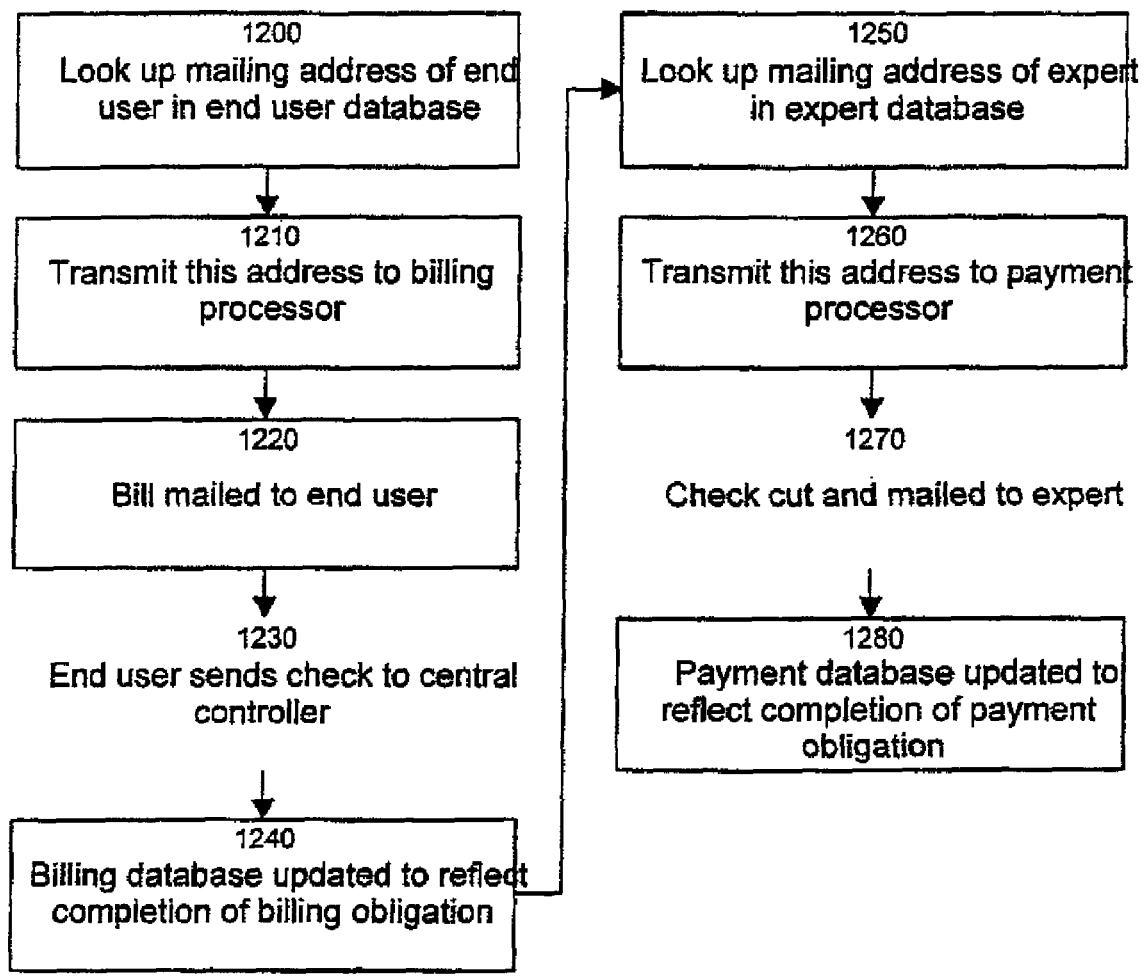
FIG. 12 illustrates an exemplar compensation method employing bank checks.

FIG. 12 illustrates a payment procedure involving standard bank checks. In billing the end user, central controller 200 looks up his mailing address at step 1200 in end user database 260. This address is transmitted to billing processor 225 at step 1210. A bill is mailed to the end user at step 1220, and the check is received from the end user at step 1230. At step 1240, central controller 200 updates billing database 280 to indicate that payment has been made. At step 1250, central controller 200 looks up the mailing address of the expert in expert database 255. This information is transmitted to payment processor 230 at step 1260. Payment processor 230 then automatically cuts a hard copy check, payable to the expert, which is then mailed to the expert at step 1270. At step 1280, central controller 200 updates payment database 275 to indicate that payment has been made.

Figure 13:
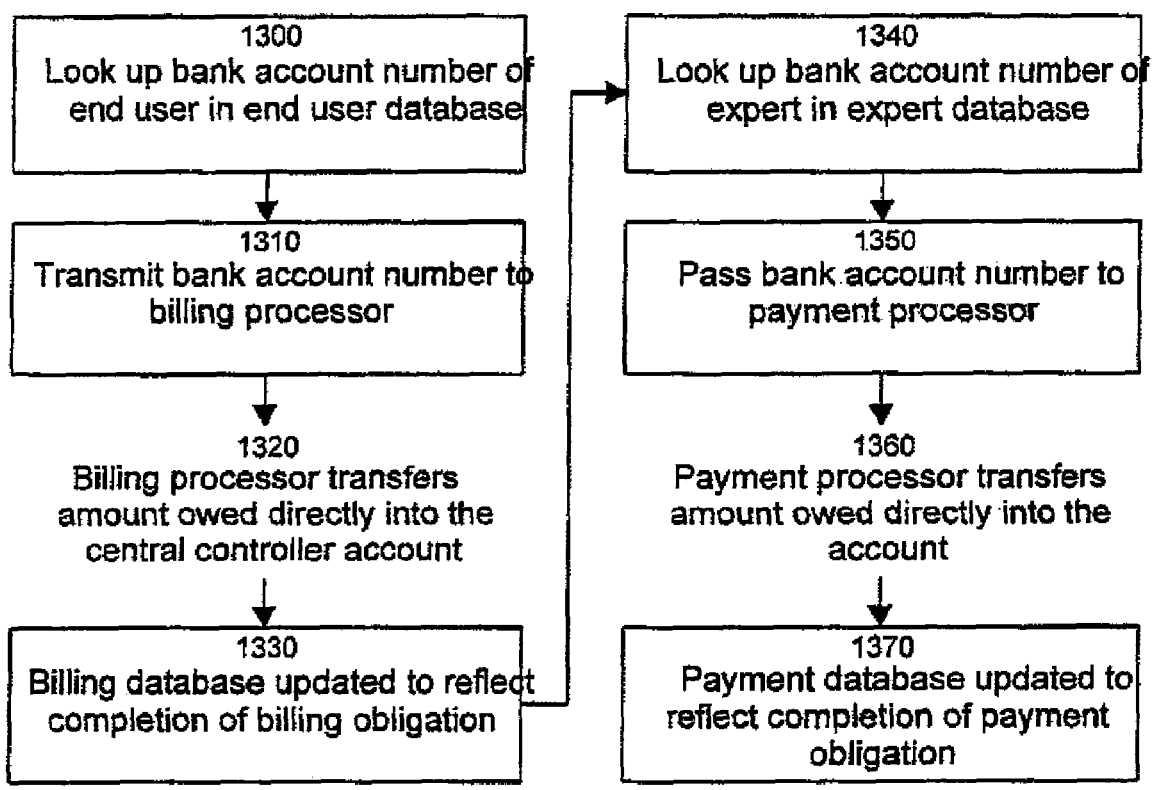
FIG. 13 illustrates an exemplary compensation method employing electronic fund transfers.

Referring now to FIG. 13, there is illustrated a procedure in which funds are transferred via electronic funds transfer (EFT). At step 1300, the bank account number of the end user is looked up in end user database 260. This account number is transmitted to billing processor 225 at step 1310, followed by the transfer of funds directly into the account of central controller 200 at step 1320. At step 1330, central controller 200 updates billing database 280 to indicate that payment has been made. Paying the expert is essentially the reverse process. At step 1340, central controller 200 searches expert database 255 for the bank account number of the expert. This bank account number is transmitted to payment processor 230 at step 1350, which transfers the money directly into the account of the expert at step 1360. At step 1370, payment database 275 is updated to indicate that payment has been made.

Figure 14:
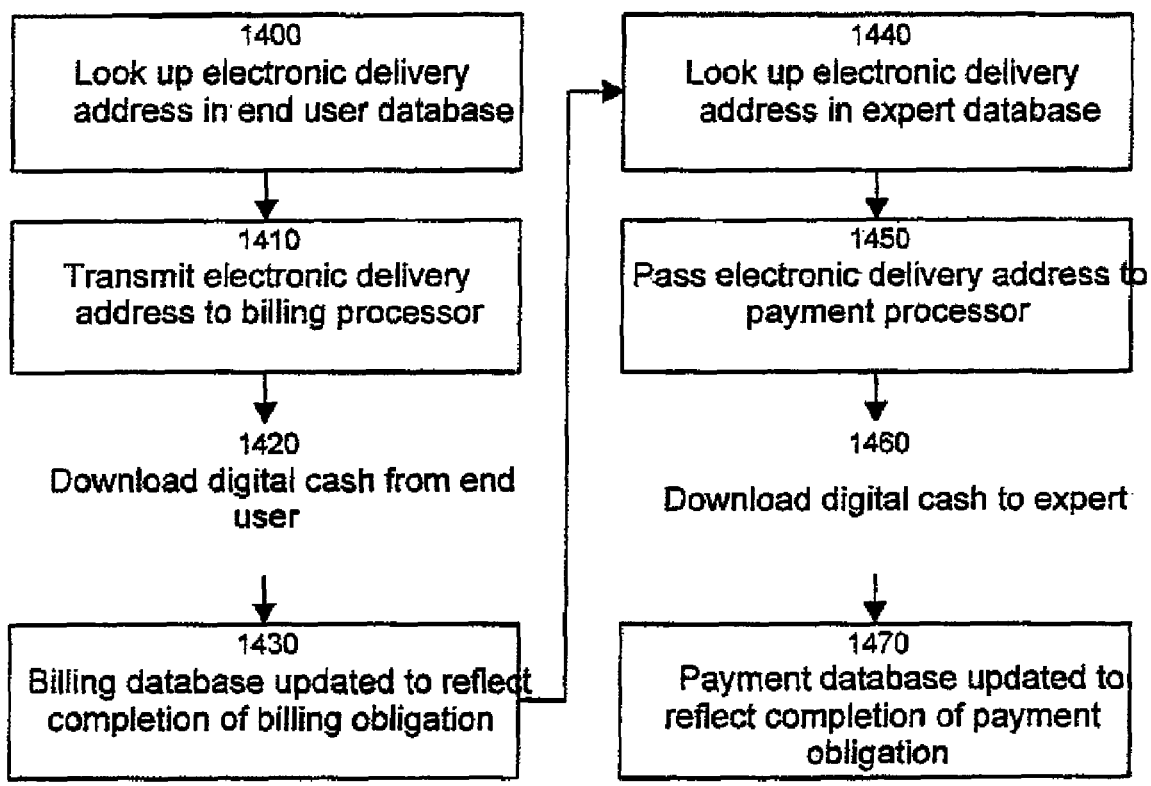
FIG. 14 illustrates an exemplary compensation method employing the transfer of digital cash.

Referring now to FIG. 14, there are shown commercial transaction procedures using digital cash. For billing the end user, central controller 200 looks up the end user's electronic delivery address in end user database 260 at step 1400. This address is transmitted to billing processor 225 at step 1410, with the digital cash being downloaded from the end user at step 1420. At step 1430, central controller 200 updates billing database 280 to indicate that payment has been made. Payment to the expert proceeds similarly. At step 1440, the electronic delivery address is sent to payment processor 230. This address might be an email address if the digital cash is to be transferred by email, or it could be an Internet Protocol address capable of accepting an online transfer of digital cash. At step 1450, this electronic delivery address is sent to payment processor 230. At step 1460, the digital cash is downloaded to the expert. At step 1470, central controller 200 updates payment database 275 to indicate that payment has been made. Using these digital cash protocols, it is possible for the end user to include payment along with end user request 120 in e-mail form. An end user who had already negotiated a final price with an expert for expert answer 130, for example, could include digital cash along with his confirmation of the acceptability of the price.

The practice of using digital cash protocols to effect payment is well known in the art and need not be described here in detail. For reference, one of ordinary skill in the art may refer to Daniel C. Lynch and Leslie Lundquist, *Digital Money*, John Wiley & Sons, 1996; or Seth Godin, *Presenting Digital Cash*, Sams Net Publishing, 1995.

Interactive Selection Embodiment

Figure 15:
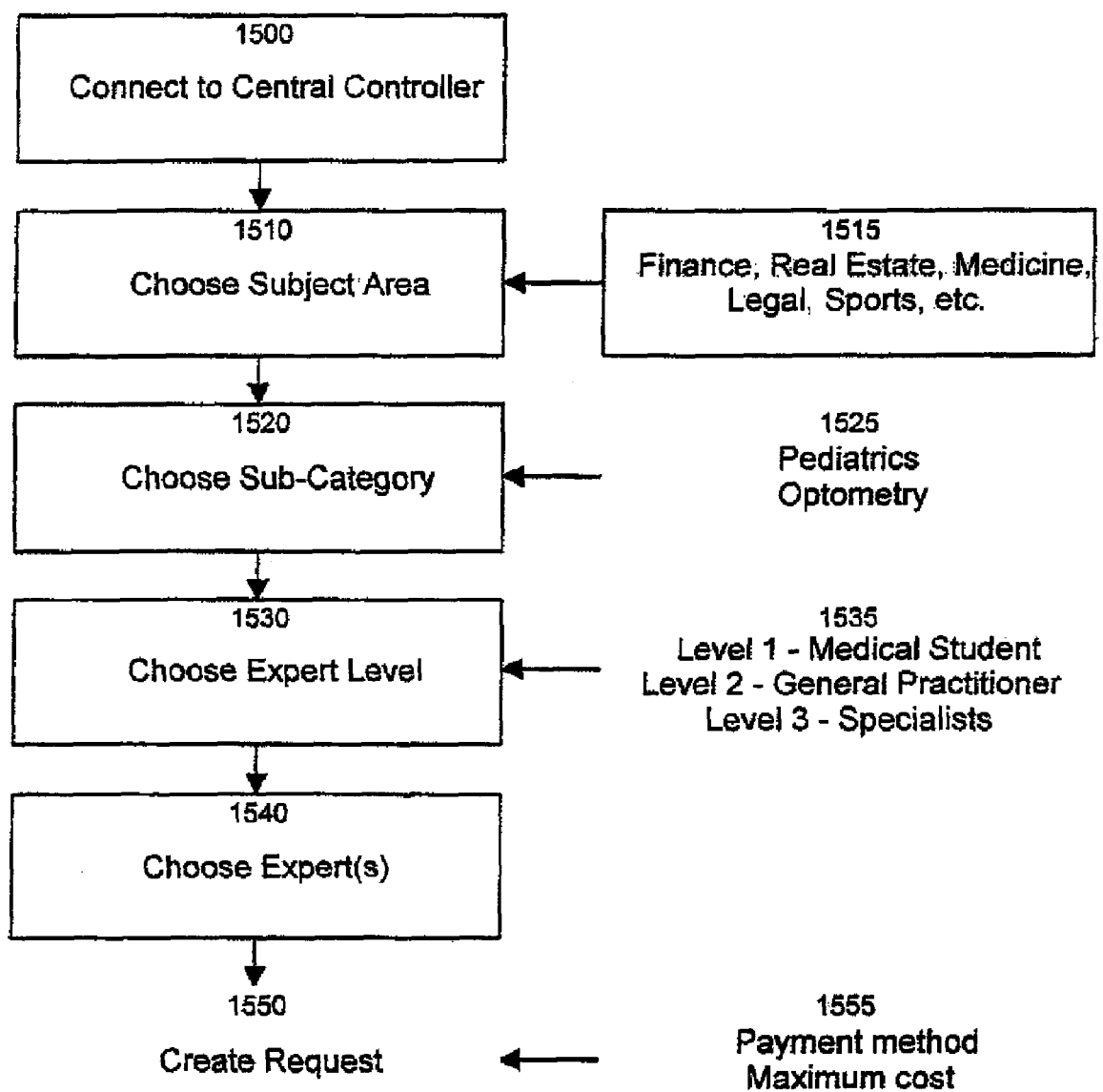
FIG. 15 illustrates an exemplary embodiment for allowing end users to select experts.
Figure 16:
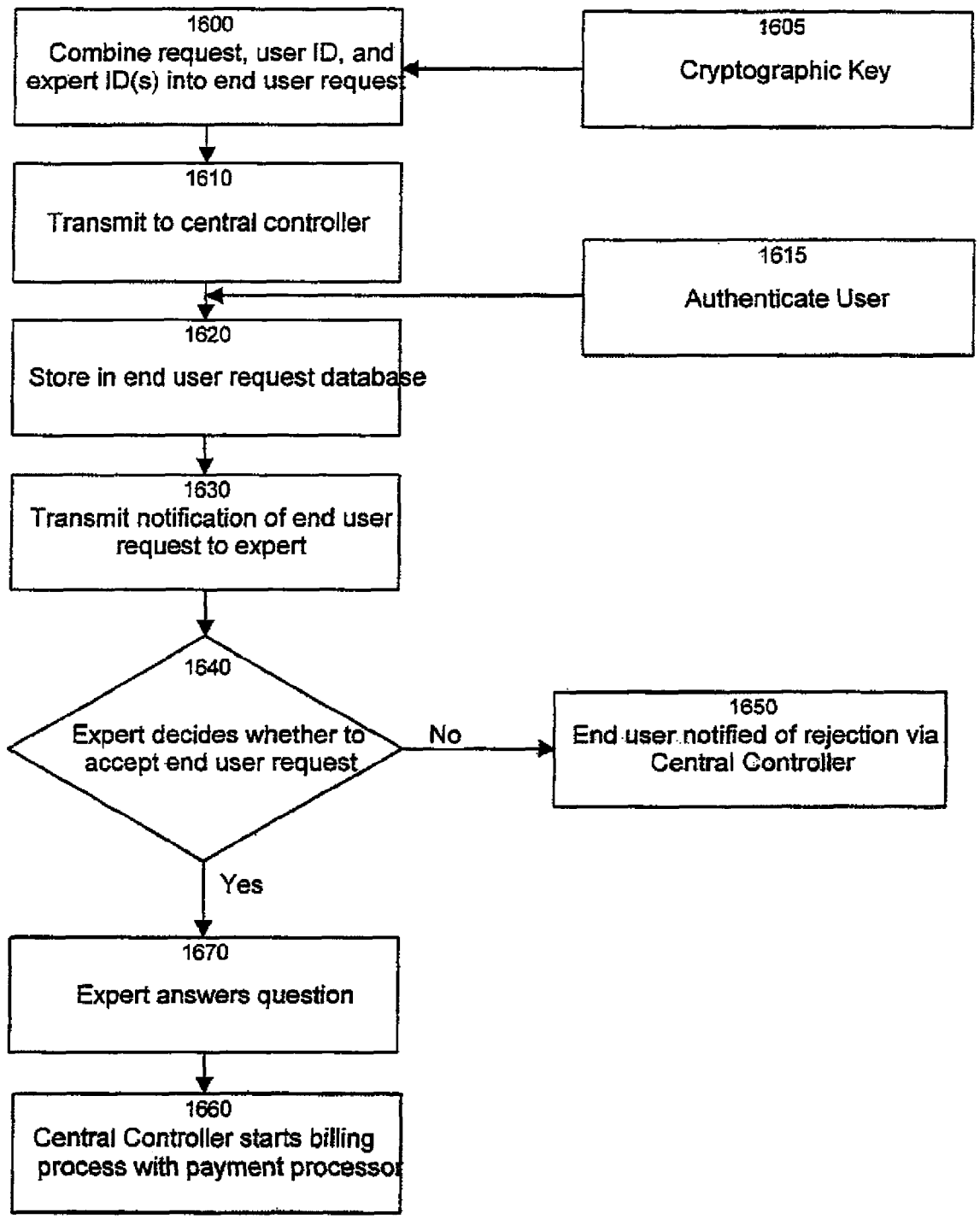
FIG. 16 illustrates an exemplary embodiment of how experts receive and respond to end user requests after being selected by users.

In one embodiment of the present invention, the end user selects the expert(s) prior to transmitting end user request 120, rather than having central controller 200 select for the end user based on criteria 117. In this embodiment, end user request 120 sent to central controller 200 includes the ID number of the selected expert(s). The benefit to selecting the expert prior to sending end user request 120 is that the end user gains more control over the routing of end user request 120, allowing the end user to include some experts while excluding others. For example, if end user request 120 involves a particular business, the end user may not want central controller 200 to route end user request 120 to certain experts involved with that business. In order to facilitate the end user selecting the expert, the present invention includes an interactive selection embodiment. FIGS. 15 and 16 show an interactive selection embodiment which allows the end user to establish an online connection with central controller 200, select a subject area matching end user request 120, select qualified experts, and then submit end user request 120.

FIG. 15 describes an embodiment of the present invention wherein the end user selects an expert to respond to request 115. The end use establishes an online connection via the INTERNET, AOL, CompuServe, Prodigy, or other conventional online system to central controller 200 at step 1500. End user interface 500 displays a screen on video monitor 530 which offers a selection of predetermined subject areas at step 1510, such as Finance, Real Estate, Medicine, Legal, Sports, Music, Recreation, Hobbies, etc. as described in box 1515. These subject areas are stored in subject database 297. The end user selects a category, and is prompted to select from various sub-categories at step 1520, such as pediatrics or optometry, within the medicine category as described in box 1525.

After a sub-category is selected, a list showing expert qualification 140 levels is displayed as in box 1535, e.g., Level 1, Level 2, Level 3, etc. Each level corresponds to predetermined groupings of expert qualifications 140 for the selected subject area, which have been stored in expert qualifications database 285. Once a level of expertise has been selected at step 1530, a list of expert IDs is displayed along with an option to see specific expert qualifications 140 as well as pricing for the expert. In addition, ratings for that expert may be made available. In an effort to prevent end users from contacting experts outside the system prior to a deal being reached, the user may be prevented from seeing contact information such as phone number or location. If the end user ultimately does not select an expert, but is then discovered to have negotiated a job with an expert outside the system, he may be charged a usage fee as a percentage of the total value of the job. In one embodiment, the end user agrees to such restrictions when he registers with the system.

The end user then selects the number and level of expert(s) at step 1540 from which he would like to receive an expert answer 130. The end user is prompted for end user request 120 and payment authorization at step 1550. In addition, the end user may enter payment preferences, such as credit card, EFT, or digital cash as shown in box 1555.

FIG. 16 shows how the end user makes his request 115 to the selected expert and how the expert receives payment for expert answer 130. Request 115 is combined with the end user's ID and expert ID(s) to form end user request 120 at step 1600. If additional security is necessary, a cryptographic key (as shown in box 1605) may be used along with the end user's ID. End user request 120 is transmitted to central controller 200 for distribution to the selected experts. At step 1620, central controller 200 stores end user request 120 in end user request database 265. Central controller 200 may authenticate the user as well, as shown in box 1615. The cryptographic protocols described in the cryptographic authentication embodiment may be used for steps 1605 and 1615.

End user request 120 is then transmitted to the expert at step 1630. The expert can either accept or reject end user request 120 at step 1640. If the expert rejects end user request 120, the user is notified and the transaction stops at step 1650. If an expert chooses to respond to end user request 120 at step 1640, the expert sends confirmation to central controller 200 and begins to answer end user request 120 at step 1660. Central controller 200 then sends billing authorization to payment processor 230 at step 1670.

As with the asynchronous communications embodiment, the end user receives expert answer 130 from the expert and is billed for the services rendered. See the billing embodiment for more details of this process. As far as the expert is concerned, this system is indistinguishable from the asynchronous communications embodiment.

Synchronous Communications Embodiment

In one embodiment of the present invention, end users who require continuous interaction with an expert can establish a synchronous communication channel with the expert. Although many problems can be solved using an asynchronous communications protocol, those problems requiring follow up questions from the expert to the end user and vice versa need real-time communications. For example, if a patient has a question about a lump found under his arm, the oncologist may have to ask a series of questions to determine what the lump might be. There are several embodiments of synchronous communications the end user and expert can engage in: one expert to one end user, one expert to many end users, many experts to one end user, and many experts to many end users. Although protocols will be described in detail for one expert to one end user communications, those skilled in the art will appreciate that these protocols may be applied to all four embodiments. In the described embodiment, the expert and the end user exchange a series of end user requests 120 and expert answers 130 using a one-to-one synchronous communications channel such as telephone, real-time text messaging or video conferencing.

The end user can request a synchronous communication channel when he makes his initial end user request 120 using any of the embodiments of the present invention including the asynchronous communications embodiment and the interactive selection embodiment If criteria 117 includes a request for real-time communications, central controller 200 generates a list of all qualified experts (as shown in FIG. 7, step 770) who are willing to establish a synchronous communications channel. Although many synchronous communications channels may be used, in this embodiment an online messaging system is described which uses a standard online service to provide the real-time text-based communications link between the expert and the end user.

Referring now to FIGS. 17, 18, 19, and 20, there is shown a synchronous communications embodiment in which a continuous communications channel is established between the expert and end user using message window 170. Message window 170 is a text-based computer "window" displayed on video monitor 530 of end user interface 500 and on video monitor 430 of expert interface 400. The end user types end user requests 120 directly to message window 170 which appears on video monitor 530. Simultaneously, the expert sees end user request 120 on his video monitor 430. When the expert types expert answer 130, the end user instantly sees expert answer 130 and responds with another end user request 120 or exits the system.

Figure 17:
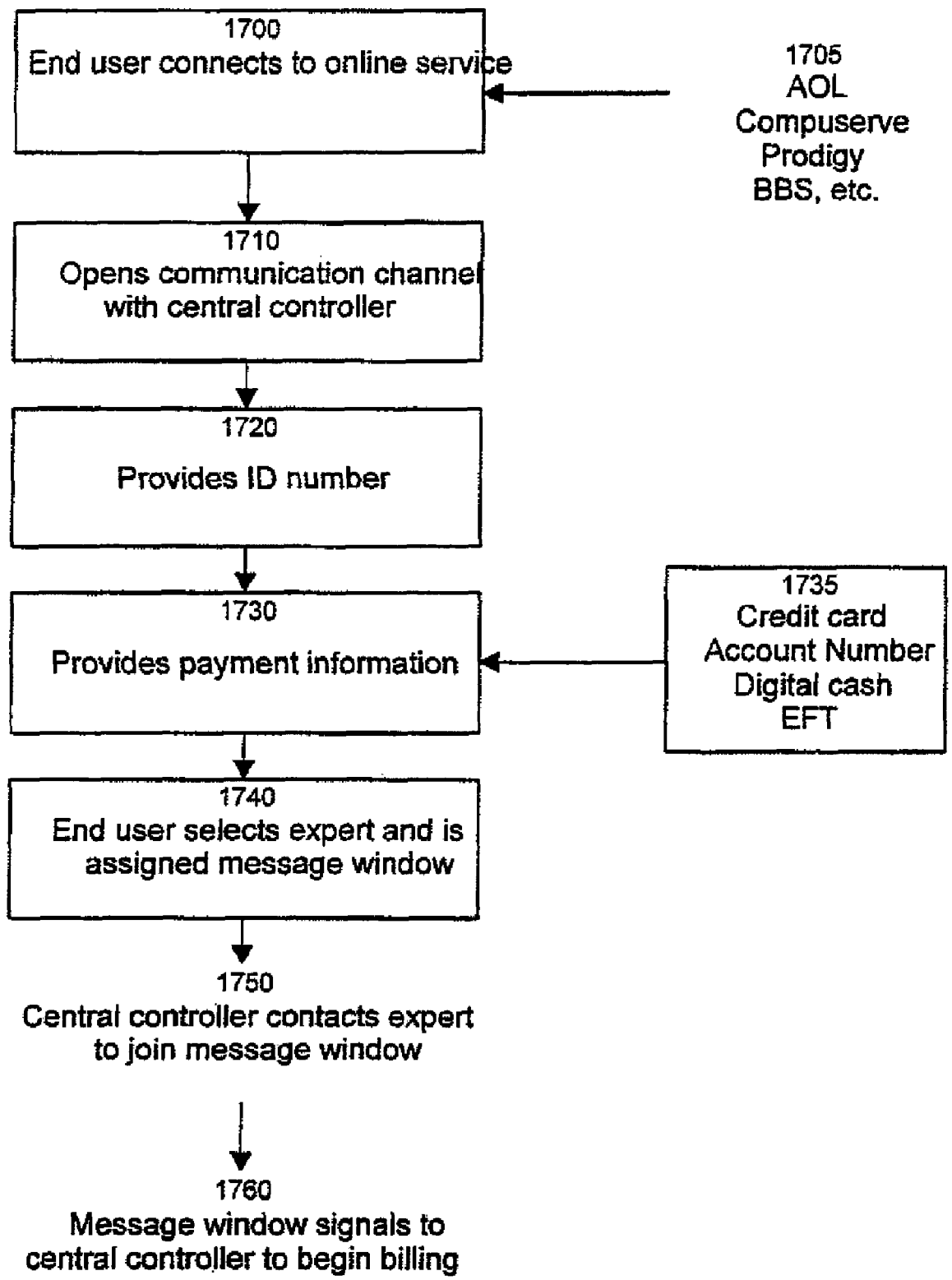
FIGS. 17, 18, 19, and 20 illustrates an exemplary embodiment for synchronous communications between an expert and an end user.

FIG. 17 shows how the user accesses message window 170. At step 1700, the end user connects to an online service. This might be America Online, CompuServe, Prodigy, or even a BBS as shown in box 1705. The online service, however, acts only as the interface for the present invention. Control of user access, qualifications, billing, payment, and other functions still resides at central controller 200. Online services act merely as a convenient conduit for synchronous communications given their capacity to handle tens of thousands of simultaneous communications. In another embodiment, central controller 200 handles all synchronous connections directly, eliminating the need for online networks. At step 1710, a communications channel is opened between central controller 200 and the online service. The communications channel is a direct electronic link such as a circuit switched or packet switched network connection. Once this connection has been made, the end user provides his ID number at step 1720 and his payment information at step 1730. Payment information includes a credit card account number, bank account number or other payment method as shown in box 1735.

After the end user has been authorized to enter the system, he either selects an expert from the list of experts generated by central controller 200 as described in the asynchronous embodiment (FIGS. 6,7,8 and 9) or selects an expert as described in the interactive selection embodiment (FIGS. 15 and 16) at step 1740. Once an expert has been selected, central controller 200 assigns message window 170 to the end user. If additional security is required, the end user may be required to provide a password to central controller 200 prior to gaining admittance to message window 170. If the selected expert is not online, central controller 200 sends a message to the expert (via e-mail, telephone, beeper, fax, etc.) stating that an online session is available at step 1750. If central controller 200 does not receive a response within a predetermined time (usually specified in criteria 117) central controller 200 sends a message to the end user and allows him to select another expert. Once the end user enters message window 170, a signal is sent to central controller 200 to begin tracking message window time for billing based on the access to the expert at step 1760.

Figure 18:
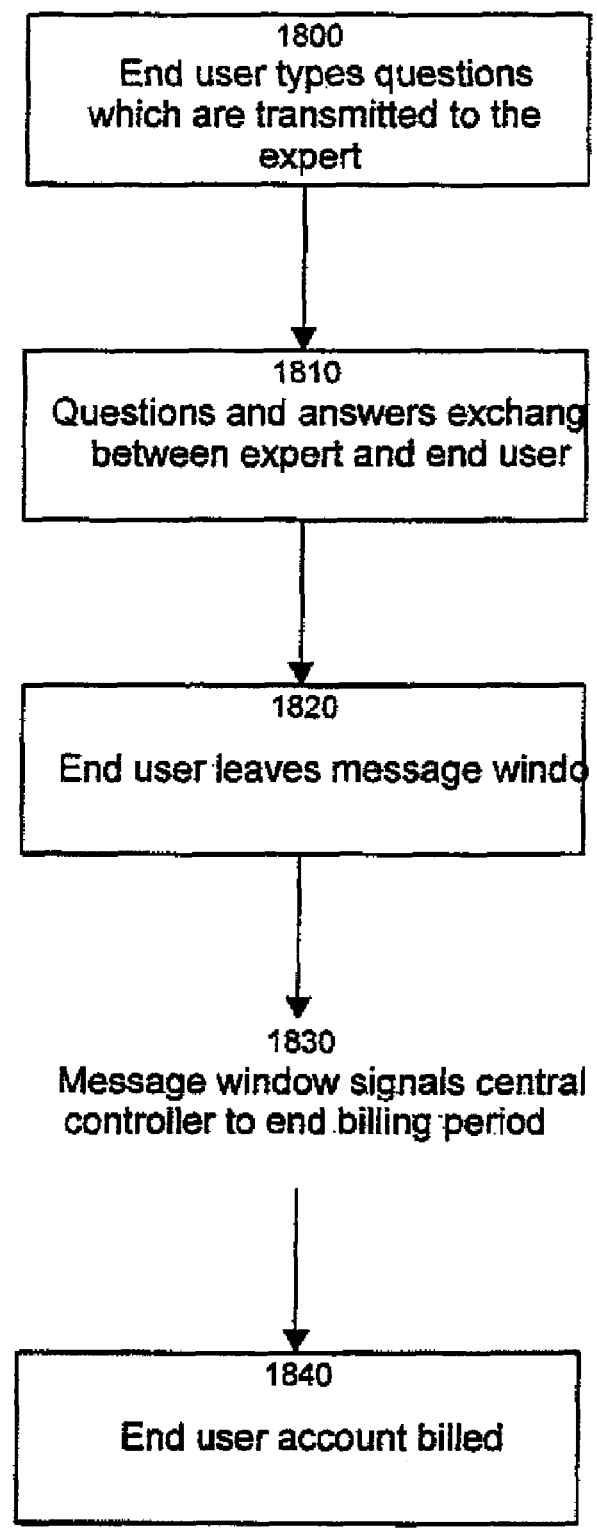

FIG. 18 describes the operational aspects of message window 170. At step 1800, the end user has entered message window 170 and inputs end user requests 120 through end user interface 500. After the end user and expert have exchanged a plurality of end user requests 120 and expert answers 130 at step 1810, the end user leaves message window 170 at step 1820. This may involve a log off procedure in which the end user signals message window 170 that he has ended the session. At step 1830, message window 170 transmits a message to central controller 200 which ends the billing period for that particular session. The end user's account is billed at step 1840, using any of the various billing methodologies described in the billing embodiment.

There are multiple ways of charging the end user for time spent in message window 170, including a per question basis, per minute in message window 170, per expert answer 130 given by an expert, or any other method of measuring the end user's usage. In one embodiment, each message window has a different cost method based on expert qualifications 140.

Although the above protocol describes expert answers 130 delivered in real time, it would be possible for the experts to provide answers at a later time in a follow-up e-mail or voice mail to the end user. For example, the expert might need time to do research prior to providing expert answer 130.

Figure 19:
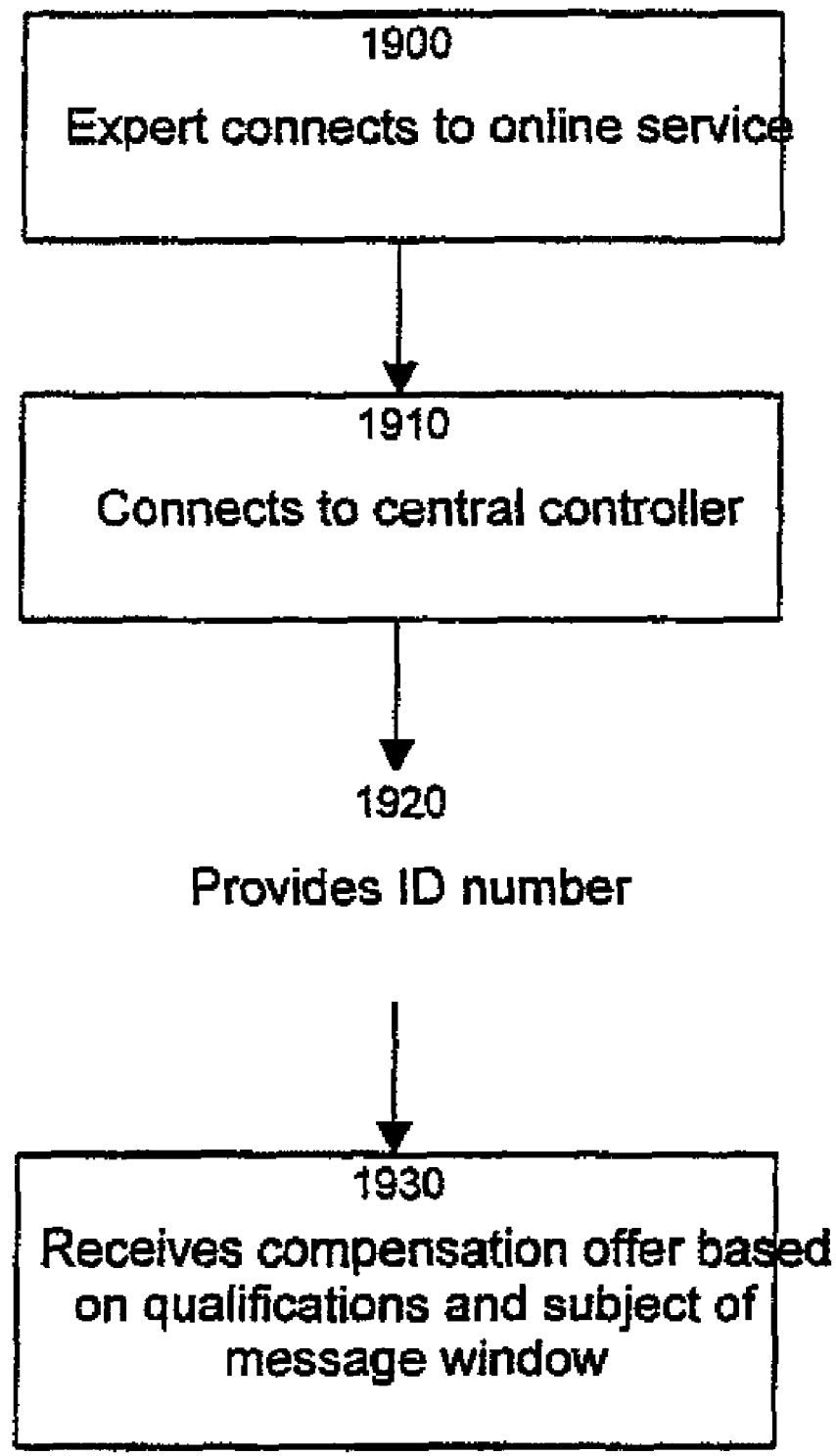

FIG. 19 describes the method by which the expert registers with central controller 200 for a synchronous communications session. At step 1900, the expert connects to the online service in the same manner as the end user. At step 1910, he connects to central controller 200 as the end user did, although a different channel of communications may be used if greater security is required. After the connection is made at step 1920, the expert provides an ID number and is given access to the system. For additional security, the expert may be required to produce a password and/or submit to a challenge/reply protocol in which he must produce a piece of information known only to that expert, such as his mother's maiden name or his social security number. Before the expert enters message window 170, he receives a compensation offer at step 1940 based on the his qualifications 140, i.e., licenses, degrees, memberships, certifications, industry experience, etc. The offer is on a per hour basis, the number of questions answered, or another equivalent basis. In one embodiment, the expert's services are sold on a prepaid basis with the expert agreeing to provide a fixed number of consulting hours or sessions over a given time period.

Figure 20:
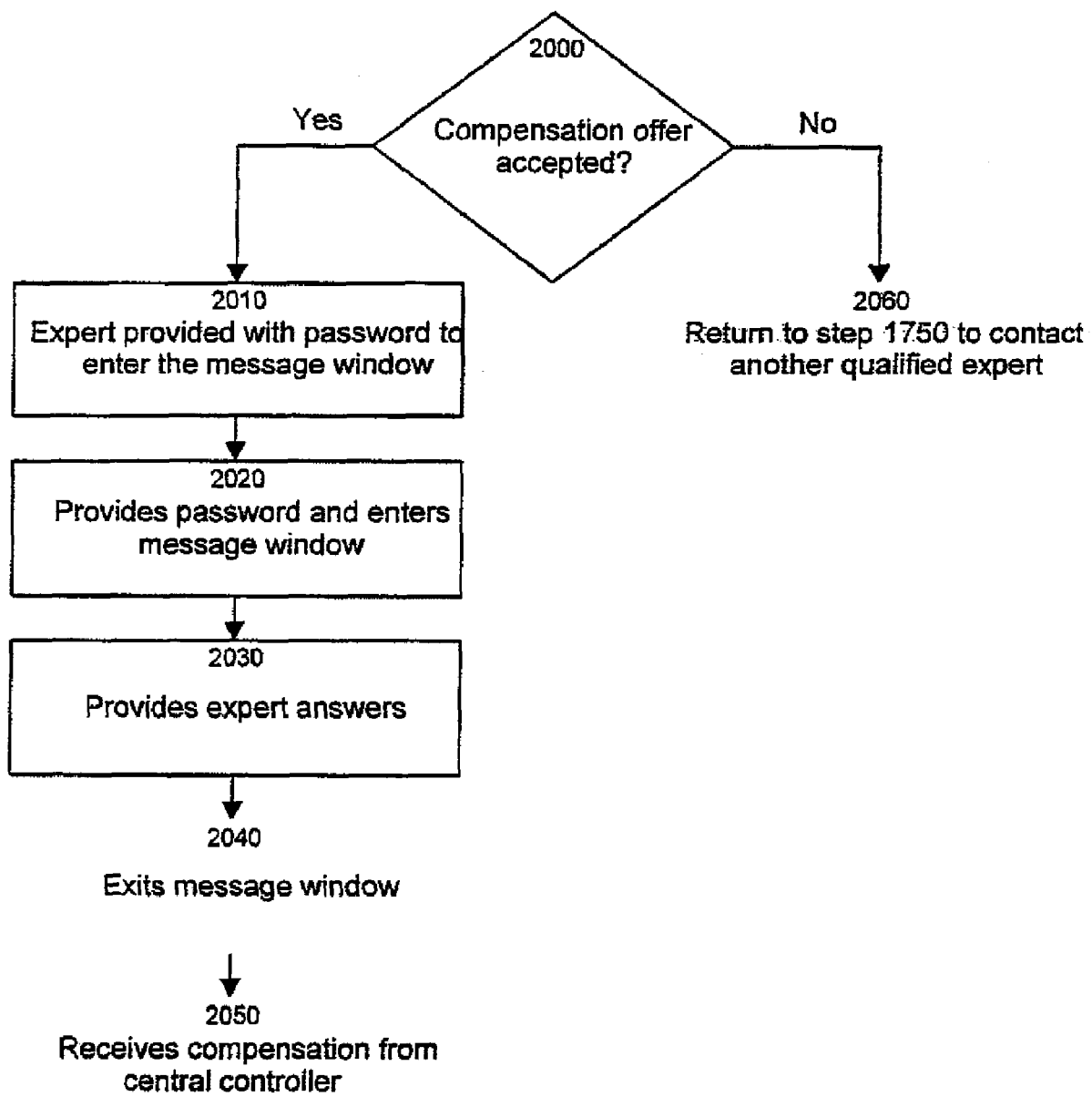

FIG. 20 describes the procedure once the expert has received the compensation offer. If the expert does not accept the compensation offer at step 2000, he is given the option to wait for another message window 170. Central controller 200 then contacts another qualified expert to enter message window 170 at step 2060. If the compensation offer is accepted at step 2000, the expert is provided with a password at step 2010 that allows access to message window 170. After providing this password at step 2020, the expert enters message window 170. At step 2030, the expert provides expert answers 130 to end user requests 120 generated by the end user in message window 170.

In an alternative embodiment, the end user or the expert may request a second expert to join the synchronous communications channel. The second expert is added to message window 170 in a similar manner to the first expert. The second expert provides additional information to the end user and can collaborate with the first expert to provide expert answers 130. A second expert may also be contracted by central controller 200 to act as a monitor for the first expert. This second expert is paid to monitor the first expert's performance and/or supply additional information to the end user. The second expert also provides a level of quality assurance by verifying the responses of the first expert, correcting responses or adding clarifying information.

After the session, the expert leaves message window 170 at step 2040 and receives compensation from central controller 200 at step 2050. If compensation is based on the time spent in message window 170, message window 170 generates a time log and sends it to central controller 200. This time log includes the ID number of the expert, the time that he entered message window 170, and the time that he exited. Central controller 200 combines this information with the appropriate rate per hour and determines a final compensation amount. This amount is transferred to the expert, or accumulates in an account at central controller 200 for payment at a predetermined time as described in the billing embodiment.

In an alternative embodiment, end users and experts can be connected directly using synchronous communications channels such as the telephone network. In this embodiment, the end user calls central controller 200 and connects to the IVRU (Interactive Voice Response Unit). The end user is prompted to respond to requests similar to those described in the interactive selection embodiment. As shown in FIG. 15, the end user enters his ID, selects the subject, subcategory, and expert level via the IVRU prompts. Central controller 200 automatically connects to an expert already online or calls an appropriate expert and connects the end user. When the end user is finished asking questions, he hangs up, triggering central controller 200 to end the billing period. Payment and billing occur in similar manners as described in the billing embodiment.

Grading Embodiment

FIGS. 21, 22, 23, and 24 depict an embodiment in which tests, submitted by the end user (in this case the test taker or test administrator), are graded by experts. This embodiment differs from previous embodiments in that the question and the answer are both transmitted to the expert. Thus, an essay may be transmitted along with a model answer, requiring the expert to produce an evaluation of the test taker's answer, rather than producing the answer itself.

In this embodiment, criteria 117 represent the expert qualifications 140 of the grader, e.g., price, time frame, subject matter expertise, educational background, licenses, certifications, etc. Central controller 200 manages the data communications between the graders and test takers. Moreover, test submissions (expert questions) may be divided so that different graders receive different portions of the same test submission.

Figure 21:
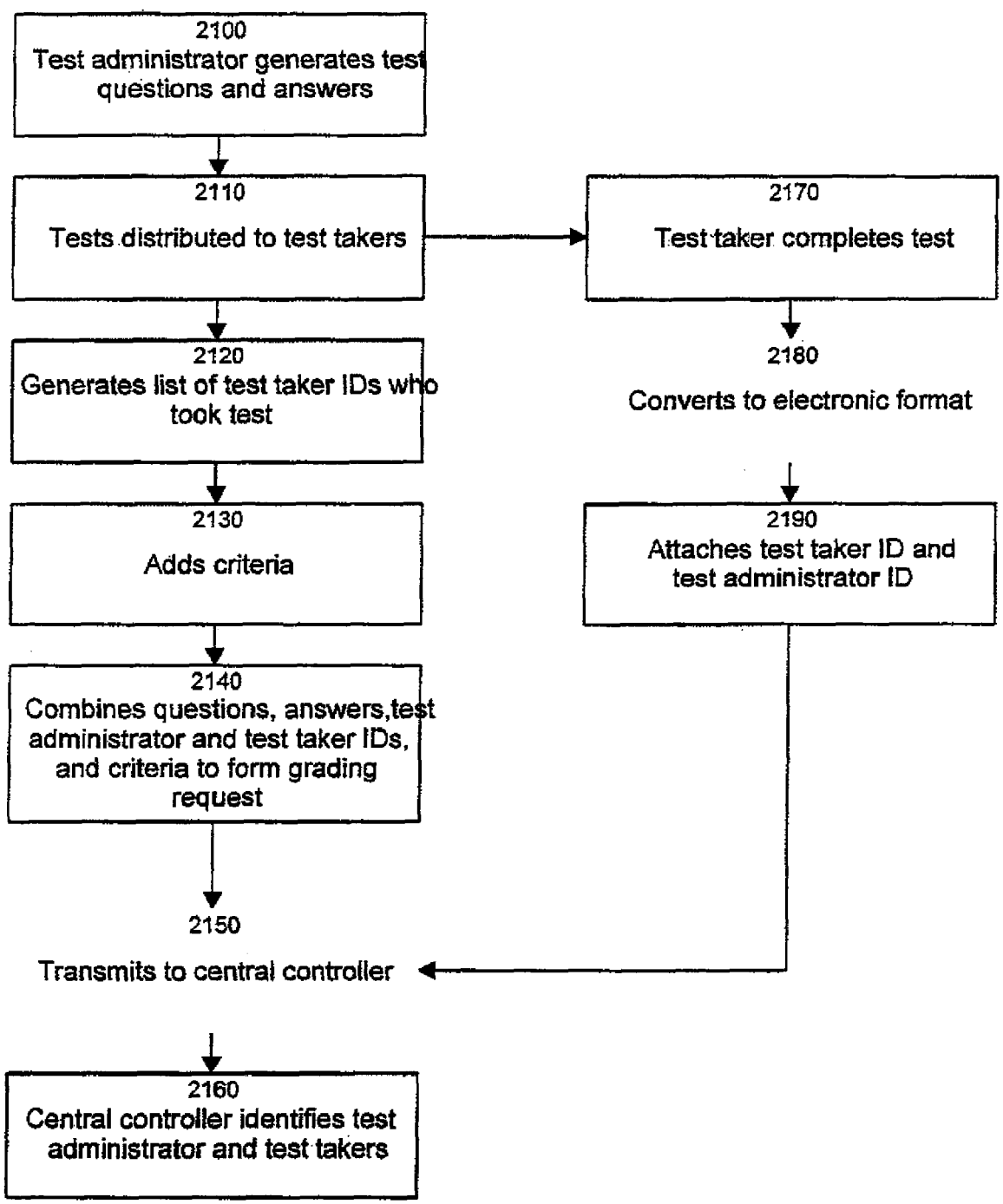
FIGS. 21, 22, 23, and 24 illustrate an exemplary embodiment for grading exams of the present invention.

FIG. 21 describes the process of test generation. This embodiment involves a test giver and a test taker. At step 2100, the test giver generates test questions and answers for a particular test. At step 2110, the tests are distributed to the test takers. A list of IDs of all test takers who took the test is produced at step 2120. At step 2130, criteria 117 are added to this list to indicate the required level of expertise to grade the test. At step 2140 the test giver combines the questions, answers, test taker IDs, his own test giver ID, and criteria 117 to form grading request 125. This grading request 125 is transmitted to central controller 200 at step 2150. Central controller 200 authenticates grading request 125 at step 2160 by checking the attached test giver ID number. If more secure authentication protocols are required, the cryptographic techniques described in the cryptographic authentication embodiment may be used.

The test taker completes the test at step 2170. If the test was not taken in electronic form, it is convened to electronic form at step 2180. An essay test for example, might be completed with paper and pencil and then converted into electronic format by digitally scanning it, pasting the resulting images into email messages. Such tests could also be faxed directly to central controller 200, with the digital image being stored directly in end user request database, 265. After attaching his test taker ID at step 2190, test taker answers we transmitted to central controller 200 at step 2150.

Figure 22:
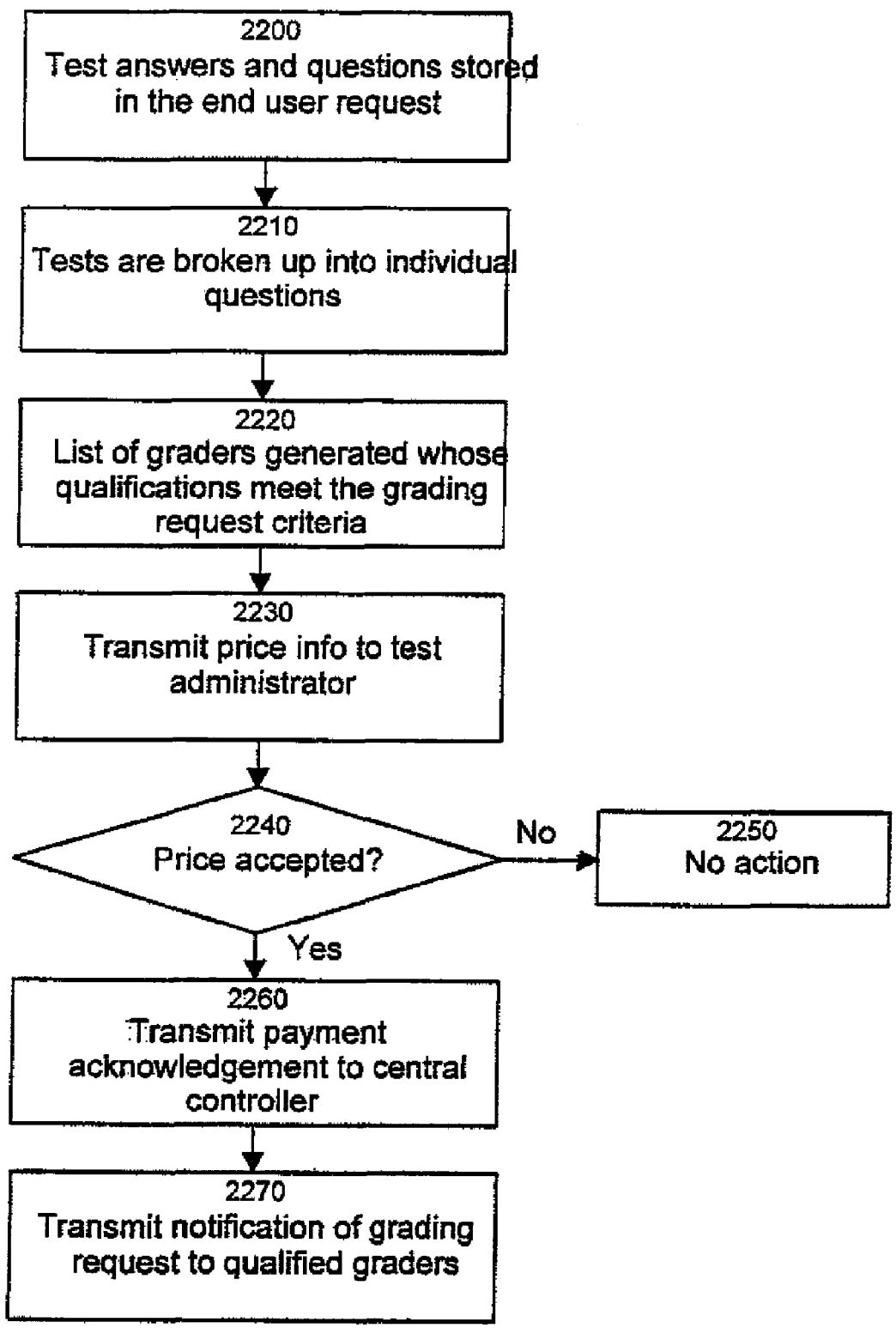

FIG. 22 describes the process of breaking up the tests into individual questions and receiving payment acknowledgment. At step 2200, grading request 125 is stored in end user request database 265. At step 2210, the tests are broken up into individual questions or sections. A geometry test, for example, might consist of five proofs. At step 2220, central controller 200 generates a list of graders whose expert qualifications 140 meet criteria 117 of grading request 125. At step 2230, price information is transmitted to the test administrator. If the price is accepted by the test administrator at step 2240, payment acknowledgment is sent to central controller 200 at step 2260. If the price is not accepted, no further action is taken at step 2250. Alternatively, the test administrator might send back to central controller 200 a counter-offer at a lower price. At step 2270, notification of grading request 125 is sent to all graders on the list of qualified graders.

Figure 23:
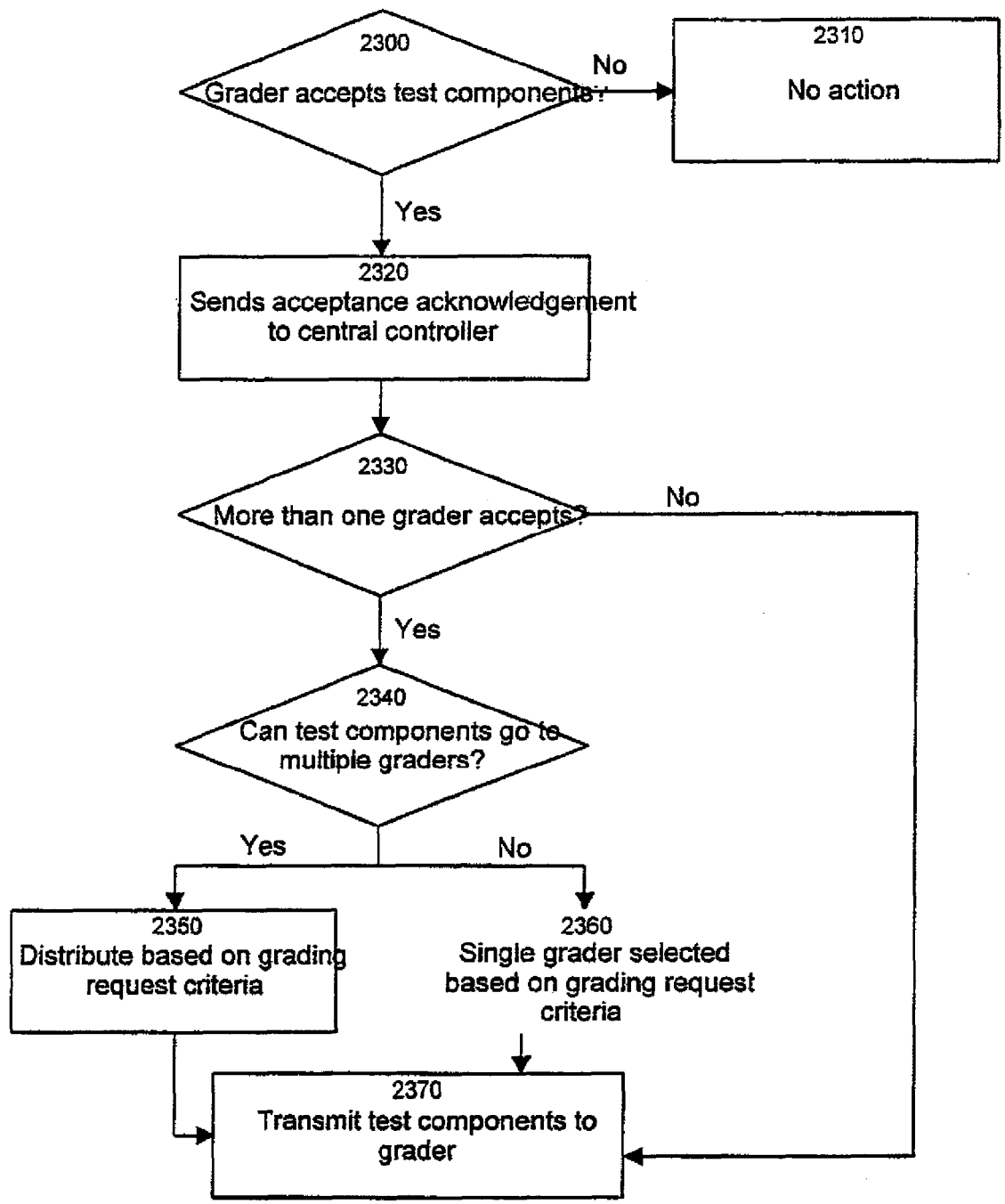

Referring now to FIG. 23, there is shown an exemplary embodiment for transmitting test components to graders. If the grader accepts the test components at step 2300, he sends an acknowledgment to central controller 200 at step 2320. If the grader does not accept, no further action is taken at step 2310. At step 2330, if more than one grader has accepted the work, then a determination is made at step 2340 as to whether or not the test components can go to multiple graders. If the test components can go to multiple graders, then the test components are distributed based on criteria 117 of grading request 125 at step 2350. If the test components cannot be split up, then a single grader is selected at step 2360 based on criteria 117 of grading request 125. After step 2350 and 2360, the test components are transmitted to the appropriate grader at step 2370. If only one grader accepts the work at step 2330, then the test components are transmitted to the grader at step 2370.

Figure 24:
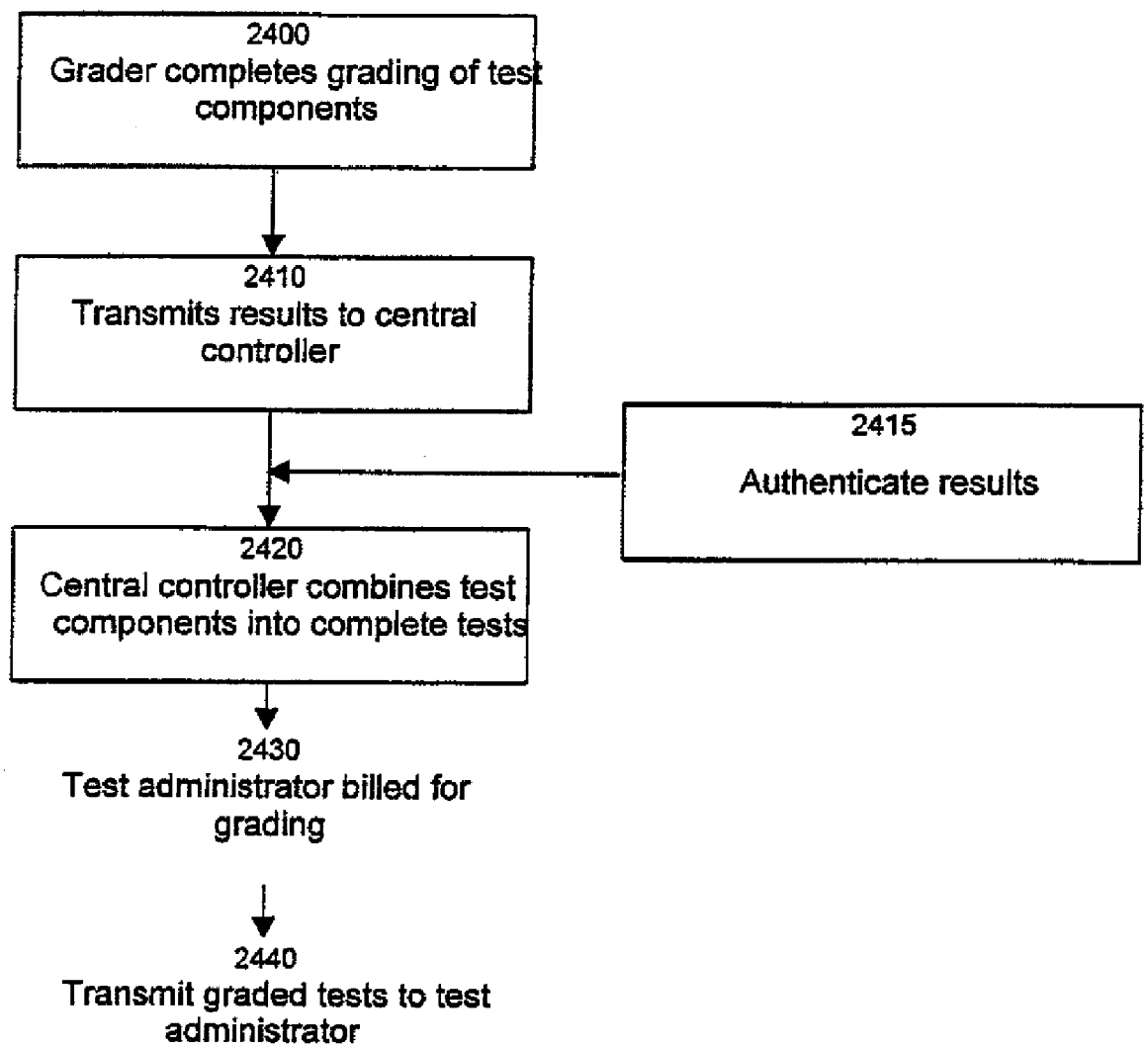

Referring now to FIG. 24, at step 2400, the grader completes the grading of each test component sent to him, transmitting the results to central controller 200 at step 2410. In order to ensure that the responses have come from a legitimate grader, the responses can be authenticated at step 2415. Techniques described in the cryptographic authentication embodiment may be used if more secure authentication is required. Central controller 200 then reassembles the test components back into complete tests at step 2420. At step 2430, the test administrator is billed for the grading. At step 2440, the graded tests are transmitted to the test administrator payment is then made to the graders.

Using the authentication and anonymity features described below, an electronic grading system can be provided wherein the test takers and test administrators (end users) do not know the identity of the graders (experts); conversely the graders do not know the identity of the test takers.

Cryptographic Authentication Embodiment

In the previous embodiments, authentication of the end user and expert involves checking the attached ID or name and comparing it with those stored in expert database 255 and end user database 260. Although this procedure works well in a low security environment, it can be significantly improved through the use of cryptographic techniques. These techniques not only enhance the ability to authenticate the sender of a message, but also serve to verify the integrity of the message itself, proving that it has not been altered during transmission. Encryption can also prevent eavesdroppers from learning the contents of the message. Such techniques shall be referred to generally as cryptographic assurance methods, and will include the use of both symmetric and asymmetric keys as well as digital signatures and hash algorithms.

The practice of using cryptographic protocols to ensure the authenticity of senders as well as the integrity of messages is well known in the art and need not be described here in detail. For reference, one of ordinary skill in the art may refer to Bruce Schneier, *Applied Cryptography, Protocols, Algorithms And Source Code In C*, (2d Ed, John Wiley & Sons, Inc., 1996).

Figure 25:
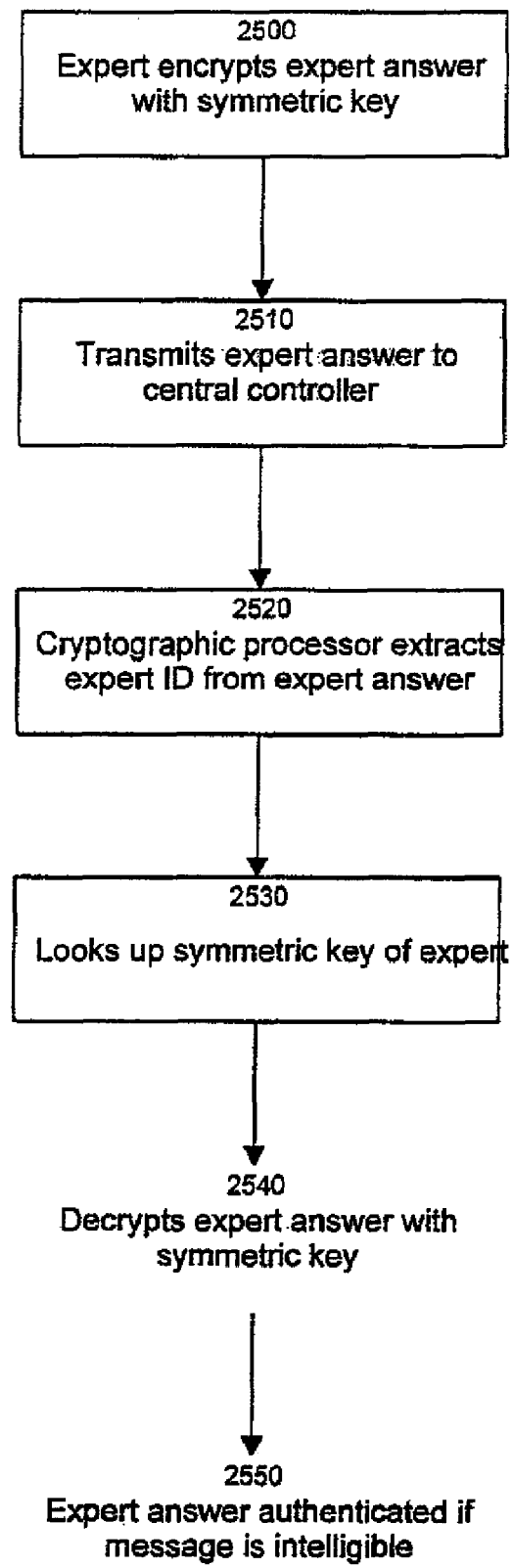
FIG. 25 illustrates an exemplary authentication process using symmetric keys.

FIG. 25 describes a symmetric key embodiment in which the expert and central controller share a key. Thus both encryption and decryption of expert answer 130 are performed with the same key. This encryption may be implemented with an algorithm such as DES (U.S. Government standard, specified in FIPS PUB 46), or with any of several algorithms known in the art such as IDEA, Blowfish, RC4, RC2, SAFER, etc. The expert encrypts expert answer 130 with his assigned symmetric key at step 2500, using cryptographic processor 435 of expert interface 400. The key may be stored in information storage 470 or otherwise stored or memorized by the expert. The encrypted expert answer 130 is then transmitted to cryptographic processor 210 of central controller 200 at step 2510. Cryptographic processor 210 extracts the expert ID from the message at step 2520 and looks up the symmetric key of the expert in cryptographic key database 290 at step 2530, decrypting expert answer 130 with this key at step 2540. Cryptographic key database 290 contains algorithms and keys for encrypting, decrypting and/or authenticating messages. At step 2550, if the resulting message is intelligible, then it must have been encrypted by the same key, authenticating that the expert must have indeed been the author of expert answer 130.

This procedure makes it significantly more difficult for an attacker to represent himself as an expert. Without cryptographic procedures, an attacker who obtained a sample expert answer 130 from a given expert would be able to extract the expert ID and then attach this ID number to any of the attacker's expert answers 130. When the message has been encrypted with a symmetric key, however, an attacker obtaining a sample expert answer 130 only discovers the experts ID number, not the symmetric key. Without this key, the attacker cannot create an expert answer 130 that will not be discovered by central controller 200, since he cannot encrypt his message in the same way that the authentic expert could. The symmetric key protocol also ensures that the message has not been tampered with during transmission, since alteration of the message requires knowledge of the symmetric key. An encrypted end user request 120 also provides the end user with more anonymity.

Figure 26:
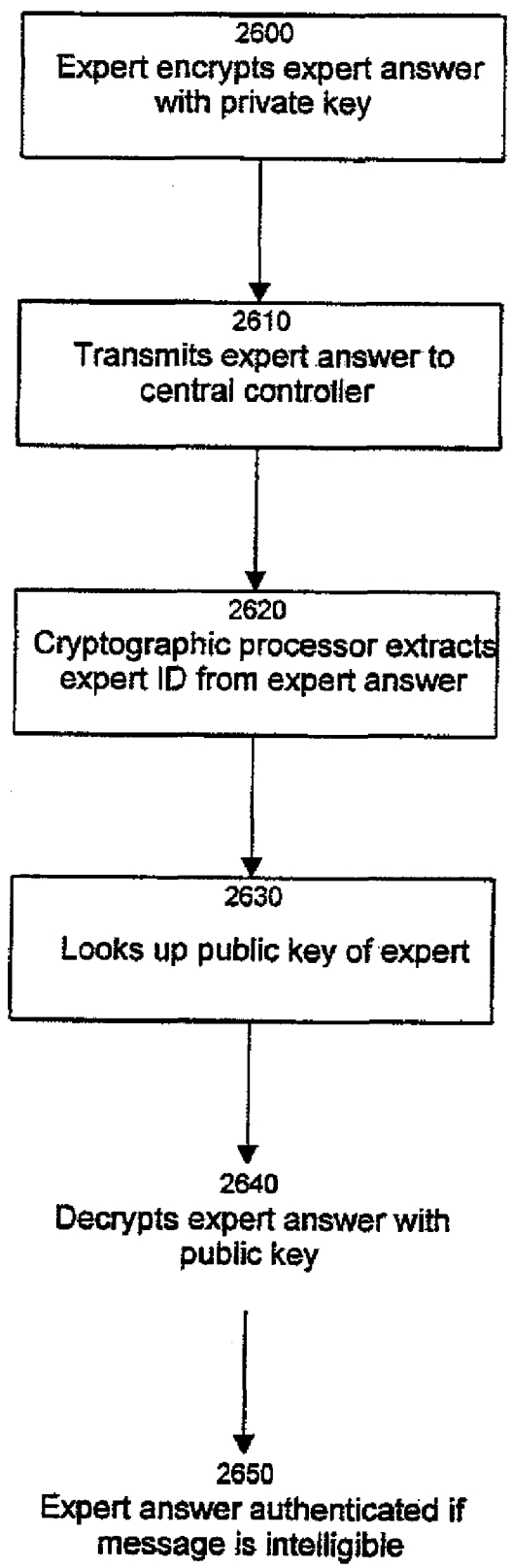
FIG. 26 illustrates an exemplary authentication process using asymmetric keys.

Referring now to FIG. 26, there is shown an asymmetric key protocol in which expert answer 130 is encrypted with a private key and decrypted with a public key. Two such algorithms for this procedure are RSA and DSA. At step 2600, the expert encrypts expert answer 130 with his private key using cryptographic processor 435, transmitting expert answer 130 to central controller 200 at step 2610. Cryptographic processor 210 extracts his expert ID at step 2620 and looks up the expert's associated public key in cryptographic key database 290 at step 2630, decrypting the message with this public key at step 2640. As before, if the message is intelligible then central controller 200 has authenticated the expert at step 2650. Again, attackers obtaining the message before it was received by central controller 200 are not able to undetectably alter it since they do not know the private key of the expert. Attackers would, however, be able to read the message if they managed to obtain the public key of the expert. Message secrecy is obtained if the expert encrypted the message with his public key, requiring the attacker to know the expert's private key to view the message.

Figure 27:
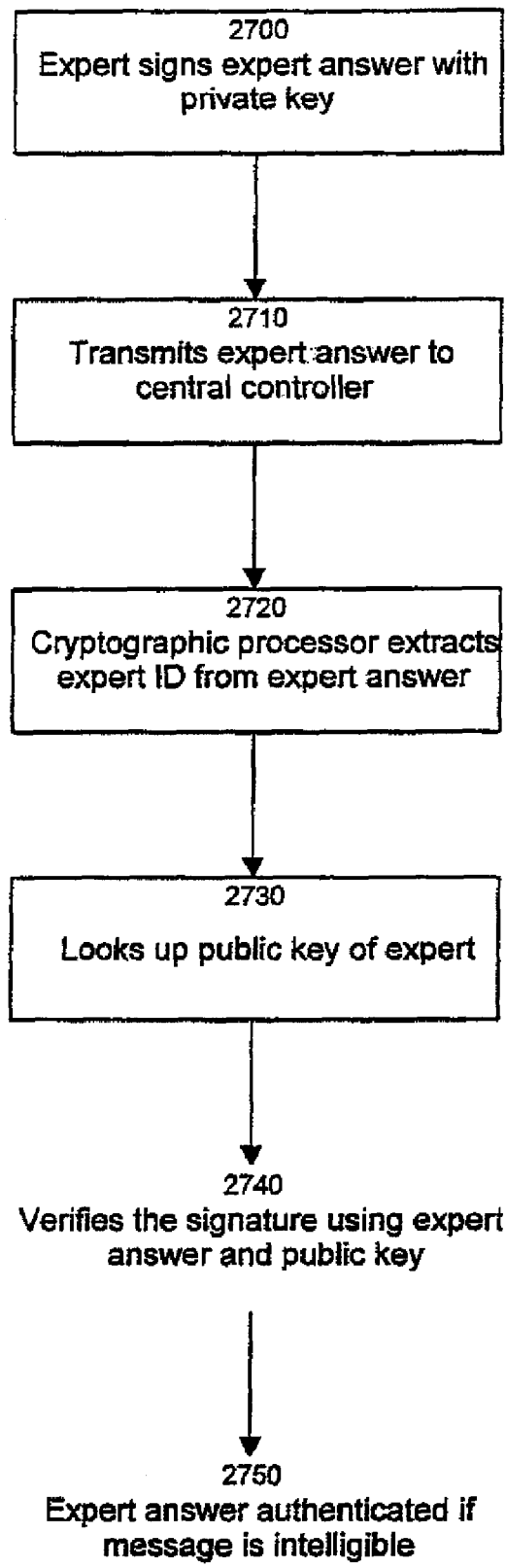
FIG. 27 illustrates an exemplary authentication process using digital signatures.

FIG. 27 shows a cryptographic technique using digital signatures to provide authentication and message integrity. One such algorithm is DSA (Digital Signature Algorithm), the U.S. Government standard specified in FIPS PUB 186. As in the asymmetric protocol described above, each expert has an associated public and private key. The expert signs expert answer 130 with his private key at step 2700 with cryptographic processor 435 and transmits it to central controller 200 at step 2710. Cryptographic processor 210 extracts the expert ID at step 2720 and looks up the experts public key at step 2730, verifying the signature using expert answer 130 and the public key of the expert at step 2740. If expert answer 130 is intelligible, then central controller 200 accepts expert answer 130 as authentic at step 2750.

Figure 28:
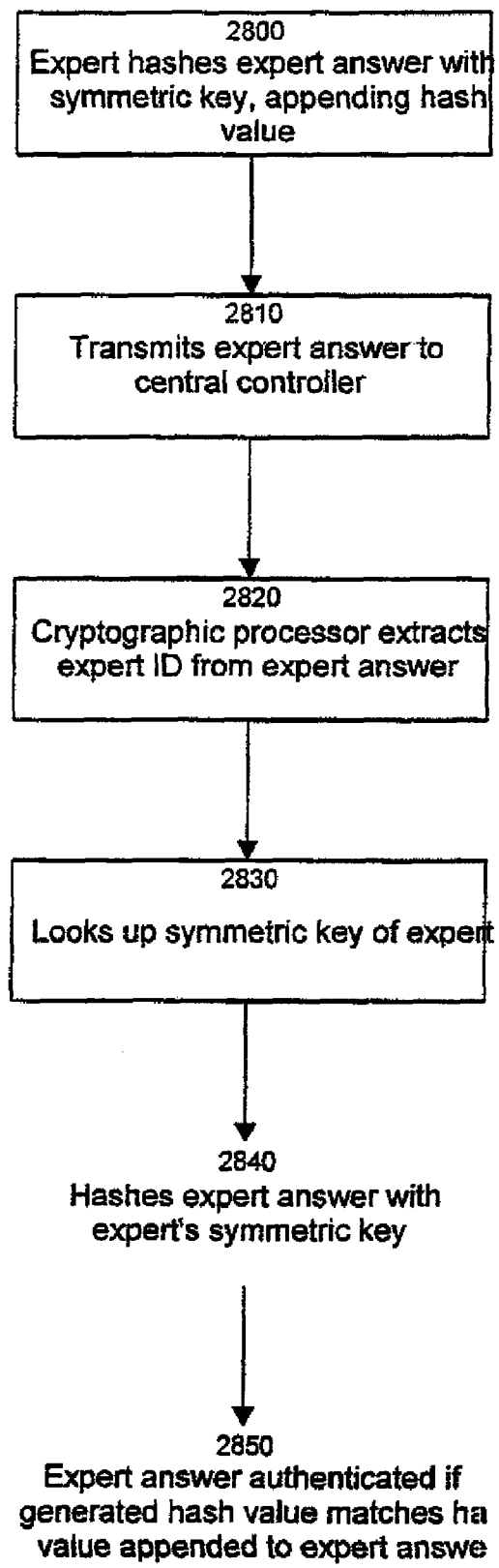
FIG. 28 illustrates an exemplary authentication process using hash functions.

Referring now to FIG. 28, there is described a cryptographic technique using message authentication codes for verifying the authenticity and integrity of expert answers 130. In the hash protocol of the present invention, the expert and central controller 200 share a symmetric key, which the expert includes in a hash of his expert answer 130 at step 2800. In the hash protocol, a one-way function is applied to the digital representation of expert answer 130, generating a code that acts much like the fingerprint of expert answer 130. Any of the MAC algorithms, such as RIPE-MAC, IBC-Hash, CBC-MAC, and the like may be applied in this application. After transmitting the message to central controller 200 at step 2810, cryptographic processor 210 looks up the expert's symmetric key at step 2830 and hashes expert answer 130 with this symmetric key at step 2840, comparing the resulting hash value with the hash value attached to expert answer 130. If the values match at step 2850, the integrity of the message is verified along with the authenticity of the author.

Although cryptographic techniques can provide greater confidence in the authenticity of an expert answer 130, they are useless if the experts cryptographic keys are compromised. An attacker obtaining the symmetric key of another expert is indistinguishable from that expert in the eyes of central controller 200. There is no way to know whether the expert was the true author of expert answer 130, or an attacker with the right cryptographic keys. The only way to solve this problem (known as undetected substitution) is to use biometric devices such as a fingerpint reader, voice recognition system, retinal scanner and the like. These devices incorporate a physical attribute of the expert into his expert answer 130, which is then compared with the value stored in expert database 255 at central controller 200. In the present invention, such devices attach to expert interface 400.

Fingerprint verification, for example, may be executed before the creation of expert answer 130, during the generation of expert answer 130 in response to prompts from central controller 200, at some predetermined or random times, or continuously by incorporating the scanning lens into the expert's answer device such that the expert is required to maintain his finger on the scanning lens at all times during the response session for continuous verification.

An example of such an identification device is the FC100 FINGERPRINT VERIFIER available from Startek, a Taiwanese company. The FC100 is readily adaptable to any PC via an interface card. The fingerprint verifier utilizes an optical scanning lens. The expert places his or her finger on the lens, and the resulting image is scanned, digitized, and the data compressed and stored in memory. Typically, a 256 byte file is all that is required. Each live-scan fingerprint is compared against the previously enrolled/stored template, stored in expert interface 400. If the prints do not match, the cryptographic algorithms in expert interface 400 may prevent the expert from generating an expert answer 130.

In a voice verification embodiment, the experts voice is used to verify his identity. This embodiment has the advantage of not requiring the use of any specialized hardware since it can be implemented over a standard phone connection. The expert's identity is verified at central computer 200. The process of obtaining a voice-print and subsequently using it to verify a person's identity is well-known in the art, and therefore need not be described in detail herein. One of ordinary skill in the art may refer to SpeakEZ, Inc. for voice identification/verification technology. Conventional speaker identification software samples the expert's voice. This sample is stored at central controller 200 in expert database 255. Each time the expert wants to send an expert answer 130 to central controller 200, he is required to call central controller 200 and speak into the phone at the prompt for a voice sample. If this sample matches that stored in expert database 255, the expert is provided a password which is incorporated into the digital signature appended to expert answer 130. Any expert answer 130 received without an appropriate voice match password is not accepted. The voice-print may also be stored in a database at expert interface 400, to verify the experts identity at that location prior to allowing an expert answer 130 to be created.

Anonymous Transactions Embodiment

As mentioned previously, the present invention provides for the anonymity of both end users and experts. Such anonymity is accomplished by eliminating all references to the names of the individuals for all transactions. An end user, for example, would include his ID in end user request 120 rather than his name, preventing the expert receiving end user request 120 from discovering the end user's identity. This is desirable if the end user were a celebrity seeking psychiatric advice, or if the president of a major pharmaceutical manufacturer is asking for an evaluation of a potential acquisition in the biotech field.

In a similar manner, experts may also want to keep their identity a secret. An author providing critiques of amateur works might not want his fans bombarding him with questions. A high priced lawyer giving low-cost advice to certain clients might not want his other clients to know.

Both experts and end users may also require varying levels of anonymity. One expert, for example, may feel comfortable revealing the country he is from but not the city, while another expert is comfortable providing his professional association but not the industry he represents.

Although using ID numbers can provide anonymity, both for end users and experts, there are a number of potential weaknesses. First, if the database of ID numbers, stored in expert database 255 or end user database 260, and their respective experts/end users is compromised, anonymity is destroyed since the message sender can be looked up in expert database 255 or end user database 260. To prevent this, the ID numbers are encrypted with the public key of central controller 200, so that even if it is stolen it is useless without the private key.

Another problem is that someone capable of watching the flow of end user requests 120 and expert answers 130 into and out of central controller 200 might be able to discern which end user was getting an expert answer 130 from which expert. The attacker might do this by examining the length of the outgoing end user request 120. A reporter, for example, might be interested in the questions that a celebrity was asking. He could track messages transmitted by the celebrity, observing messages leaving central controller 200 to see if any were of the same length. This might give the reporter clues as to the type of expertise sought by the celebrity.

Figure 29:
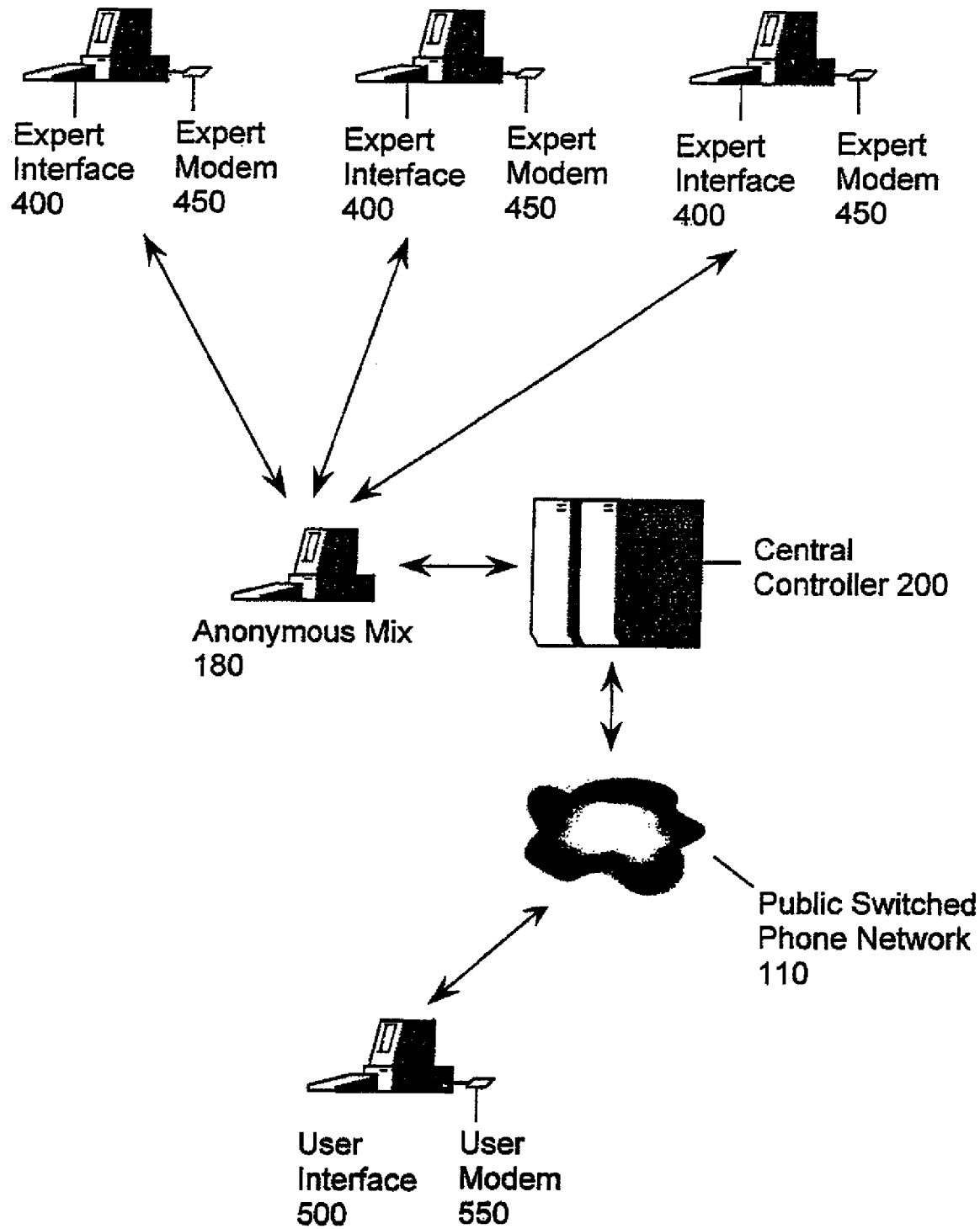
FIG. 29 illustrates an exemplary embodiment using anonymous mix.

Referring now to FIG. 29, there is described a method to prevent this attack using the anonymous mix 180 of the present invention. Anonymous mix 180 uses a protocol to make it very difficult for anyone to trace the path of a message which passes through the mix. Anonymous mix 180 takes outgoing messages from central controller 200 and randomly varies both the length of the message as well as the timing of its delivery. An incoming message of two hundred kilobytes, for example, might be expanded to three hundred kilobytes by adding random characters at the end. An attacker would thus be unable to correlate (by length of message) the incoming end user requests 120 with end user request 120 sent to the various experts. By adding a random time delay in the processing of incoming end user requests 120, central controller 200 also prevents an attacker from correlating (based on time) incoming end user requests 120 with outgoing end user requests 120.

An example of the anonymous protocol employed in the present invention is set forth below.

Notation and Conventions for this protocol:
  a. PKE_{PK_U}(X) represents the public-key encryption of X under public key PK_U.
  b. SIGN_{SK_U}(X) represents the digital signature of X under private key SK_U.
  c. E_{K_0}(X) represents the symmetric encryption of X under key K_0.
  d. PK_U represents the public key of user U.
  e. SK_U represents the private key of user U.
  f. D_U represents the identification number or code of user U.
  g. X,Y represents the concatenation of X with Y.

Anonymous Mix
  Keys used in this protocol:
  a. PK_M is the anonymous mix 180 public key.
  b. ID_B Is Bob's ID.
  c. PK_B is Bob's public key.
  d. SK_B is Bob's private key.

When Alice sends Bob a message through anonymous mix 180, the following takes place:
  a. Alice wishes to send message T to Bob anonymously. She first forms:
     K_0=a random session key.
     P_0=an all-zero string of some random length.
     X_0=PKE_{PK_M}(K_0).
     M_0=X_0,E_{K_0}(ID_B,P_0,T).

Alice then sends M_0 to the anonymous mix 180. Note that Alice may also have encrypted and digitally signed the message she's sending to Bob. This has no bearing at all on how the anonymous mix 180 processes it. P_0 disguises the size of the message, making it impossible to correlate incoming messages with outgoing messages.

b. Anonymous mix 180 receives M_0. Using X_O, anonymous mix 180 decodes the random session key K_0 using anonymous mix 180 private key SK_M and then using K_0, ID_B, T and P_O are decrypted. The anonymous mix 180 looks up Bob's public key from ID_B, and then forms:
     K_1=a random session key.
     P_1=an all-zero string of some random length.
     X_1=PKE_{PK_B}(K_1).
     M_1=X_1, E_{E_1}(P_1,T)

Anonymous mix 180 waits some random amount of time before sending M_1 to Bob. During this time, it is processing many other messages, both sending and receiving them.

c. Bob receives M_1. He decrypts it using his private key, SK_B and recovers T. He then does whatever he needs to with T.

In order to make messages anonymous that pass through an intermediary anonymous mix 180, a large volume of messages coming in and out are reviewed. A random delay involved in forwarding those messages is also required. Otherwise, it is possible for an opponent to watch messages going into and coming out of anonymous mix 180, using this information to determine the source and destination of each message. Similarly, messages must be encrypted to the anonymous mix 180, so that the messages can be decrypted and re-encrypted with a different key. Also, messages may need to be broken into many pieces or padded with large blocks of data, to avoid having message lengths give away information.

Another embodiment of the present invention uses anonymous mix 180 as part of a protocol to maintain anonymity between two people using a trusted third party, such as central controller 200 using public-key cryptography for encryption and digital signatures. The exact algorithms are unimportant at the protocol level. All public keys are signed by a certification authority like central controller 200. Certificates can be sent with messages and different keys can be used for encryption and digital signatures. The trusted third party knows everyone's public key and everyone knows the third party's public key. Anonymous mix 180 either knows everyone's public keys or their public keys are sent along with their identities. Everyone is assumed to know anonymous mix 180's public keys. An example of the trusted third party protocol is illustrated below.

A Trusted Third Party Protocol Using Anonymous Mix 180
Definitions
  a. Alice is the end user.
  b. Bob is the qualified expert.
  c. Carol is the trusted third party (central controller) coordinating the whole thing.

Keys used in this protocol:
  PK_M is anonymous mix 180 public key.
  ID_A is Alice's ID.
  PK_A is Alice's public key.
  SK_A is Alice's private key.
  ID_B is Bob's ID.
  PK_B is Bob's public key.
  SK_B is Bob's private key.
  PK_C is Carol's public key.

a. Alice creates some submission, S. This may be an end user request 120 or material for review by an expert. Alice then forms:
   K_2=a random session key. This is an additional random session key and should not be confused with the key (K_0) Alice uses to send the message to the anonymous mix 180.
   R_0=a random challenge either generated by Alice or given to her by someone else, depending on the application. In this case, central controller 200 will provide the end user (Alice) with a unique password to be used when Alice is to receive expert answer 130.
   X_0 PKE_{PK_C}(K_2) encrypted under Carol's public key.
   X_1=SIGN_{SK_A}(ID_A,R_0,S).
   M_0=X_0,E_{K_2}(ID_A,R_0,S,X_1).
   She sends M_0 to Carol via anonymous mix 180.
b. Carol receives M_0 and decrypts it using her private key, the random session key K_2, and verifies the signature. As central controller 200, she selects Bob out of all qualified experts available. She then forms:
   K_3=a random session key.
   N=a random end user request 120 identifier.
   T=a time stamp.
   X_2=PKE_{PK_B}(K_3) encrypted under Bob's public key.
   X_3=SIGN_{SK_C}(ID_C,N,T,S)
   X_4=E_{K_3}(ID_C,N,T,S,X_3)
   M_1=X_2,X_4.
   She sends M_1 to Bob via anonymous mix 180. She stores N, ID_A, and T for future reference.
c. Bob receives M_1. He decrypts it using his private key, the random session key K_3, and verifies the signature and time stamp. He then answers end user request 120. When he is finished, he has formed an expert answer G. He then forms:
   K_4=a random session key.
   X_5=PKE_{PK_C}(K_4) encrypted under Carol's public key.
   X_6=SIGN_{SK_B}(ID_B,N,G)
   X_7=E_{K_4}(ID_B,N,G,X_6)
   M_2=X_5,X_7.
d. Carol receives M_2. She decrypts it using her private key, the random session key K_4, and verifies the signature. She searches for the matching N among her currently active submissions. If she doesn't find it, an error has occurred, and someone will need to follow up, but the protocol ends. If she does find it, however, she notes that Bob has answered end user request 120 (so he can be paid for it). Carol then looks up Alice's challenge (R_0), address, and time stamp, and forms:
   K_5=a random session key.
   X_8=PKE_{PK_A}(K_5) encrypted under Alice's public key.
   X_9=SIGN_{SK_C}(ID_A,R_0,T,S,G).
   M_3=X_8,E_{K_5}(ID_A,R_0,T,S,G),X_9.
e. Alice receives M_3, and verifies the signature. She now has an authenticated expert answer 130, along with a time stamp to show when she submitted it.

By using a trusted third party and an anonymous mix 180, the identity of the end user and the expert is preserved. Although we have described only one possible method for maintaining anonymity, there are other equivalents. For example, if the embodiment included telephone messaging, the identity of the end user and expert could be maintained using conventional voice modification techniques. If end user request 120 or expert answer 130 were in a paper form, the form could be scanned using optical character recognition and translated into digital form, discarding any information that could be found in the original document.

Anonymity may also serve to prevent an end user and expert from contacting each other outside the system in order to ensure that payment is received for bringing the two parties together. In this embodiment, central controller 200 forces anonymity by blinding one or both parties. The expert, for example, may not see the name of the end user until expert answer 130 has been transmitted.

SELECTION METHODS EMBODIMENT

In one embodiment of the present invention, a protocol is described in which end users select the experts to which end user request 120 is transmitted. Additionally, bidding and negotiating protocols are described which allow end users to select the most appropriate expert to create expert answer 130, once responses are received from experts willing to provide expert answer 130.

After the list of qualified experts has been generated by central controller 200 at step 770, the end user may directly choose one or more experts to produce expert answer 130. The end user might connect to the web page of central controller 200, selecting experts from a list of qualified experts. Likewise, the expert can choose which end user requests 120 to provide an expert answer 130.

In one method of the present invention, central controller 200 uses end user profile 150 to select the experts. End user profile 150 represents rules for unattendant handling of transactions and is stored in end user database 260. For example, the end user might want to select the first expert to reply, the three least expensive experts, the most expensive expert, or the expert with the highest expert qualifications 140 from expert qualifications database 285. The end user could also require a minimum number of experts, or that he wants everyone who accepts end user request 120 within twenty minutes. These rules are stored in end user profile 150, allowing central controller 200 to automate more of the selection process.

In order to select from among many expert responding to end user request 120, bidding protocols can be used in which the expert has an expert profile 155 that is used to decide which end user requests 120 will be accepted or rejected. Expert profile 155 includes automatic bid amounts, minimum completion times, or automatic acceptances for high priced end user requests 120. For example, when end user request 120 is sent to the expert, central controller 200 automatically submits a bid or rejection based on expert profile 155.

End user profile 150 may contain bidding rules as well, such as excluding bids above or below a predetermined amount. The end user can also specify that he only wants experts willing to negotiate the price for responses, or that the experts must engage in an active bidding session in order to get his business.

Figure 30:
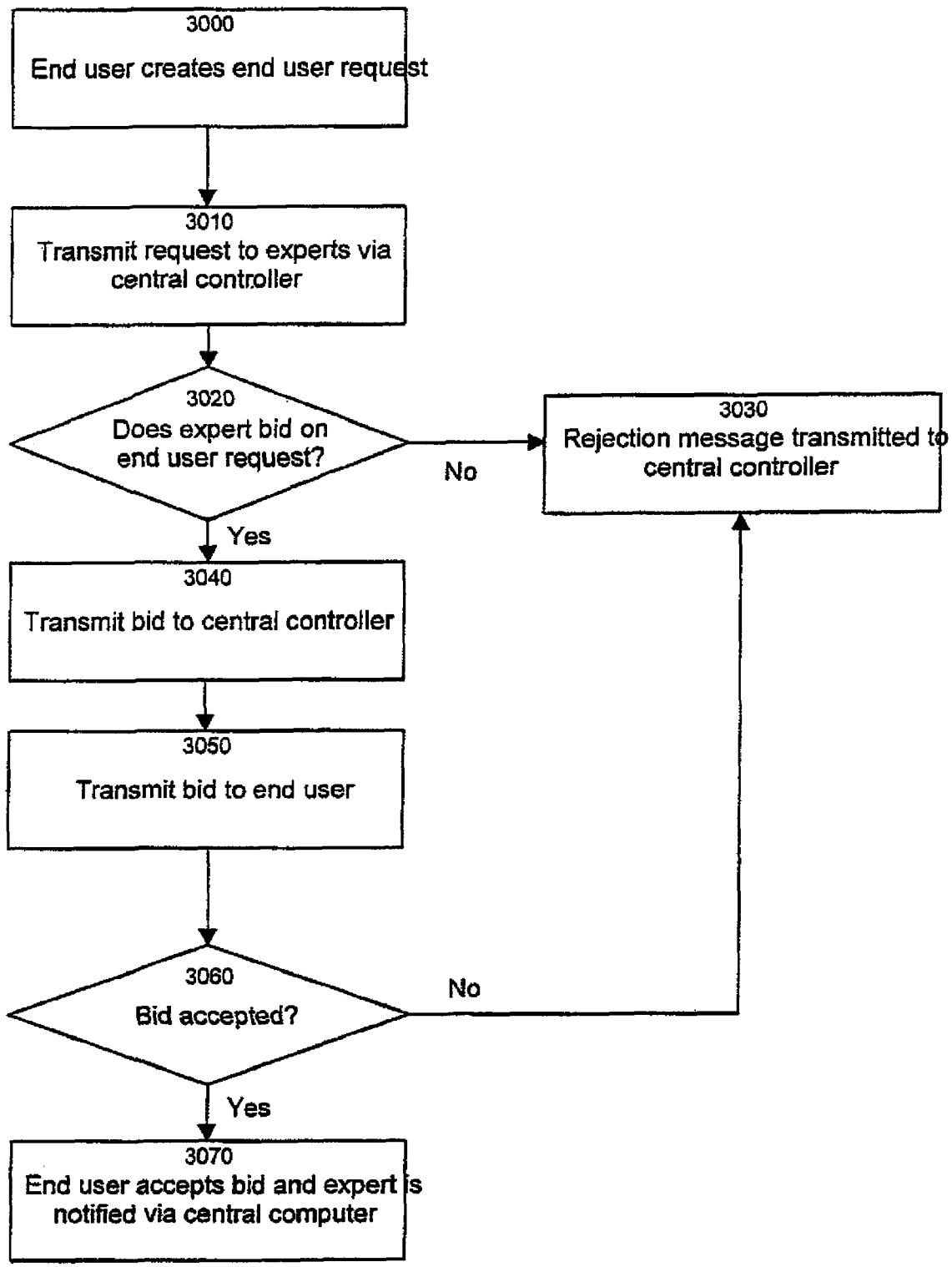
FIGS. 30, 31, 32, and 33 illustrate an exemplary embodiment of how end users and experts may negotiate during their transactions.
Figure 31:
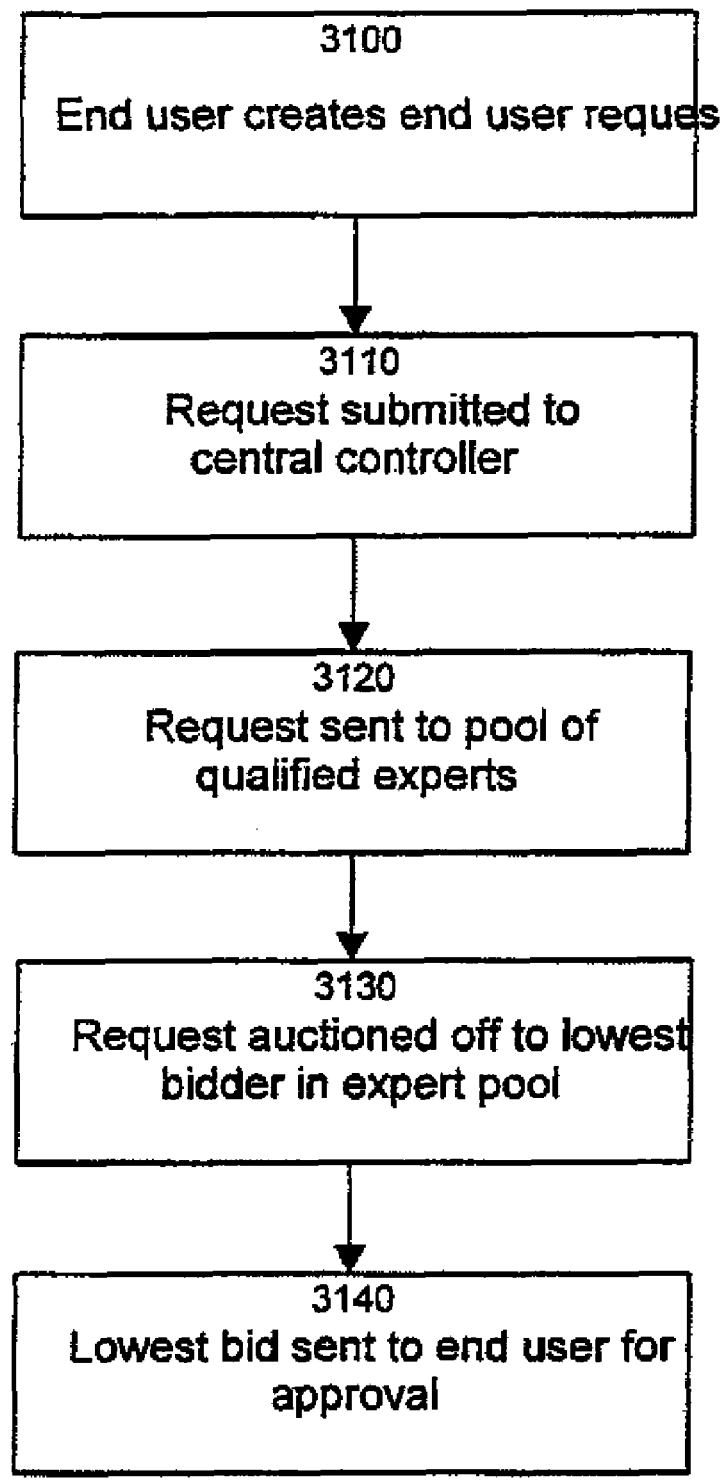
Figure 32:
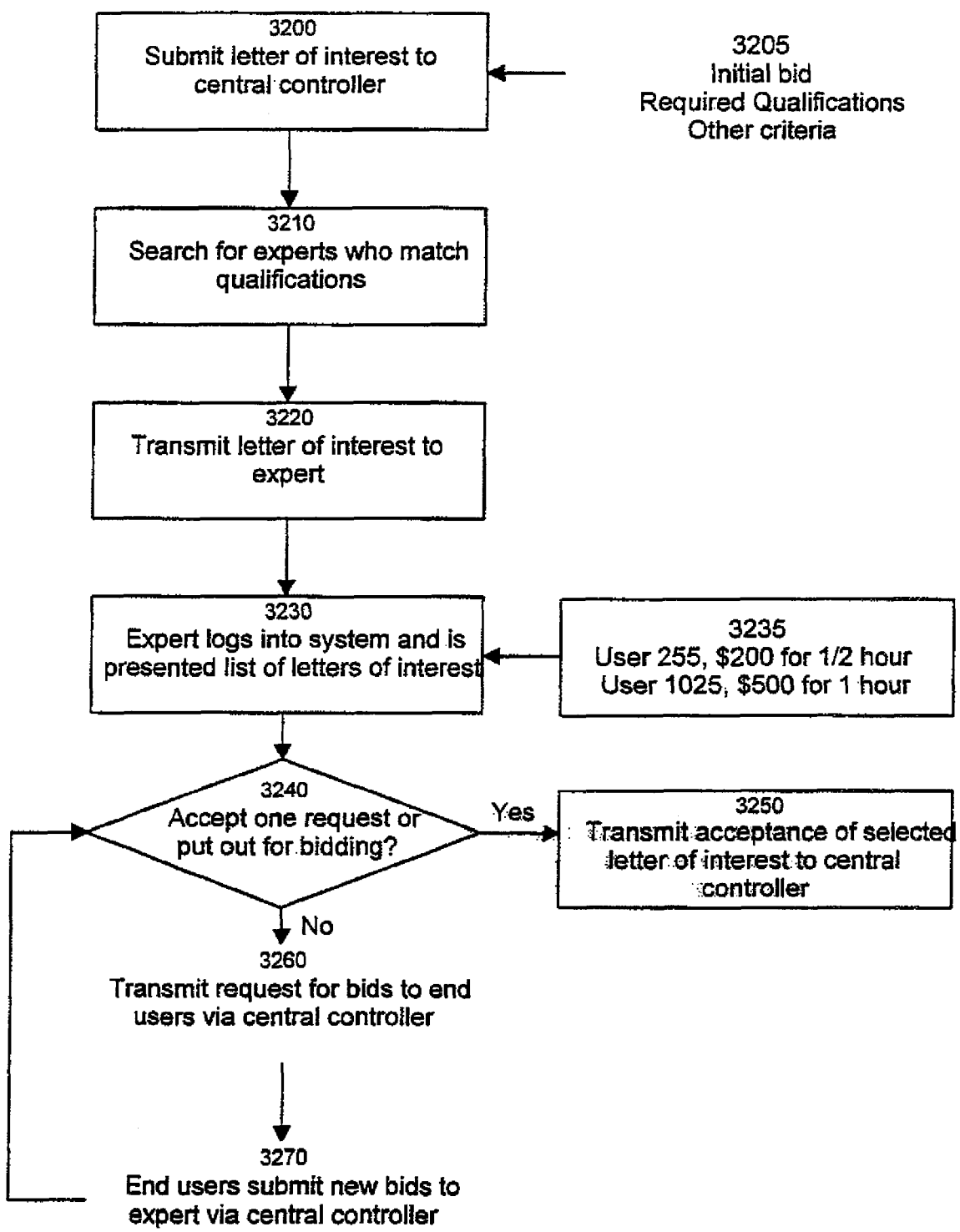

Another method for end users and experts to select each other is a negotiation protocol. This negotiation can occur in any of the previously described embodiments and can involve negotiating for time, price, or any other factors important to the expert or end user. FIGS. 30, 31 and 32 describe alternative embodiments of the negotiating protocols of the present invention.

FIG. 30 shows a bidding embodiment where the end user creates end user request 120 that includes a requirement that the experts bid on the response. The end user then decides which expert to use based on the expert's bids. A higher bid could mean that the expert is more qualified to respond or that the expert will provide a higher quality response. At step

3000, the end user creates end user request 120. At step 3010 end user request 120 and bid request 160 are transmitted to the appropriate experts using those methods described in earlier embodiments. In the asynchronous communications embodiment, for example, the end user transmits end user request 120 at step 650.

Each expert then has an opportunity to bid on or reject the end user's end user request 120 at step 3020. If the expert rejects end user request 120, notification is sent to central controller 200 at step 3030. If the expert chooses to bid on end user request 120, the bid offer 165 is sent to central controller 200 to be combined with bid offers 165 from other experts at step 3040. Central controller 200 then sends bid offers 165 to the end user at step 3050. At step 3060, the end user chooses from among bid offers 165 and selects an expert to answer end user request 120. The end user's choice is then transmitted to central controller 200 and the expert is notified of acceptance at step 3070. Alternatively, the end user instructs central controller 200 to automatically accept the lowest bid offer 165, highest bid offer 165, or any bid offer 165 that satisfies attached criteria 117 or end user profile 150. The end user, therefore, does not need to be directly involved in the bidding at all.

In the above procedure, the expert is directly involved in the bidding process. In an alternative embodiment, the expert's profile 155 is stored in expert database 255. Based on expert profile 155, central controller 200 automatically directs the bidding process. For example a lawyer might establish expert profile 155 which automatically bids two hundred dollars for any end user request 120 regarding wills, except for those requiring completion in two hours or less.

FIG. 31 shows an auctioning embodiment where the end users create end user requests 120 and submit them to central controller 200 as shown at steps 3100 and 3110. End user requests 120 are sent to a pool of qualified experts who simultaneously submit bid offers 165 on end user request 120 at step 3120. There may be a number of auction rounds (known as a repeated auction) in which experts have a chance to submit new bid offers 165. This contrasts with the one-shot auction described in FIG. 30, where there is only one round of bidding. Each expert sees his bid offer 165 as well as the other experts' bid offers 165. In this way, end user request 120 is auctioned off to the lowest bidder. Once the lowest bid offer 165 is determined data step 3130, the end user is notified of the bid offer 165 at step 3140.

FIG. 32 shows a bidding embodiment where the end user is bidding for an expert's time. If an end user needed a level 6 patent lawyer for example, he may be faced with a supply and demand imbalance if there are only four or five in the whole country. Since these lawyers may only be able to reply to one end user request 120 a day, the end users may have to bid for the experts' attention. When the expert logs into the system, letters of interest from users are transmitted to expert interface 400. These letters of interest are communications which describe the specific expert that the end user wants, as well as a bid for his services. The expert transmits a message to central controller 200 to find the highest end user bid offer 165 and retrieves the end user's end user request 120.

At step 3200, the end user submits a letter of interest to central controller 200 that includes criteria 117 and starting bid offer 165. At step 3210 central controller 200 searches to find matching experts in expert qualifications database 285 and submits a message to each expert who qualifies at step 3220. The expert automatically receives a list of end users and their letters of interest from central controller 200 at step 3230. At step 3240, the expert can either choose to respond to the letter of interest directly at step 3250 (based on initial bid offer 165) or send central controller 200 a bid request 160 at step 3260.

The end user bid offers 165 are transmitted back to the experts via central controller 200 at step 3270. The process continues at step 3240 with the expert choosing to either accept end user bid offer 165 or ask for new end user bid offers 165. In this way, the expert maximizes his earnings while the end user has access to highly recruited experts.

Figure 33:
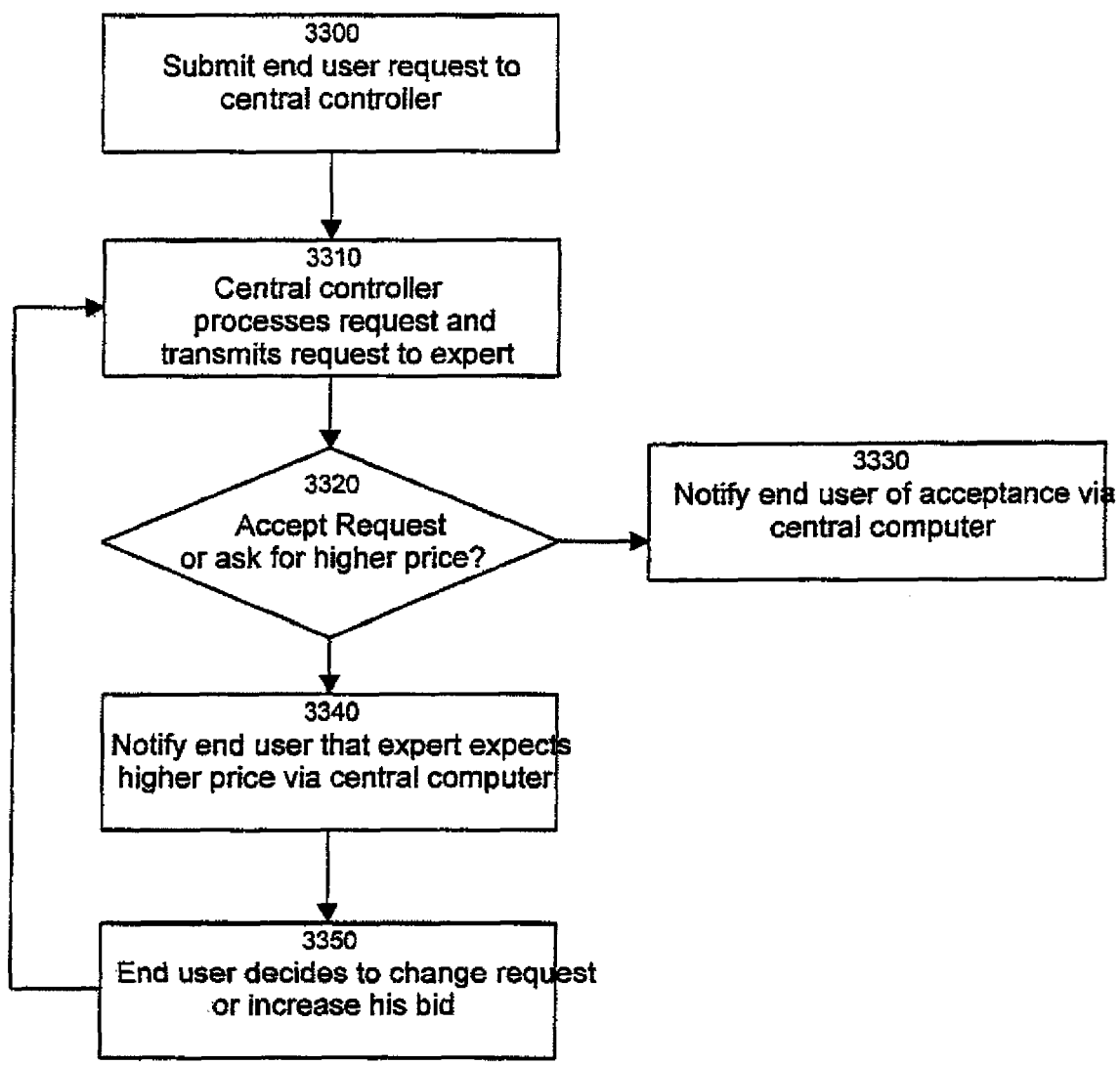

Another form of negotiation is shown in FIG. 33. Here, the end users negotiate the price of a particular end user request 120. The end user submits end user request 120 at step 3300. Central controller 200 processes end user request 120 and transmits it to an expert at step 3310. The expert reviews end user request 120 at step 3320 and decides whether to accept end user request 120, or ask for a higher price. If the expert accepts end user request 120, the end user is notified at step 3330. If the expert wants a higher price, the end user is notified at step 3340 of the price the expert expects. The expert can also suggest a way to reduce the cost by eliminating part of end user request 120. For example, end user request 120 may be significantly less complicated if a portion of it is changed or eliminated.

At step 3350, the end user can either decide to increase the amount of bid offer 165, or modify end user request 120 to see if he can reduce the cost. In either case, the end user resubmits end user request 120 at 3310. This iterative negotiation process continues until the end user either accepts the expert's terms or decides to retract end user request 120.

Although the bidding systems described above are based on price, alternative systems can be based on response time, quality of expert answer 130, whether the expert is willing to contact the end user directly, how many follow up end user requests 120 would be accepted, etc. The end user specifies which type of bidding is desired and central controller 200 makes the appropriate adjustments to bid request 160.

The above auction protocols are meant to be illustrative, and do not represent all of the possible protocols. If the end user is seeking multiple expert answers 130 to a given end user request 120, for example, there are auction protocols to handle the additional complexity. A uniform auction, for example, sells each opportunity for expert answer 130 at the second-highest bid. Other formats such as "Dutch" auctions are equally applicable.

The bidding process can be used with any of the previously described embodiments, using either an asynchronous or synchronous communications embodiment.

Once the end user and expert have agreed on the price, the process of billing authorization and expert answer 130 transmission follows the process described in the previous embodiments of the present invention such as those described in FIG. 9. If the end user has selected multiple experts to receive his end user request 120, it will be transmitted to all the selected experts.

Customer Satisfaction Embodiment

Figure 34:
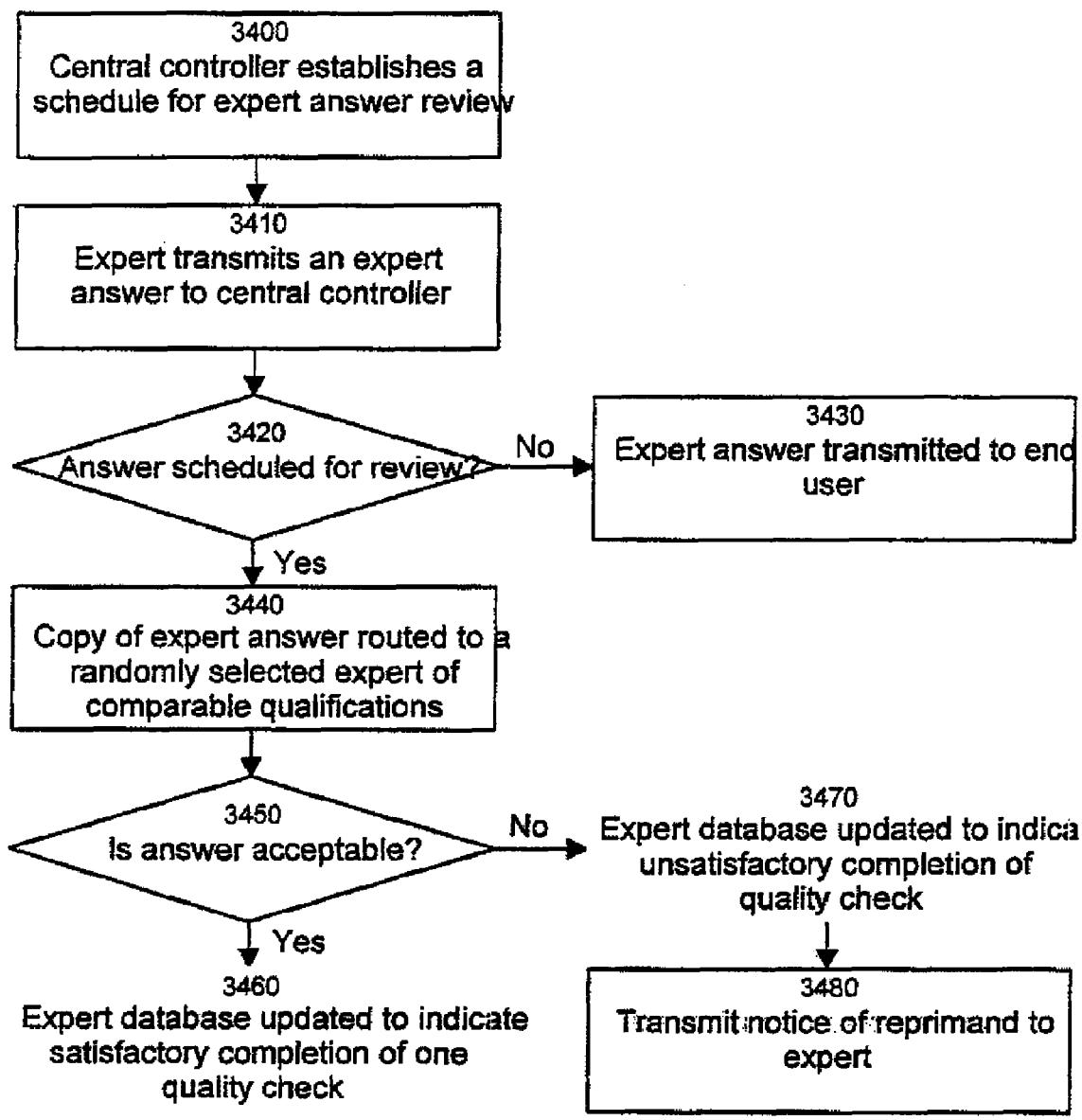
FIGS. 34 and 35 illustrate an exemplary embodiment of the quality assurance feature of the present invention.
Figure 35:
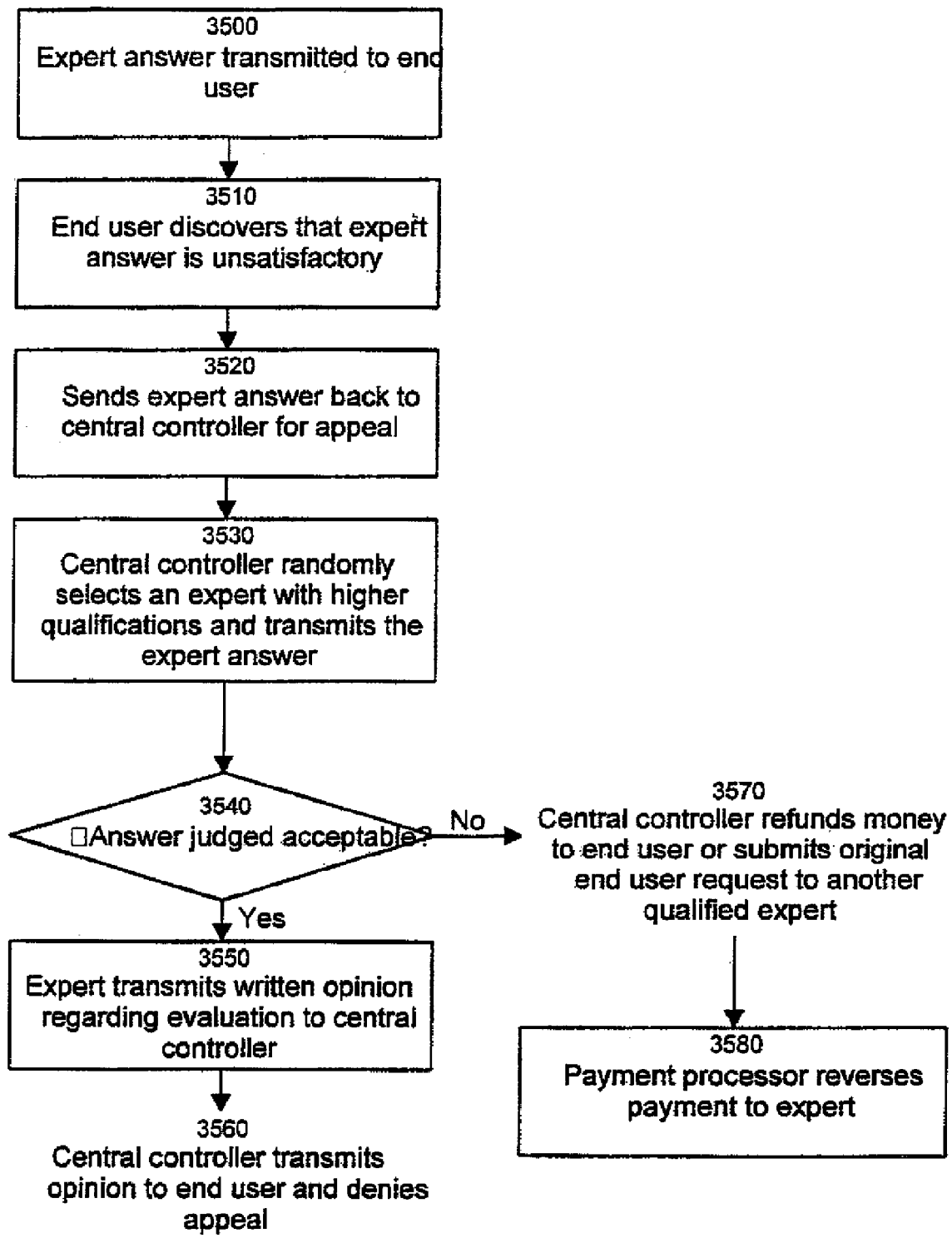

Although the previous embodiments have described the delivery of expert answer 130 as the end of the process, the present invention allows for follow-up procedures to ensure that the end user is satisfied with the quality of expert answer 130. Such procedures include review of end user complaints by higher level experts, as well as periodic testing of experts by central controller 200 to verify competence. FIGS. 34 and 35 describe these procedures in more detail.

FIG. 34 describes a peer review process in which a sampling of expert answers 130 are reviewed for compliance with quality standards. In this respect it is similar to a factory which tests a sample of product as the come off the assembly line, adjusting machines on the line if quality drops. At step 3400, central controller 200 establishes a schedule for expert answer 130 review. This schedule might indicate that every seventh expert answer 130 received is reviewed, or a random schedule could be generated so that the expert does not know in advance which expert answer 130 will be reviewed. The schedule applies to every expert answer 130 received from a given expert ensuring that no expert goes unreviewed.

At step 3410, the expert transmits expert answer 130 to central controller 200 which determines whether or not expert answer 130 was scheduled for review. Central controller 200 searches expert database 255 at step 3420, noting the number of expert answers 130 already submitted by that expert. If it was not scheduled for review, expert answer 130 is simply transmitted to the end user at step 3430, and the review process is not initiated. If it is scheduled for review, a copy of expert answer 130 is routed to a randomly selected reviewing expert of comparable expert qualifications 140 at step 3440, while the original expert answer 130 is transmitted to the end user so that the review process does not extend the completion time of end user request 120.

The reviewing expert decides whether or not expert answer 130 provided is acceptable at step 3450, with a positive evaluation prompting central controller 200 to update expert database 255 to indicate satisfactory completion of one quality check at step 3460. If expert answer 130 is found unsatisfactory at step 3460, central controller 200 updates expert database 255 to indicate the negative results of the quality check at step 3470. In addition, a notice is Knitted to the expert at step 3480 reprimanding him for poor quality. A given number of reprimands may result in the expulsion or temporary suspension of the expert, or in a lowering of his expert qualification 140 level.

Referring now to FIG. 35, there is described a procedure for handling end user complaints about the quality of responses received. At step 3500, expert answer 130 is transmitted to the end user. At step 3510, the end user discovers that expert answer 130 is unsatisfactory, sending back expert answer 130 to central controller 200 at step 3520. An expert answer 130 may be unacceptable because it is not complete, is factually incorrect, etc. Central controller 200 then randomly selects an expert at step 3530 whose expert qualifications 140 are equal to or higher than the expert who originally produced expert answer 130. The chosen evaluating expert then evaluates expert answer 130 in relation to end user request 120 at step 3540, judging whether or not expert answer 130 is acceptable. If it is judged acceptable, the evaluating expert transmits a written opinion regarding the evaluation to central controller 200 at step 3550, whereupon the opinion is then transmitted to the end user at step 3560, along with a denial of his appeal. To prevent further escalation if the end user is still unsatisfied, central controller 200 may require the end user at time of registration to agree to accept the results of this arbitration process.

If expert answer 130 is judged unacceptable at step 3540, central controller 200 refunds the price of expert answer 130 to the end user at step 3570, or submits the original end user request 120 to another qualified expert. At step 3580, payment processor 230 sends a message to the expert indicating that the money received for that expert answer 130 will be deducted from any future payments. Included with this message is a copy of the opinion letter written by the evaluating expert.

Those skilled in the art will recognize that the method and apparatus of the present invention has many applications, and that the present invention is not limited to the representative examples disclosed herein. Moreover, the scope of the present invention covers conventionally known variations and modifications to the system components described herein, as would be known by those skilled in the art.

What is claimed is:

1. An expert matching apparatus for managing communications between an expert having particular qualifications and an end user seeking a solution to an end user request, comprising:
   a controller;
   a first storage device database in communication with the controller, the first storage device database storing a database including plurality of qualifications for a plurality of experts, each expert qualification associated with an address corresponding to a particular expert, each particular expert being associated with an expert profile for determining whether an end user request is accepted or rejected, the expert profile including at least one of the following bidding protocols:
   an automatic bid amount, and
   an automatic acceptance for end user requests greater than a predetermined price; and
   a second storage device in communication with the controller, the second storage device comprising computer readable instructions which when executed by the controller cause the controller to perform the steps of:
   receiving an end user request generated by an end user;
   searching the database to generate a search result containing expert qualifications which correspond to the end user request;
   transmitting at least a portion of the end user request to the respective expert addresses based on the search result;
   receiving respective responses to the end user request from a plurality of experts, the responses indicating willingness to provide an expert answer;
   automatically submitting at least one bid on behalf of one or more of the plurality of experts responding, based on the bidding protocol of the expert profile of the respective expert;
   selecting at least one of the plurality of experts to provide an expert answer based on the automatically submitted at least one bid;
   receiving an expert answer corresponding to the end user request transmitted; and
   transmitting at least a portion of the expert answer to the end user.

2. The apparatus of claim 1, the instructions which when executed by the controller further causes the controller to perform the step of: selecting an expert based on said search result.

3. The apparatus of claim 1, the instructions which when executed by the controller further causes the controller to perform the step of: receiving guaranteed payment information from a guaranteed payment system for payment of expert services rendered to the end user.

4. The apparatus of claim 1, the instructions by which when executed by the controller further causes the controller to perform the step of: transmitting payment remittance information to a payment remittance system to remit payment to the selected expert.

5. The apparatus of claim 1, the instructions which when executed by the controller further causes the controller to perform the step of: certifying expert qualifications.

6. The apparatus of claim 1, the instructions which when executed by the controller further causes the controller to perform the step of: authenticating at least one of origin or integrity of a transmission received by the controller unit.

7. The apparatus of claim 6, wherein authenticating at least one of origin or integrity of a transmission received by the controller comprises using a cryptographic operation with an encryption key.

8. The apparatus of claim 1, the instructions which when executed by the controller further causes the controller to perform the step of: classifying the end user request, the apparatus first storage device further comprising a second database having predetermined subject matter classifications for classifying the end user requests by subjects contained in the second database.

9. The apparatus of claim 1, the instructions which when executed by the controller further causes the controller to perform the step of: transmitting reference data to an end user.

10. The apparatus of claim 1, the instructions which when executed by the controller further causes the controller to perform the steps of: receiving a bid from the end user and transmitting the bid to the selected expert.

11. The apparatus of claim 1, the instructions which when executed by the controller further causes the controller to perform the steps of: receiving a bid from at least one expert and transmitting the bid to the end user.

12. The apparatus of claim 1, the instructions which when executed by the controller further causes the controller to perform the step of: facilitating communication between at least one expert and the end user.

13. The apparatus of claim 1, wherein the expert qualifications are selected from the group consisting of a subject matter designator, experience, education, licenses, location, availability criteria, representatives, rates, payment method, publications, prior work history, and a resume.

* * * * *